US009135782B2

(12) United States Patent
Nakamura

(10) Patent No.: US 9,135,782 B2
(45) Date of Patent: Sep. 15, 2015

(54) GAMING MACHINE AND CONTROL METHOD THEREOF

(71) Applicants: Universal Entertainment Corporation, Tokyo (JP); Aruze Gaming America, Inc., Las Vegas, NV (US)

(72) Inventor: Hiroki Nakamura, Tokyo (JP)

(73) Assignees: UNIVERSAL ENTERTAINMENT CORPORATION, Tokyo (JP); ARUZE GAMING AMERICA, INC., Las Vegas, NV (US)

( * ) Notice: Subject to any disclaimer, the term of this patent is extended or adjusted under 35 U.S.C. 154(b) by 318 days.

(21) Appl. No.: 13/744,518

(22) Filed: Jan. 18, 2013

(65) Prior Publication Data

US 2013/0130773 A1 May 23, 2013

Related U.S. Application Data

(63) Continuation of application No. 12/944,389, filed on Nov. 11, 2010, now Pat. No. 8,382,576.

(30) Foreign Application Priority Data

Nov. 13, 2009 (JP) ................................ 2009-260516

(51) Int. Cl.
*G06F 17/00* (2006.01)
*G07F 17/32* (2006.01)

(52) U.S. Cl.
CPC ............ *G07F 17/3267* (2013.01); *G07F 17/32* (2013.01); *G07F 17/3209* (2013.01); *G07F 17/3244* (2013.01); *G07F 17/3262* (2013.01); *G07F 17/3288* (2013.01)

(58) Field of Classification Search
CPC ....................................................... G06F 17/32
See application file for complete search history.

(56) References Cited

U.S. PATENT DOCUMENTS

| | | | | |
|---|---|---|---|---|
| 7,445,548 | B1 * | 11/2008 | Muskin | 463/20 |
| 8,133,110 | B1 * | 3/2012 | Muskin | 463/20 |
| 8,382,571 | B2 * | 2/2013 | Fujimori et al. | 463/20 |
| 8,591,310 | B2 * | 11/2013 | Rodgers et al. | 463/20 |
| 8,764,537 | B2 * | 7/2014 | Jaffe et al. | 463/16 |
| 8,821,240 | B2 * | 9/2014 | Hornik et al. | 463/13 |
| 2003/0036424 | A1 * | 2/2003 | Baerlocher | 463/25 |

(Continued)

OTHER PUBLICATIONS

Applicant-Initiated Interview Summary for U.S. Appl. No. 12/944,389 (parent application) mailed Oct. 26, 2012.

(Continued)

*Primary Examiner* — Paula A D'Agostino
(74) *Attorney, Agent, or Firm* — KMF Patent Services, PLLC; Kenneth M. Fagin, Esq.; S. Peter Konzel, Esq.

(57) ABSTRACT

To provide a gaming machine and a control method therefor, having a new entertainment characteristics, a slot machine 10 of the present invention, when a "BONUS" symbol 250 associated with a pick-up bonus game is selected, receives selection of any one of twenty little pig's noses 210 displayed. Then, a benefit associated with the selected little pig's nose 210 is awarded. When the benefit to be awarded is a "stick house" 218 which means "step-up", a step-up occurs to the stick house stage and the expectation value for a payout is raised. Thus, when one little pig's nose 210 is selected out of the twenty little pig's noses 210 displayed in the stick house stage, the payout amount of the benefit associated with the little pig's nose 210 is increased.

3 Claims, 64 Drawing Sheets

(56) References Cited

U.S. PATENT DOCUMENTS

| | | | | |
|---|---|---|---|---|
| 2005/0245309 | A1* | 11/2005 | Englman | 463/20 |
| 2006/0030392 | A1* | 2/2006 | Rodgers et al. | 463/16 |
| 2006/0079317 | A1* | 4/2006 | Flemming et al. | 463/25 |
| 2007/0066389 | A1 | 3/2007 | Kojima | |
| 2009/0104973 | A1 | 4/2009 | Kato | |
| 2010/0016058 | A1* | 1/2010 | Englman et al. | 463/20 |
| 2013/0095905 | A1* | 4/2013 | Aoki et al. | 463/20 |
| 2013/0310175 | A1* | 11/2013 | Fujisawa et al. | 463/31 |
| 2014/0045573 | A1* | 2/2014 | Yoshikawa et al. | 463/20 |

OTHER PUBLICATIONS

Final Office Action for U.S. Appl. No. 12/944,389 (parent application) mailed Aug. 2, 2012.

Non-Final Office for U.S. Appl. No. 12/944,389 (parent application) mailed Apr. 17, 2012.

* cited by examiner

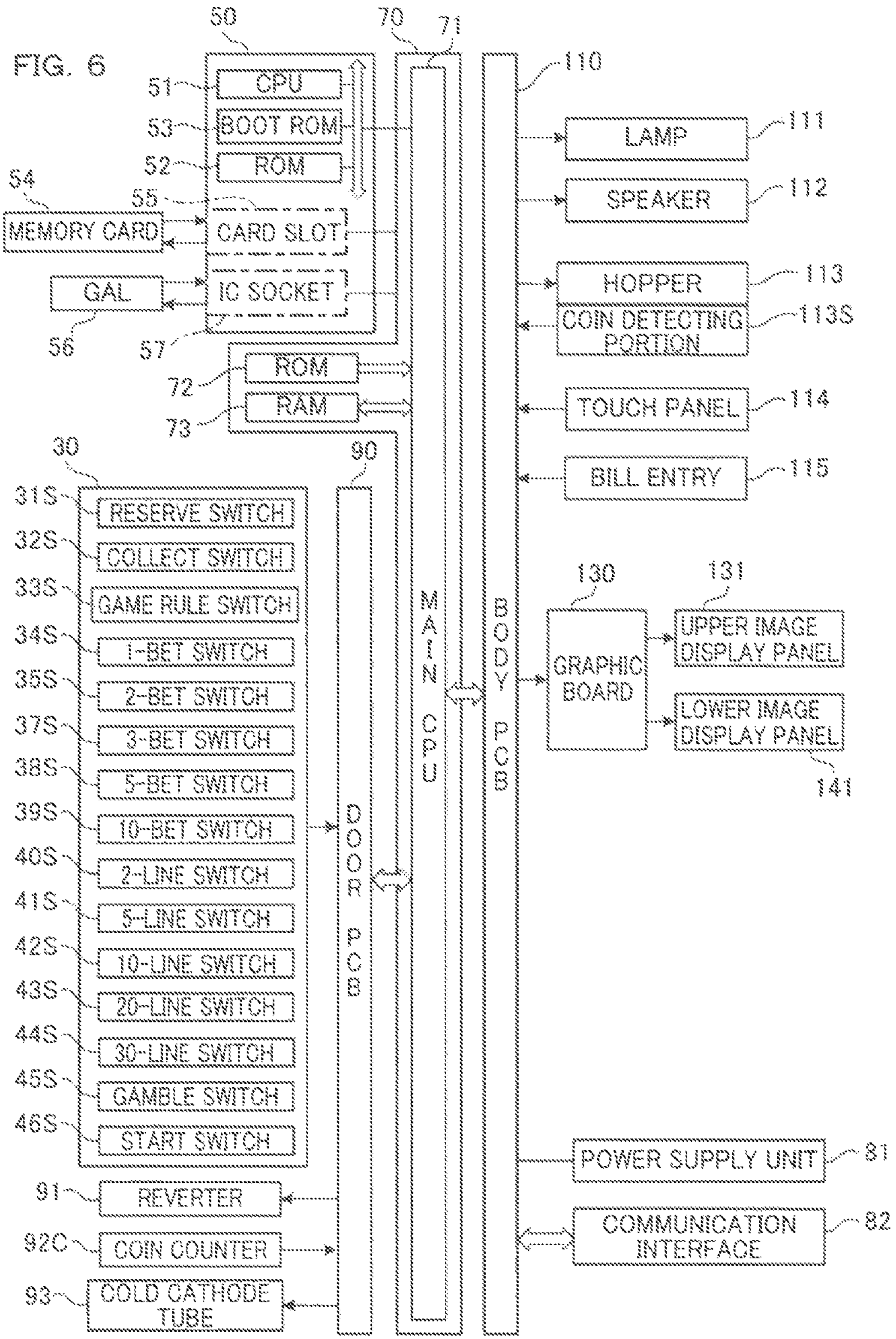
FIG. 6
50
51
CPU
53
BOOT ROM
52
ROM
54
MEMORY CARD
55
CARD SLOT
GAL
IC SOCKET
56
57
70
71
72
ROM
73
RAM
MAIN CPU
110
BODY PCB
LAMP
111
SPEAKER
112
HOPPER
113
COIN DETECTING PORTION
113S
TOUCH PANEL
114
BILL ENTRY
115
130
GRAPHIC BOARD
131
UPPER IMAGE DISPLAY PANEL
LOWER IMAGE DISPLAY PANEL
141
30
90
DOOR PCB
31S
RESERVE SWITCH
32S
COLLECT SWITCH
33S
GAME RULE SWITCH
34S
1-BET SWITCH
35S
2-BET SWITCH
37S
3-BET SWITCH
38S
5-BET SWITCH
39S
10-BET SWITCH
40S
2-LINE SWITCH
41S
5-LINE SWITCH
42S
10-LINE SWITCH
43S
20-LINE SWITCH
44S
30-LINE SWITCH
45S
GAMBLE SWITCH
46S
START SWITCH
91
REVERTER
92C
COIN COUNTER
93
COLD CATHODE TUBE
POWER SUPPLY UNIT
81
COMMUNICATION INTERFACE
82

FIG. 7

| | FIRST COLUMN | SECOND COLUMN | THIRD COLUMN | FOURTH COLUMN | FIFTH COLUMN |
|---|---|---|---|---|---|
| CODE NO. | SYMBOL | SYMBOL | SYMBOL | SYMBOL | SYMBOL |
| 00 | FREEGAME | STRAW | GRANDMA | TURNIP | BRICK |
| 01 | GRANDMA | APPLE | BRICK | APPLE | CHIMNEY |
| 02 | BONUS | GRANDMA | TURNIP | BARREL | TURNIP |
| 03 | SOUP | WOOD PLATE | WOOD PLATE | CHIMNEY | BRICK |
| 04 | SOUP | STRAW | APPLE | GRANDMA | TURNIP |
| 05 | BRICK | CHIMNEY | BONUS | TURNIP | GRANDMA |
| 06 | CHIMNEY | STRAW | TURNIP | APPLE | BRICK |
| 07 | APPLE | APPLE | BARREL | CHIMNEY | APPLE |
| 08 | BARREL | BRICK | BRICK | TURNIP | SOUP |
| 09 | WOOD PLATE | BARREL | BARREL | STRAW | GRANDMA |
| 10 | STRAW | CHIMNEY | WOOD PLATE | WOOD PLATE | BARREL |
| 11 | SOUP | BRICK | SOUP | BARREL | BARREL |
| 12 | WOOD PLATE | STRAW | APPLE | BRICK | STRAW |
| 13 | TURNIP | SOUP | FREEGAME | WOOD PLATE | BONUS |
| 14 | CHIMNEY | BRICK | TURNIP | SOUP | WOOD PLATE |
| 15 | BRICK | BARREL | STRAW | GRANDMA | CHIMNEY |
| 16 | STRAW | SOUP | APPLE | STRAW | WILD |
| 17 | GRANDMA | GRANDMA | TURNIP | WILD | STRAW |
| 18 | WILD | TURNIP | WILD | BRICK | BRICK |
| 19 | SOUP | STRAW | CHIMNEY | SOUP | SOUP |
| 20 | BRICK | TURNIP | APPLE | WOOD PLATE | GRANDMA |
| 21 | APPLE | WILD | SOUP | SOUP | FREEGAME |

FIG.27

(A)

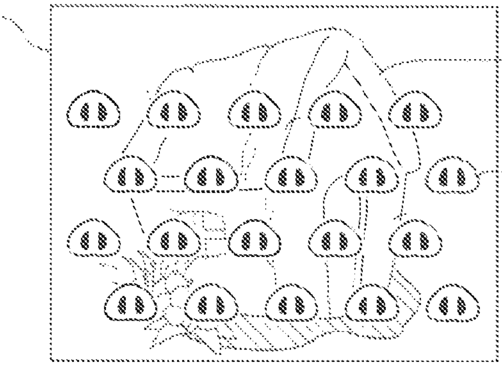

214

(B)

| SELECTION RESULT | | BENEFIT |
|---|---|---|
| PROGRESSIVE | PROGRESSIVE WIN (214) | PROGRESSIVE PAYOUT IS AWARDED. |
| FIXED PAYOUT | 30 (215) 60 (225) | FIXED PAYOUT "30"("60") IS AWARDED. |
| MINI GAME I | MINI GAME I (216) | TO "TURNIP HARVESTING" GAME |
| MINI GAME II | MINI GAME II (217) | TO THREE LITTLE PIGS FOOT RACE GAME |
| STICK HOUSE (BRICK HOUSE) | 218, 219 | STEP-UP TO STICK HOUSE (BRICK HOUSE) STAGE |
| WOLF | 220 | PICK-UP BONUS GAME TERMINATED |

(C)

| SELECTION RESULT | | BENEFIT |
|---|---|---|
| PROGRESSIVE | PROGRESSIVE WIN (214) | PROGRESSIVE PAYOUT IS AWARDED. |
| FIXED PAYOUT | 90 | FIXED PAYOUT "90" IS AWARDED |
| MINI GAME I | MINI GAME I (216) | TO "TURNIP HARVESTING" GAME |
| MINI GAME II | MINI GAME II (217) | TO THREE LITTLE PIGS FOOT RACE GAME |
| THREE LITTLE PIGS ARE WON | 221, 222, 223 | WINNER-TAKES-ALL OBJECT |
| WOLF | 220 | PICK-UP BONUS GAME TERMINATED |

FIG. 33

| | FIRST COLUMN | SECOND COLUMN | THIRD COLUMN | FOURTH COLUMN | FIFTH COLUMN |
|---|---|---|---|---|---|
| CODE NO. | SYMBOL | SYMBOL | SYMBOL | SYMBOL | SYMBOL |
| 00 | MERCHANT | CLAVECIN | WITCH | WILD | BEAUTY |
| 01 | WITCH | BOOK | BONUS | RING | TREASURE BOX |
| 02 | FREEGAME | MERCHANT | WINE | CLAVECIN | DRESS |
| 03 | BOOK | BOOK | BEAUTY | WITCH | BOOK |
| 04 | CLAVECIN | WINE | RING | WINE | CLAVECIN |
| 05 | BEAUTY | WILD | BEAUTY | MERCHANT | WITCH |
| 06 | FREEGAME | WITCH | BOOK | BOOK | FREEGAME |
| 07 | WINE | CLAVECIN | CLAVECIN | CLAVECIN | WINE |
| 08 | RING | MERCHANT | FREEGAME | TREASURE BOX | WITCH |
| 09 | TREASURE BOX | WILD | TREASURE BOX | BOOK | BONUS |
| 10 | DRESS | CLAVECIN | BOOK | DRESS | WINE |
| 11 | WINE | RING | DRESS | FREEGAME | RING |
| 12 | BEAUTY | BEAUTY | WILD | WINE | BOOK |
| 13 | BONUS | DRESS | MERCHANT | TREASURE BOX | MERCHANT |
| 14 | WINE | FREEGAME | WITCH | CLAVECIN | MERCHANT |
| 15 | BOOK | WINE | WINE | WITCH | WILD |
| 16 | MERCHANT | RING | CLAVECIN | MERCHANT | CLAVECIN |
| 17 | TREASURE BOX | WITCH | BONUS | RING | DRESS |
| 18 | WILD | DRESS | TREASURE BOX | BOOK | BEAUTY |
| 19 | DRESS | TREASURE BOX | BOOK | BEAUTY | WINE |
| 20 | CLAVECIN | WINE | RING | RING | TREASURE BOX |
| 21 | WITCH | BOOK | WINE | DRESS | WITCH |

FIG. 39

| | FIRST COLUMN | SECOND COLUMN | THIRD COLUMN |
|---|---|---|---|
| CODE NO. | SYMBOL | SYMBOL | SYMBOL |
| 00 | 0 | 3 | 8 |
| 01 | 2 | 4 | 9 |
| 02 | 9 | 8 | 0 |
| 03 | 3 | 7 | WITCH |
| 04 | 8 | 6 | WITCH |
| 05 | 1 | 5 | 1 |
| 06 | 4 | 0 | 2 |
| 07 | 5 | 1 | 3 |
| 08 | 6 | 2 | WITCH |
| 09 | 7 | 0 | WITCH |
| 10 | 1 | 4 | 7 |
| 11 | 2 | 5 | 6 |
| 12 | 3 | 6 | 5 |
| 13 | 0 | 1 | 4 |
| 14 | 6 | 2 | WITCH |
| 15 | 5 | 3 | WITCH |
| 16 | 4 | 9 | 0 |
| 17 | 7 | 8 | 2 |
| 18 | 8 | 7 | 3 |
| 19 | 9 | 2 | 4 |
| 20 | 0 | 0 | 1 |
| 21 | 0 | 1 | 0 |

FIG. 47

ASSOCIATED SYMBOL TABLE

| SYMBOL POSITION | ASSOCIATED SYMBOL |
|---|---|
| 0 | RING |
| 1 | CLAVECIN |
| 2 | RING |
| 3 | BOOK |
| 4 | BOOK |
| 5 | CLAVECIN |
| 6 | WITCH |
| 7 | BOOK |
| 8 | RING |
| 9 | CLAVECIN |

FIG. 48

ITEM COUNT TABLE

| ACQUIRED SYMBOLS | COUNT |
|---|---|
| RING | 3 |
| CLAVECIN | 1 |
| BOOK | 2 |

FIG. 51

| | FIRST COLUMN | SECOND COLUMN | THIRD COLUMN | FOURTH COLUMN | FIFTH COLUMN |
|---|---|---|---|---|---|
| CODE NO. | SYMBOL | SYMBOL | SYMBOL | SYMBOL | SYMBOL |
| 00 | ROSE(PINK) | ROSE(WHITE) | FLOWER BUD(WHITE) | WILD | BEAUTY |
| 01 | FLOWER BUD(WHITE) | FLOWER BUD(RED) | FLOWER BUD(PINK) | ROSE(PINK) | ROSE(RED) |
| 02 | FREEGAME | BEAUTY | FLOWER BUD(PINK) | ROSE(WHITE) | FLOWER BUD(WHITE) |
| 03 | FLOWER BUD(RED) | FLOWER BUD(RED) | BEAUTY | FLOWER BUD(WHITE) | FLOWER BUD(RED) |
| 04 | ROSE(WHITE) | FLOWER BUD(PINK) | ROSE(PINK) | FLOWER BUD(PINK) | ROSE(WHITE) |
| 05 | BEAUTY | WILD | BEAUTY | ROSE(PINK) | FLOWER BUD(WHITE) |
| 06 | FREEGAME | FLOWER BUD(WHITE) | FLOWER BUD(RED) | FLOWER BUD(RED) | FREEGAME |
| 07 | FLOWER BUD(PINK) | ROSE(WHITE) | ROSE(WHITE) | ROSE(WHITE) | FLOWER BUD(PINK) |
| 08 | ROSE(PINK) | ROSE(RED) | FREEGAME | ROSE(RED) | FLOWER BUD(WHITE) |
| 09 | ROSE(RED) | WILD | ROSE(RED) | FLOWER BUD(RED) | FLOWER BUD(WHITE) |
| 10 | FLOWER BUD(RED) | ROSE(WHITE) | FLOWER BUD(RED) | FLOWER BUD(WHITE) | FLOWER BUD(PINK) |
| 11 | BEAUTY | ROSE(PINK) | FLOWER BUD(WHITE) | FREEGAME | ROSE(PINK) |
| 12 | BEAUTY | BEAUTY | WILD | FLOWER BUD(PINK) | FLOWER BUD(RED) |
| 13 | FLOWER BUD(RED) | FLOWER BUD(WHITE) | BEAUTY | ROSE(RED) | BEAUTY |
| 14 | FLOWER BUD(PINK) | FREEGAME | FLOWER BUD(WHITE) | ROSE(WHITE) | BEAUTY |
| 15 | FLOWER BUD(RED) | FLOWER BUD(PINK) | FLOWER BUD(PINK) | FLOWER BUD(WHITE) | WILD |
| 16 | ROSE(PINK) | ROSE(PINK) | ROSE(WHITE) | ROSE(RED) | ROSE(WHITE) |
| 17 | ROSE(RED) | FLOWER BUD(WHITE) | ROSE(PINK) | ROSE(PINK) | FLOWER BUD(RED) |
| 18 | WILD | ROSE(RED) | ROSE(RED) | FLOWER BUD(RED) | BEAUTY |
| 19 | FLOWER BUD(WHITE) | ROSE(RED) | FLOWER BUD(RED) | BEAUTY | FLOWER BUD(PINK) |
| 20 | ROSE(WHITE) | FLOWER BUD(PINK) | ROSE(PINK) | ROSE(PINK) | ROSE(RED) |
| 21 | FLOWER BUD(WHITE) | FLOWER BUD(RED) | FLOWER BUD(PINK) | FLOWER BUD(PINK) | FLOWER BUD(WHITE) |

FIG. 55

FIXED-WILD MANAGEMENT TABLE

| REEL | POSITION | FIXED WILD SYMBOL |
|---|---|---|
| FIRST COLUMN | UPPER STAGE | INEFFECTIVE |
| | MIDDLE STAGE | INEFFECTIVE |
| | LOWER STAGE | INEFFECTIVE |
| SECOND COLUMN | UPPER STAGE | INEFFECTIVE |
| | MIDDLE STAGE | INEFFECTIVE |
| | LOWER STAGE | EFFECTIVE |
| THIRD COLUMN | UPPER STAGE | INEFFECTIVE |
| | MIDDLE STAGE | EFFECTIVE |
| | LOWER STAGE | INEFFECTIVE |
| FOURTH COLUMN | UPPER STAGE | INEFFECTIVE |
| | MIDDLE STAGE | INEFFECTIVE |
| | LOWER STAGE | INEFFECTIVE |
| FIFTH COLUMN | UPPER STAGE | EFFECTIVE |
| | MIDDLE STAGE | INEFFECTIVE |
| | LOWER STAGE | INEFFECTIVE |

FIG. 57

BASE GAME SYMBOL TABLE

| | FIRST COLUMN | SECOND COLUMN | THIRD COLUMN | FOURTH COLUMN | FIFTH COLUMN |
|---|---|---|---|---|---|
| CODE NO. | SYMBOL | SYMBOL | SYMBOL | SYMBOL | SYMBOL |
| 00 | PRINCE | PRINCESS A | PRINCESS A | CASTLE | COMB |
| 01 | PRINCESS A | KING | PRINCE | PRINCESS B | PRINCESS A |
| 02 | BONUS | COMB | KING | COFFIN | PRINCE |
| 03 | QUEEN | CASTLE | PRINCESS B | COMB | KING |
| 04 | KING | PRINCE | COFFIN | KING | CASTLE |
| 05 | PRINCE | PRINCESS B | BONUS | QUEEN | COMB |
| 06 | PRINCESS A | COFFIN | CASTLE | COFFIN | PRINCESS B |
| 07 | FREEGAME | QUEEN | COMB | PRINCESS B | QUEEN |
| 08 | CASTLE | CASTLE | COMB | PRINCE | COFFIN |
| 09 | COMB | COMB | CASTLE | CASTLE | CASTLE |
| 10 | PRINCESS B | PRINCE | PRINCE | COMB | COMB |
| 11 | CASTLE | QUEEN | COMB | PRINCESS A | CASTLE |
| 12 | CASTLE | KING | KING | KING | COFFIN |
| 13 | COMB | PRINCESS A | FREEGAME | QUEEN | BONUS |
| 14 | QUEEN | PRINCESS B | QUEEN | COMB | COMB |
| 15 | COFFIN | CASTLE | CASTLE | CASTLE | PRINCESS A |
| 16 | COMB | COMB | PRINCESS B | COFFIN | WILD |
| 17 | CASTLE | COFFIN | KING | WILD | KING |
| 18 | WILD | CASTLE | WILD | COFFIN | COFFIN |
| 19 | COFFIN | COFFIN | QUEEN | FREEGAME | CASTLE |
| 20 | PRINCESS B | COMB | COMB | CASTLE | PRINCESS B |
| 21 | CASTLE | WILD | PRINCESS A | PRINCE | FREEGAME |

FIG. 62

ROULETTE PAYOUT TABLE

| SMALL SEGMENT | FRIEND-CHARACTER | | |
|---|---|---|---|
| | COMBINATION OF PRINCE AND PRINCESS | PRINCE, OR PRINCESS | DWARF |
| HIGH PAYOUT SEGMENT | 2000 | 500 | 300 |
| MIDDLE PAYOUT SEGMENT | 1500 | 400 | 200 |
| SMALL PAYOUT SEGMENT | 1000 | 300 | 100 |

GAMING MACHINE AND CONTROL METHOD THEREOF

CROSS REFERENCE TO RELATED APPLICATION

This is a continuation of U.S. patent application Ser. No. 12/944,389, filed Nov. 11, 2010, which claims priority to Japanese Patent App. No. 2009-260516, filed Nov. 13, 2009, each of which applications are incorporated herein by reference in their entireties.

BACKGROUND OF THE INVENTION

1. Technical Field

The present invention relates to a gaming machine and a control method thereof.

2. Background Art

Amongst the already-known gaming machines such as slot machines is a gaming machine that awards a bonus when a predetermined condition is met (e.g. when a bonus symbol is stop-displayed). For example, there has been a gaming machine which awards game media such as coins or the like, or a gaming machine which runs a special game such as a free game, when the predetermined condition is met.

Of these gaming machines that award a bonus is a gaming machine including a plurality of bonuses, from which one bonus is selected and awarded, when a player operates a button or the like on the input device (e.g. Specification of U.S. Patent Application No. 2009/0104973).

In the above mentioned gaming machine having a plurality of bonuses, a player while playing the game usually is very much interested in the types of bonuses and selection of the bonuses.

In view of this, an object of the present invention is to provide a gaming machine and a control method thereof providing a new entertainment characteristic, by adding a new characteristic in relation to selection of the plurality of bonuses.

SUMMARY OF THE INVENTION

The present invention to achieve the object is as follows.

Namely, a gaming machine of the present invention includes:

a symbol display device capable of variably displaying a plurality of symbols;

an input device that allows an input of an instruction related to a game;

a controller programmed to execute the following processes of:

(a1) running a base game which variably displays the symbols on the symbol display device and stop-displays the symbols thereafter;

(a2) when the symbols stop-displayed in the base game run in (a1) includes a plurality of specific symbols, enabling the input device to accept an input related to selection of any of the specific symbols stop-displayed;

(a3) determining whether or not the specific symbol selected in (a2) is a symbol that causes occurrence of a pick-up bonus game;

(a4) when the symbol is determined as to be a symbol that causes occurrence of a pick-up bonus game in (a3), enabling the input device to accept an input of selection of any of a plurality of selectable objects displayed on the symbol display device;

(a5) awarding a payout according to an object selected out of the selectable objects in (a4);

(a6) when the object selected in (a4) is an object that increases an expectation value for a payout awarded in the pick-up bonus game, raising the expectation value for the payout;

(a7) repeating (a4) to (a6), until an object that terminates the pick-up bonus game is selected in (a4).

In the above structure (1), a plurality of specific symbols (e.g. the following three symbols: straw house, stick house, and brick house) are stop-displayed in the base game, and in response to this, the player is able to select one of the plurality of specific symbols stop-displayed via the input device. Then, when a specific symbol that causes occurrence of the pick-up bonus game is selected, the pick-up bonus game is started, and the player is able to select any of a plurality of selectable objects (20 little pig's noses). Then, a payout according to the object selected is awarded. Further, when the object selected is an object that increases the expectation value of a payout to be awarded in the pick-up bonus game (stage-up), the expectation value of a payout is increased. That is, when the expectation value of a payout is increased, the player is given more chances for a greater payout than a case of not selecting the object for increasing the expectation value of a payout to be awarded in the pick-up bonus game. This enables provision of greater satisfaction to the player. Further, it is possible to cause the player to expect an occurrence of such a state where the expectation value of a payout is increased.

Further, the present invention is as follows.

(2) Namely, the gaming machine described in the above (1) is adapted so that the controller is programmed to execute the following steps of:

(a8) receiving a bet input of game media via the input device;

(a9) accumulatively storing at least a part of the game media having placed as a bet in (a8); and (a10) when the object selected in (a4) is an object that relates to awarding of a progressive payout, awarding at least a part of the game media stored in (a9) as a progressive payout.

In the above structure (2), the pick-up bonus game is started, and any of a plurality of selectable objects is selected. When the object selected relates to awarding of a progressive payout, a progressive payout is awarded. Note that the progressive payout is an amount of game media which are accumulatively stored by pooling at least a part of game media placed as a bet. That is, when a selectable object related to the progressive payout is selected, the player is able to win an accumulation of game media which are pooled from the player's own and the other player's game media placed as a bet. This is more delightful for the player.

Further, the present invention is as follows.

(3) Namely, the gaming machine described in the above (1) is adapted so that:

the controller is programmed to execute the following step of:

(a11) when the object selected in (a4) is a winner-takes-all object, awarding the all the gains associated with the other selectable objects.

In the above structure (3), the pick-up bonus game is started, and any of a plurality of selectable objects is selected. When the object selected is a winner-takes-all object, all the gains associated with any of the remaining selectable objects are awarded. In other words, by selecting the winner-takes-all object, the player is able to receive the maximum amount of payout in the pick-up bonus game. This is more delightful for the player.

Further, the present invention is as follows.

(4) Namely, a method of the present invention for controlling a gaming machine includes the steps of:

(b1) a controller running a base game which variably displays a plurality of symbols on a symbol display device capable of variably displaying the symbols and which stop-displays the symbols thereafter;

(b2) when a plurality of specific symbols are stop-displayed in the base game run in (b1), the controller receiving a selection of any of the specific symbols stop-displayed, via an input device capable of receiving a game-related instructions;

(b3) the controller determining whether a specific symbol selected in (b2) is a specific symbol that causes an occurrence of a pick-up bonus game;

(b4) when the controller determines in (b3) that the symbol is a symbol that causes occurrence of the pick-up bonus game, enabling the input device to accept an input of selection of any of a plurality of selectable objects displayed on the symbol display device;

(b5) the controller awarding a payout according to the object selected in (b4);

(b6) when the object selected in (b4) is determined as to be an object that increases the expectation value of a payout to be awarded in the pick-up bonus game, the controller increasing the expectation value of a payout; and (b7) the controller repeating (b4) to (b6) until the object selected in (b4) is an object that terminates the pick-up bonus game.

In the above structure (4), a plurality of specific symbols (e.g. the following three symbols: straw house, stick house, and brick house) are stop-displayed in the base game, and in response to this, the player is able to select one of the plurality of specific symbols stop-displayed via the input device. Then, when a specific symbol that causes occurrence of the pick-up bonus game is selected, the pick-up bonus game is started, and the player is able to select any of a plurality of selectable objects (20 little pig's noses). Then, a payout according to the object selected is awarded. Further, when the object selected is an object that increases the expectation value of a payout to be awarded in the pick-up bonus game (stage-up), the expectation value of a payout is increased. That is, when the expectation value of a payout is increased, the player is given more chances for a greater payout than a case of not selecting the object for increasing the expectation value of a payout to be awarded in the pick-up bonus game. This enables provision of greater satisfaction to the player. Further, it is possible to cause the player to expect an occurrence of such a state where the expectation value of a payout is increased.

Further, the present invention is as follows.

(5) Namely, a gaming machine of the present invention includes:

a symbol display device capable of variably displaying a plurality of symbols;

a sound effect storage device storing a plurality of sound effects to be played when the symbols are stop-displayed;

a controller programmed to execute the following processes of:

(c1) running a base game which variably displays and then stop-displays the symbols on the symbol display device;

(c2) determining whether symbols first stopped in the base game run in (c1) include both a symbol needed for an occurrence of a bonus game and a symbol needed for an occurrence of a free game;

(c3) when it is determined in (c2) that the symbols first stopped do not include the both a symbol needed for an occurrence of a bonus game and a symbol needed for an occurrence of a free game, reading out a sound effect for an ordinary stopping from the sound effect storage device and playing the sound effect;

(c4) when it is determined in (c2) that the symbols first stopped include the both a symbol needed for an occurrence of a bonus game and a symbol needed for an occurrence of a free game, reading out a special-stopping sound effect from the sound effect storage device and playing the sound effect.

In the above structure (5), when the symbols first stopped on the symbol display device in a base game include the both a symbol needed for an occurrence of a bonus game and a symbol needed for an occurrence of a free game, a special-stopping sound effect is provided. With this, the player having heard the special-stopping sound effect will know that a bonus game or a free game that awards a special benefit or a payout may be given. With the special-stopping sound effect to notify the player that a bonus game or a free game may be given, it is possible to enhance the player's expectation.

Further, the present invention is as follows.

(6) Namely, a gaming machine of the present invention includes:

a symbol display device capable of variably displaying a plurality of symbols;

a controller programmed to execute the following processes of:

(d1) running a base game which variably displays the symbols on the symbol display device and stop-displays the symbols thereafter;

(d2) determining whether a plurality of symbols stop-displayed in the base game run in (d1) includes a symbol that causes an occurrence of a free game;

(d3) running a free game when it is determined in (d2) that a symbol that causes an occurrence of a free game is included;

(d4) determining whether to award a payout according to the status of the free game run in (d3);

(d5) when it is determined in (d4) that a payout is to be awarded, randomly determining a magnification factor for the payout; and (d6) awarding as a payout of the free game a value resulting from multiplying the payout determined in (d4) by the magnification factor determined in (d5).

In the above structure (6), a player is entitled to play a free game when the symbol that causes an occurrence of a free game is stop-displayed in the base game. If the player wins the free game and a predetermined amount of payout is to be awarded, the magnification factor for that predetermined amount of payout is randomly determined. Thus, the player is able to receive a payout resulting from multiplying that predetermined amount of payout by the randomly determined magnification factor. This enables provision of greater satisfaction to the player. This structure also causes the player for the situation where a payout is multiplied by a magnification factor.

Further, the present invention is as follows.

(7) Namely, a gaming machine of the present invention includes:

a symbol display device capable of variably displaying a plurality of symbols;

an input device that allows an input of an instruction related to a game;

a controller programmed to execute the following processes of:

(e1) running a base game which variably displays the symbols on the symbol display device and stop-displays the symbols thereafter;

(e2) when the symbols stop-displayed in the base game run in (e1) includes a plurality of specific symbols, enabling the input device to accept an input related to selection of any of the specific symbols stop-displayed;

(e3) determining whether or not the specific symbol selected in (e2) is a symbol that causes an occurrence of a selection game;

(e4) when it is determined in (e3) that the specific symbol selected is a symbol that causes an occurrence of the selection game, receiving via the input device a selection of any of a plurality of selectable objects displayed on the symbol display device;

(e5) awarding a payout according to an object selected out of the selectable objects in (e4); and (e6) repeating (e4) to (e5) until an object that terminates the selection game is selected in (e4).

In the above structure (7), a plurality of specific symbols (e.g. the following three symbols: straw house, stick house, and brick house) are stop-displayed in the base game, and in response to this, the player is able to select one of the plurality of specific symbols stop-displayed via the input device. When a specific symbol that causes an occurrence of the selection game is selected, the selection game is started, and the player is able to select any of a plurality of selectable object (four Barrels). Then, a payout according to the object selected is awarded. Further, the selection game is continued until the player selects an object that terminates the selection game. This causes greater expectation of the player for the payout in the selection game.

Further, the present invention is as follows.

(8) Namely, a gaming machine of the present invention includes:

a symbol display device capable of variably displaying a plurality of symbols;

an input device that allows an input of an instruction related to a game;

a controller programmed to execute the following processes of:

(f1) running a base game which variably displays the symbols on the symbol display device and stop-displays the symbols thereafter;

(f2) when the symbols stop-displayed in the base game run in (f1) includes a plurality of specific symbols, enabling the input device to accept an input related to selection of any of the specific symbols stop-displayed;

(f3) determining whether or not the specific symbol selected in (f2) is a symbol that causes occurrence of a pick-up bonus game;

(f4) when the symbol is determined as to be a symbol that causes occurrence of a pick-up bonus game in (f3), enabling the input device to accept an input of selection of any of a plurality of selectable objects displayed on the symbol display device;

(f5) when the object selected in (f4) is an object that relates to awarding of a mini game, enabling the input device to accept an input related to selection of any of a plurality of options displayed;

(f6) when any of the options is selected in (f5), sampling a random number ranging from 0 to 9;

(f7) repeating (f5) to (f6) a predetermined number of times;

(f8) after repeating the processes a predetermined number of times in (f7), aligning random numbers sampled sequentially from the one's place; and (f9) awarding a payout corresponding to a value which is a series of numbers aligned in (f8).

In the above structure (8), when the object selected in the pick-up bonus game is an object related to awarding of a mini game, a selection of any one of the plurality of options displayed is received, and then a random number is sampled. The above selection is repeated a predetermined number of times, and the random numbers sampled are sequentially aligned from the one's place to form a series of numbers. Then, a payout corresponding to a value which is the series of numbers is awarded. Thus, the player is able to play the mini game while being excited for an increase in the payout every time he/she makes his/her selection. The above structure therefore significantly enhances the player's expectation for the payout in the mini game.

Further, the present invention is as follows.

(9) Namely, the gaming machine described in the above (8) is adapted so that: the controller is programmed to execute the following steps of:

(f10) when the object selected in (f4) is an object that increases an expectation value for a payout awarded in the pick-up bonus game, raising the expectation value for the payout to be awarded in (f9).

In the above structure (9), when the object selected is an object that increases an expectation value for a payout awarded in the pick-up bonus game, the expectation value for the payout in the mini game is increased. That is, when the expectation value of a payout is increased, the player is given more chances for a greater payout than a case of not selecting the object for increasing the expectation value of a payout to be awarded in the pick-up bonus game. This enables provision of greater satisfaction to the player. Further, it is possible to cause the player to expect an occurrence of such a state where the expectation value of a payout is increased.

Further, the present invention is as follows.

(10) Namely, a gaming machine of the present invention includes:

a symbol display device capable of variably displaying a plurality of symbols;

an input device that allows an input of an instruction related to a game;

a controller programmed to execute the following processes of:

(g1) running a base game which variably displays the symbols on the symbol display device and stop-displays the symbols thereafter;

(g2) when a plurality of specific symbols are stop-displayed in the base game run in (g1) and forms a predetermined combination, enabling the input device to accept an input related to selection of any of the plurality of specific symbols stop-displayed;

(g3) determining wither a specific symbol selected in (g2) is a symbol that causes an occurrence of a credit determination game capable of awarding credit whose maximum digit number is prefixed;

(g4) when it is determined in (g3) that the symbol selected causes an occurrence of the credit determination game, scroll-displaying and then stop-displaying a plurality of symbol columns structured by symbols for credit determination game including symbols indicating a single digit number, in symbol display regions corresponding to the digits of the credit respectively;

(g5) determining credit based on the value indicated by the symbols for the credit determination game, which are stop-displayed in the symbol display regions in (g4). (g6) repeating (g4) to (g5) until a symbol that terminates the credit determination game is stop-displayed in the symbol display region in (g4).

In the structure of (10), when a plurality of specific symbols are stop-displayed and forms a predetermined combination in the base game, the player is able to select any of the plurality of specific symbols stop-displayed via the input device. Then, when a specific symbol that causes an occurrence of the credit determination game is selected, there is started the credit determination game which awards credit whose maximum digit number is prefixed. In the credit determination game, a plurality of symbol columns structured by symbols for the credit determination game including symbols indicating a single digit number are scroll-displayed and then stop-displayed in the symbol display regions corresponding to the digits of credits, respectively. Based on the value indicated by the symbols for the credit determination game thus stop-displayed, the credit is determined. As described, the number indicated by each of the symbols for the credit determination game which are stop-displayed and arranged as an effect indicates the number of the corresponding digit of the credit to be awarded. This realizes a gaming machine with a new type of entertainment characteristic such that the player expects he/she may be able to determine the credit.

Further, the present invention is as follows.

(11) Namely, a gaming machine of the present invention includes:

a symbol display device capable of variably displaying a plurality of symbols;

an input device that allows an input of an instruction related to a game;

a memory capable of storing data;

a controller programmed to execute the following processes of:

(h1) running a base game which variably displays the symbols on the symbol display device and stop-displays the symbols thereafter;

(h2) when a plurality of specific symbols are stop-displayed in the base game run in (h1) and forms a predetermined combination, enabling the input device to accept an input related to selection of any of the plurality of specific symbols stop-displayed;

(h3) determining whether or not the specific symbol selected in (h2) is a symbol that causes occurrence of a pick-up bonus game;

(h4) when the symbol is determined as to be a symbol that causes occurrence of a pick-up bonus game in (h3), enabling the input device to accept an input of selection of any of a plurality of selectable objects displayed on the symbol display device;

(h5) determining whether or not the object selected in (h4) is a symbol that causes occurrence of an item accumulation game;

(h6) when it is determined in (h5) that the object selected is a symbol that causes an occurrence of the item accumulation game, displaying a plurality of selectable objects which are different from those of the pick-up bonus game, and storing a plurality of items in the memory in association with the selectable objects;

(h7) after (h6), enabling the input device to accept an input related to selection of any of the plurality of selectable objects;

(h8) incrementing the count of items associated with the object selected in (h7);

(h9) when the count of any of the items reaches a predetermined count in (h8), awarding a payout based on that item whose count has reached the predetermined count;

(h10) repeating (h7) to (h9) until an object that terminates the item accumulation game is selected in (h7).

In the structure of (11), when a plurality of specific symbols are stop-displayed and forms a predetermined combination in the base game, the player is able to select any of the plurality of specific symbols stop-displayed via the input device. Then, when a specific symbol that causes occurrence of the pick-up bonus game is selected, the pick-up bonus game is started, and the player is able to select any of a plurality of selectable objects. When the object selected is an object that causes an occurrence of the item accumulation game, the item accumulation game is started, and selection of any one of the plurality of selectable objects is enabled. In the item accumulation game, the player is able to select items by selecting any of the plurality of selectable objects, and is awarded a payout when the count of any of the items selected reaches a predetermined count. As is understood from this, addition of the item-based payout could occur based on the player's selection. This realizes a gaming machine with a new entertainment characteristic which causes improved player's expectation.

Further, the present invention is as follows.

(12) Namely, a gaming machine of the present invention includes:

a symbol display device capable of scroll-displaying in symbol column display areas a plurality of symbol columns having a plurality of symbols;

a controller programmed to execute the following processes of:

(i1) on condition that a game medium is bet, running a base game which scroll-displays and then stop-displays a plurality of symbol columns in the symbol column display areas;

(i2) when the plurality of specific symbols are stop-displayed and form a predetermined combination in the base game run in (i1), starting a free game which runs without the need of fulfilling the condition and which scroll-displays and then stop-displays a plurality of symbol columns in the symbol column display areas;

(i3) when a wild symbol that can be substituted for another symbol is stop-displayed in a symbol column display area during the free game started in (i2), fix-displaying the wild symbol in a stop position where the wild symbol is stop-displayed. (i4) determining a payout taking into account the wild symbol stop-displayed in the stop position in (i3).

In the structure of (12), when a plurality of specific symbols are stop-displayed in the base game, the player is able to start a free game that requires no betting of game media. Every time a wild symbol substitutable for any other type of symbol is stop-displayed during the free game started, the wild symbol is fix-displayed in the stop position and is reflected in determining the payout based on the stopped symbols. As is understood from this, the free game is advantageous not only in that no betting is required, but also in that the player's expectation for the payout in the free game is enhanced every time the wild symbol substitutable for another symbol is stopped, because that wild symbol is fix-displayed in the same position. Thus, a gaming machine with a new entertainment characteristic is provided.

To date, there has been a gaming machine including a symbol display device having thereon a plurality of display blocks for variably displaying symbols, which are aligned to form a matrix of at least one row and one column, wherein a benefit is awarded to the player when a predetermined symbol is stop-displayed.

As an example of such a gaming machine, the specification of a U.S. Patent Application publication No. 2007/0066389 discloses a gaming machine in which, when a “WILD” symbol is stop-displayed in a display block, the symbol stop-displayed in an adjacent display block of the same column is replaced with the “WILD” symbol (i.e. the number of blocks displaying the “WILD” symbol is increased), and a payout is awarded based on the symbols of “WILD” displayed after the replacement.

This gaming machine automatically increases the number of blocks displaying the “WILD” symbol when the “WILD” symbol is stop-displayed, without a need of player’s operation.

The present invention on the other hand provides the following gaming machine which provides a player with an opportunity to operate in relation to increasing the number of blocks displaying the “WILD” symbol, thus making the player more interested in the game.

(13) Namely, a gaming machine of the present invention includes:

a symbol display device having a plurality of display blocks for variably displaying symbols, which blocks are aligned to form a matrix of at least one row and at least one column;

an input device that allows an input of an instruction related to a game;

a controller programmed to execute the following processes of:

(j1) running a base game which variably displays and then stop-displays the symbols and awards a payout according to a predetermined symbol combination formed by the symbols stop-displayed;

(j2) when the symbols stop-displayed in the base game run in (j1) includes a plurality of specific symbols, enabling the input device to accept an input related to selection of any of the specific symbols stop-displayed;

(j3) determining whether or not a specific symbol selected in (j2) is a symbol that causes an occurrence of an Expanded-Wild free game;

(j4) when it is determined in (j3) that the symbol is a symbol that causes an occurrence of the Expanded-Wild free game, running the Expanded-Wild free game a predetermined number of times, each of which game variably displays and stop-displays symbols and awards a payout based on a predetermined symbol combination formed by the stop-displayed symbols;

(j5) when a specific symbol is stop-displayed in the Expanded-Wild free game run in (j4), enabling the input device to accept an input related to the specific symbol stop-displayed;

(j6) when an input related to the specific symbol is received in (j5), having a wild symbol deemed as any of the other symbols replace the specific symbol and at least one of the symbols stop-displayed in display blocks of the same row or the same column;

(j7) awarding a payout according to a predetermined symbol combination based on one or more wild symbols resulting from the replacement of (j6) and the other symbols stop-displayed.

In the above structure (13), a plurality of specific symbols are stop-displayed in the base game, and in response to this, the player is able to select one of the plurality of specific symbols stop-displayed via the input device. When a specific symbol that causes an occurrence of the Expanded-Wild free game is selected, the Expanded-Wild free game is run a predetermined number of times. When a specific symbol is stop-displayed in this Expanded-Wild free game, the player is able to enter an input related to the stop-displayed specific symbol via the input device. When the player enters an input related to the stop-displayed specific symbol, a wild symbol which is deemed as any of the other symbols replaces the specific symbol and at least one of the symbols stop-displayed in display blocks of the same row or the same column. Then, a payout is awarded according to a predetermined symbol combination, based on one or more wild symbols resulting from the replacement and the other symbols stop-displayed. As is understood from the above, it is the player’s operation in response to which the wild symbol replaces the specific symbol and at least one of the symbols stop-displayed in a plurality of display blocks of the same row or the same column. This makes the game more attractive to the player.

Further, the present invention provides a gaming machine described as follows.

(14) Namely, the gaming machine described in the above (13) is adapted so that in (j6), when an input related to the specific symbol is received in (j5), having a wild symbol deemed as any of the other symbols replace the specific symbol and all of the symbols stop-displayed in display blocks of the same row or the same column.

In the above structure (14), the wild symbol replaces the specific symbol and all of the symbols stop-displayed in display blocks of the same row or the same column. Thus, there will be a large number of the wild symbols after the replacement, and the player will have greater expectation for the payout based on the wild symbols.

Further, the present invention provides a gaming machine structured as follows.

(15) Namely, a gaming machine of the present invention includes:

a symbol display device having a plurality of display blocks for variably displaying symbols, which blocks are aligned to form a matrix of at least one row and at least one column;

an input device that allows an input of an instruction related to a game;

a controller programmed to execute the following processes of:

(k1) running a base game which variably displays and then stop-displays the symbols and awards a payout according to a predetermined symbol combination formed by the symbols stop-displayed;

(k2) when the symbols stop-displayed in the base game run in (k1) includes a plurality of specific symbols, enabling the input device to accept an input related to selection of any of the specific symbols stop-displayed;

(k3) determining whether or not a specific symbol selected in (k2) is a symbol that causes an occurrence of an Expanded-Wild free game;

(k4) when it is determined in (k3) that the symbol is a symbol that causes an occurrence of the Expanded-Wild free game, running the Expanded-Wild free game a predetermined number of times, each of which game variably displays and stop-displays symbols and awards a payout based on a predetermined symbol combination formed by the stop-displayed symbols;

(k5) when a plurality of specific symbols are stop-displayed in the Expanded-Wild free game run in (k4), enabling the input device to accept an input related to selection of any of the plurality of specific symbols stop-displayed;

(k6) having a wild symbol deemed as any of the other symbols replace the specific symbol selected in (k5) and at least one of the symbols stop-displayed in display blocks of the same row or the same column; and (k7) awarding a payout according to a predetermined symbol combination formed by the wild symbols resulting from the replacement of (k6) and the other symbols stop-displayed.

In the above structure (15), a plurality of specific symbols are stop-displayed in the base game, and in response to this, the player is able to select one of the plurality of specific symbols stop-displayed via the input device. When a specific symbol that causes an occurrence of the Expanded-Wild free game is selected, the Expanded-Wild free game is run a predetermined number of times. when specific symbols are stop-displayed in the Expanded-Wild free game, the player is able to select any of the plurality of specific symbols stop-displayed via the input device. When the player selects any one of the plurality of specific symbols stop-displayed, a wild symbol deemed as any of the other symbols replaces the selected specific symbol and at least one of the symbols stop-displayed in display blocks of the same row or the same column. Then, a payout is awarded according to a predetermined symbol combination, based on the wild symbols resulting from the replacement and the other symbols stop-displayed. As is understood from the above, a wild symbol deemed as any of the other symbols replaces the specific symbol selected by the player and at least one of the symbols in the display blocks of the same row or the same column. This makes the game more attractive to the player.

Further, the present invention provides a gaming machine structured as follows.

(16) Namely, a gaming machine of the present invention includes:

a symbol display device capable of variably displaying a plurality of symbols;

a pick-up bonus game display device which displays a gaming situation of a pick-up bonus game which involves a player-selection of any of a plurality of selectable objects;

a special game display device which displays a gaming situation of a plurality of special games;

a special game storage device storing each of the special games in association with a selectable object that causes an occurrence of the special game;

a selectable object storage device storing an object selected by the player in the pick-up bonus game;

an input device that allows an input of an instruction related to a game;

a controller programmed to execute the following processes of:

(l1) running a base game which variably displays and then stop-displays the symbols and awards a payout according to a predetermined symbol combination formed by the symbols stop-displayed;

(l2) when the symbols stop-displayed in the base game run in (l1) includes a plurality of specific symbols, enabling the input device to accept an input related to selection of any of the specific symbols stop-displayed;

(l3) determining whether a specific symbol selected in (l2) is a symbol that causes an occurrence of the pick-up bonus game;

(l4) when it is determined in (l3) that the symbol selected is a symbol that causes an occurrence of the pick-up bonus game, displaying on the pick-up bonus game display device a plurality of selectable objects;

(l5) enabling the input device to accept an input of selection of any of a plurality of selectable objects displayed in (l4) on the pick-up bonus game display device;

(l6) when the object selected in (l5) is an object that causes an occurrence of the special game, storing the selectable object in the selectable object storage device;

(l7) repeating (l5) to (l6) until the object selected in (l5) is an object that causes that terminates the pick-up bonus game;

(l8) when the object selected in (l5) is an object that terminates the pick-up bonus game, referring to the special game storage device to run a special game corresponding to the selectable object stored in the selectable object storage device, and awarding a payout.

In the above structure (16), a plurality of specific symbols are stop-displayed in the base game, and in response to this, the player is able to select one of the plurality of specific symbols stop-displayed via the input device. Then, when a specific symbol that causes occurrence of the pick-up bonus game is selected, the pick-up bonus game is started, and the player is able to select any of a plurality of selectable objects. When the object selected is an object that triggers a special game, that object selected is stored in the selectable object storage device. When the pick-up bonus game is terminated, the special game corresponding to the object selected and stored in the selectable object storage device is run, and a payout is awarded. As is understood from this, the special game to be run after the pick-up bonus game varies depending on the object selected by the player in the pick-up bonus game. This way it is possible to attract player's attention to selection of the selectable object in the pick-up bonus game. As a result, the player is more interested in the game the player is playing.

Further, the present invention provides a gaming machine structured as follows.

(17) Namely, the gaming machine described in the above (16) is adapted so that the special game storage device stores a high payout special game configured to award more payout than the other special game, in association with a specific combination of the selectable objects that cause an occurrence of the special game.

the controller is programmed to execute the following steps of:

(l9) when the specific combination is stored in the selectable object storage device, running a high payout special game and awarding a payout.

In the above structure (17), when the objects selected by the player in the pick-up bonus game form a specific combination, the high payout special game configured to award more payout than the other special games is run. This makes the game even more attractive to players.

Further, the present invention provides a gaming machine structured as follows.

(18) Namely, the gaming machine described in the above (16) is adapted so that the controller is programmed to execute the following steps of:

(l11) awarding a payout when the selectable object storage device stores all the selectable objects respectively associated with the special games stored in the special game storage device.

In the above structure (18), a payout is awarded when the player selects all the selectable objects respectively associated with the special games stored in the special game storage device. This makes selecting of the selectable object in the pick-up bonus game more interesting for the player, thus making the game more attractive to the player.

Advantageous Effects

With the present invention, there is provided a gaming machine and a control method thereof having a new entertainment characteristics.

BRIEF DESCRIPTION OF THE DRAWINGS

FIG. 6 is a block diagram illustrating an internal configuration of the slot machine according to the first embodiment of the present invention.

FIG. 7 shows a base game symbol table according to the first embodiment of the present invention.

FIG. 27 (A) is a view showing a selection screen prompting selection of one little pig's noses displayed on the lower image display panel of the slot machine according to the first embodiment of the present invention.

FIG. 27 (B) shows a benefit table containing benefits associated with the little pig's noses to be selected in the pick-up bonus game process and the stick house stage.

FIG. 27 (C) shows a benefit table containing benefits associated with the little pig's noses to be selected in the brick house stage.

FIG. 33 shows a base game symbol table according to the second embodiment of the present invention.

FIG. 39 shows a symbol table for the credit determination game, according to the second embodiment of the present invention.

FIG. 47 shows an associated symbol table according to the second embodiment of the present invention.

FIG. 48 shows an item count table according to the second embodiment of the present invention.

FIG. 51 shows a free game symbol table according to the second embodiment of the present invention.

FIG. 55 shows a fixed-wild management table according to the second embodiment of the present invention.

FIG. 57 shows a base game symbol table of the slot machine according to the third embodiment of the present invention.

FIG. 62 shows a roulette payout table of the slot machine according to the third embodiment of the present invention.

REFERENCE NUMERALS

10 Slot Machine
70 Motherboard
71 Main CPU
72 ROM
73 RAM
114 Touch Panel
131 Upper Image Display Panel
141 Lower Image Display Panel
151 to 155 Video Reels

Description of the Preferred Embodiments

The following describes embodiments (first to third embodiments) of the present invention.

The first embodiment deals with the structures of (1) to (9) described in Summary of the Invention hereinabove. Similarly, the second embodiment deals with the structures of (10) to (12), and the third embodiment with the structures of (13) to (18).

[First Embodiment]

[Explanation of Function Flow Diagram]

Figure 2:
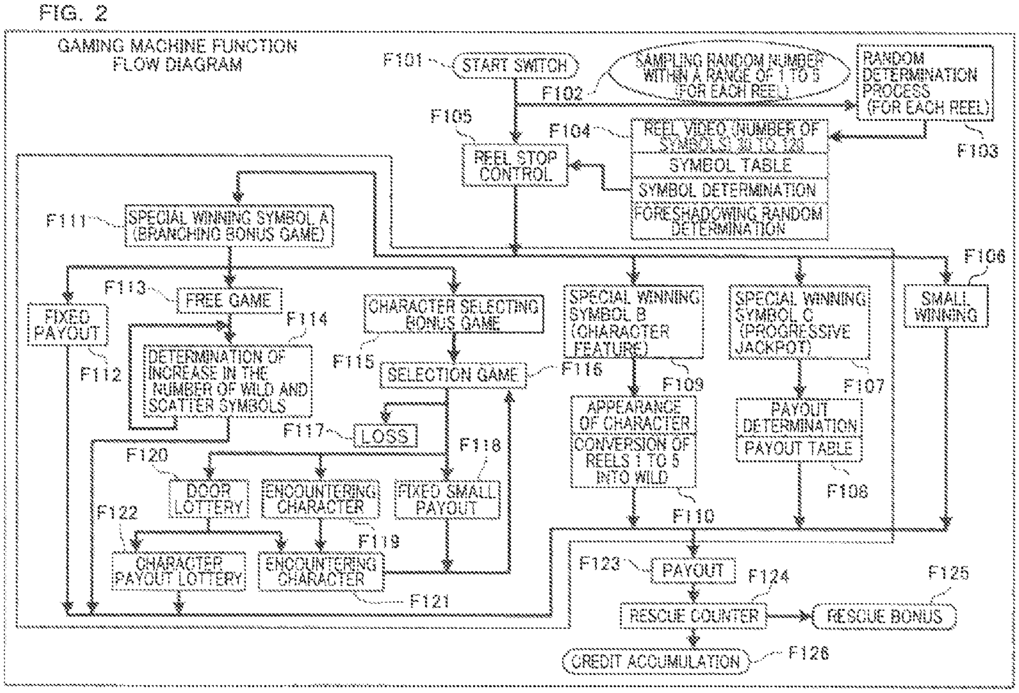
FIG. 2 is a view illustrating a function flow of the gaming machine according to the embodiment of the present invention.

The first embodiment deals with the structures of (1) to (9) described in Summary of the Invention hereinabove. With reference to FIG. 2, basic functions of a gaming machine according to the present invention are described. FIG. 2 is a view illustrating a function flow of the gaming machine according to an embodiment of the present invention.

(Start Switch)

First, the gaming machine executes a start switch process (F101). In the process of F101, the gaming machine checks if the bet button is pressed by a player, and if the start button 46 is subsequently pressed by the player.

(Symbol Determination)

When the start button 46 is pressed by the player, the gaming machine extracts a random number for symbol determination (F102, F103) and, for each of a plurality of video reels displayed on the display, refers to the symbol table to determine, symbols to be displayed to the player when scrolling of the symbol columns is stopped, while displaying the vide of rotating video reels (F104).

(Symbol Stop Control)

Next, the gaming machine executes a reel stop control to stop scrolling of the video reels in such a manner that the symbols determined in F104 are displayed to the player (F105).

(Winning Determination)

When scrolling of the symbol column of each video reel is stopped, the gaming machine determines whether or not a combination of symbols displayed for the player is a combination related to winning.

(Payout)

When the combination of symbols displayed for the player is a combination related to winning, the gaming machine awards a benefit according to the combination to the player.

For example, when the symbol combination relates to a "Small Winning" (F106), a payout based on the "Small Winning" is determined. Further, when the symbols stopped includes a Special Winning Symbol C and a progressive jackpot is won (F107), a payout is determined based on the progressive jackpot (F108). Further, when the symbols stopped includes a Special Winning Symbol B and a character feature is won (F109), a character appears and a game involving that character is provided (F110). Further, when the symbols stopped includes a Special Winning Symbol A and a branching bonus game is won (F111), a branching bonus game is provided to the player and the player is able to select one of selection buttons.

(Branching Bonus Game)

Next, the gaming machine determines whether or not the player has pressed a selection button of any one of the "fixed payout", the "free game" and the "character selecting bonus game". When the "fixed payout" is selected (F112), a payout based on the type of the "fixed payout" is determined. Further, when the "free game" is selected (F113), a free game is provided. For example, as the free game is run a game with an additional predetermined condition (F114), in which the random determination of the stop symbols is repeated a predetermined number of times. Further, when the "character selecting bonus game" is selected (F115), a plurality of options are displayed on the display, and the player is able to select one of the options (F116). If the player selects a "Loss" option (F117), the "character selecting bonus game" is terminated. Further, when the "Fixed Small Payout" is selected (F118), a payout is awarded according to the type of the "Fixed Small Payout" and the process returns to F116. When the "Encountering Character" is selected (F119), the process returns to F116. Further, when the "door lottery" is selected (F120), the lottery is carried out again. Then, when the "Encountering Character" is won (F121), the process returns to F116. When the "Character Payout Lottery" is won (F122), a payout is determined based on the type of the character.

(Payout Awarding)

A payout determine through F106, F108, F110, F112, F114, and F122 are awarded (F123).

(Rescue Bonus)

Next, the rescue counter process for executing a rescue bonus is executed (F124). The rescue bonus is a function provided for the purpose of salvaging a player when the bonus game is not run for a long period of time. When the rescue is active, the gaming machine 1 starts counting the number of games (F10). The gaming machine awards an amount for rescuing set as the rescue bonus (F125), when the number of games counts a previously determined number of times without a large amount of payout relating to a bonus game or the like.

Then, in response to awarding of the payout (F123) or the rescue bonus (F125), the credit is added and accumulated to the credit counter (F126). The function flow of the gaming machine of the present invention is described in the above.

[Outline of First Embodiment]

Figure 1:
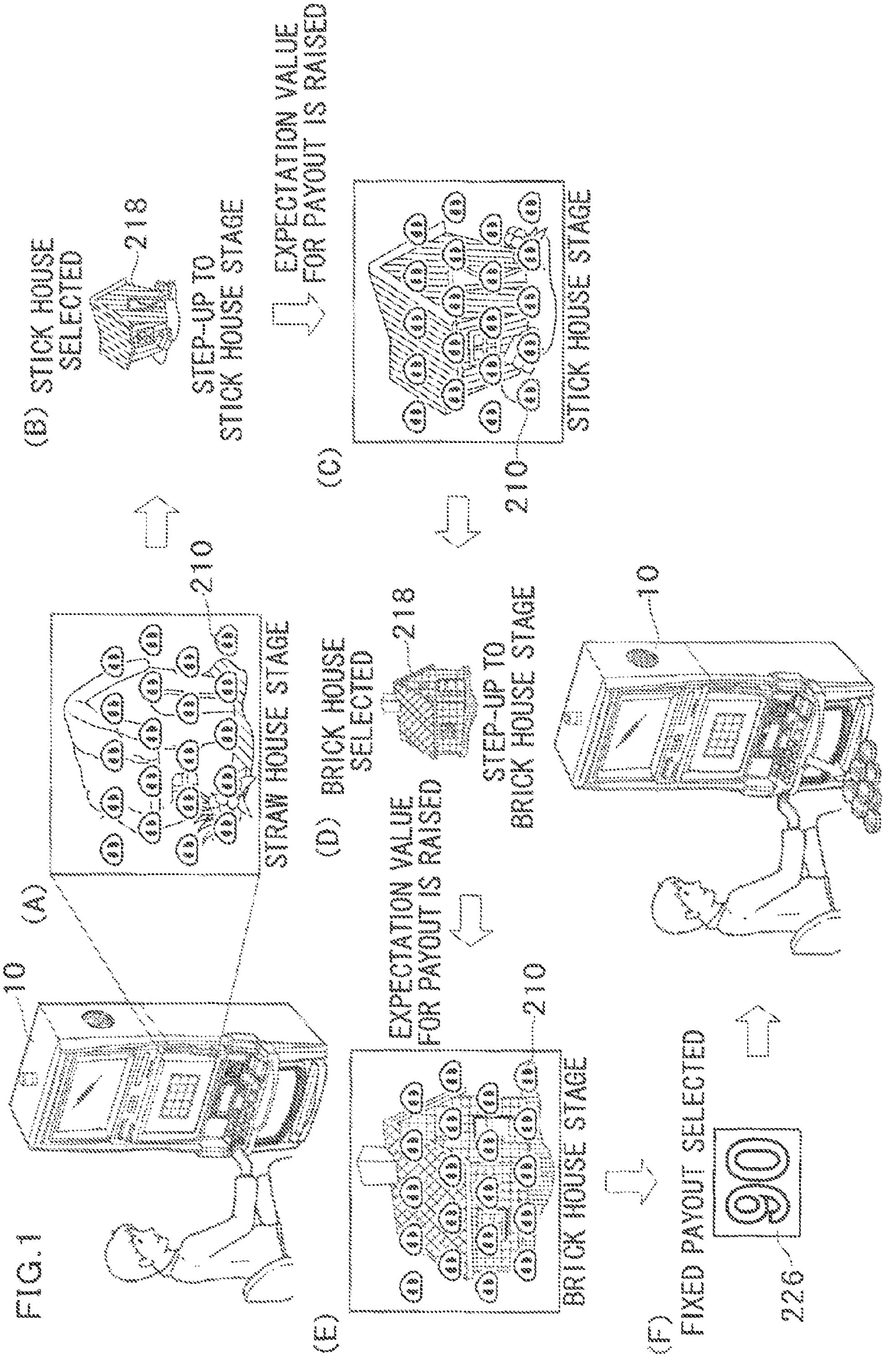
FIG. 1 is an explanatory diagram outlining a game in a slot machine of a first embodiment of the present invention.

Next, the following describes with reference to FIG. 1 the overview of a first embodiment in which a slot machine 10 is adopted as the gaming machine. FIG. 1 outlines a game in the slot machine according to the first embodiment of the present invention.

Figure 8:
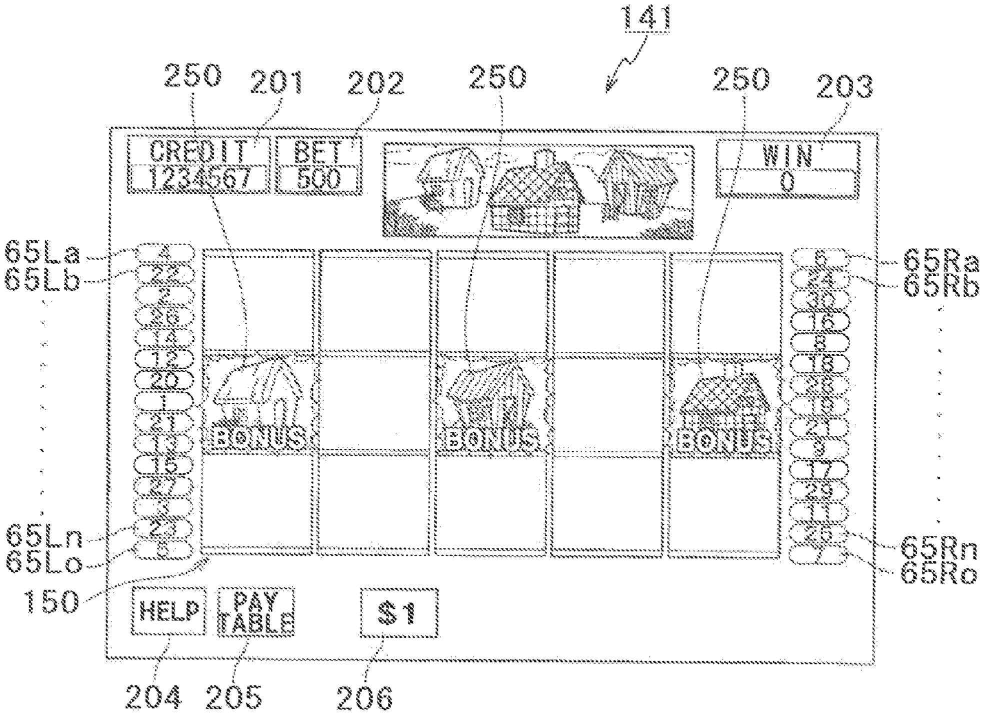
FIG. 8 shows pay lines displayed on a lower image display panel of the slot machine according to the first embodiment of the present invention.

The slot machine 10 (see FIG. 4) of the present embodiment runs a slot game. When three "BONUS" symbols 250 are stopped in the slot game, an entry of selection of one of the three "BONUS" symbols 250 is waited (FIG. 8). The game run when three "BONUS" symbols 250 are stopped is hereinafter referred to as Three Little Pigs bonus game. The three "BONUS" symbols 250 are associated with predetermined benefits (fixed payout, Piggy, Barrel and Wolf game or pick-up bonus game). A benefit (fixed payout, Piggy, Barrel and Wolf game, or pick-up bonus game) associated with the selected "BONUS" symbols 250 is awarded.

In the present embodiment, the slot machine 10 accepts an entry of selection of one of twenty little pig's noses 210 displayed, when the "BONUS" symbol 250 corresponding to the pick-up bonus game is selected (see FIG. 1(A)). Then, a benefit (fixed payout, mini game I, mini game II, step-up, progressive or the like) associated with the little pig's nose 210 is awarded. When the benefit awarded is "stick house" 218 which means a step-up (see FIG. 1(B)), a step-up to the stick house stage in which an expectation value for a payout is increased takes place. Thus, when one little pig's nose 210 is selected out of the twenty little pig's noses 210 displayed in the stick house stage, the payout amount of the benefit associated with the little pig's nose 210 is increased (see FIG. 1(C)). Further, when the benefit award here is a "brick house" 219 which means a step-up (see FIG. 1(D)), a step-up to the brick house stage in which an expectation value for a payout is increased takes place. Thus, when one little pig's nose 210 is selected out of the twenty little pig's noses 210 displayed in the brick house stage, the payout amount of the benefit associated with the little pig's nose 210 is increased (see FIG. 1(E)). For example, when the fixed payout is selected in the stick house stage, the payout awarded is "60" credit; however "90" credit is awarded as a payout when the fixed payout is selected in the brick house stage (see FIG. 1(F)).

[Overall Gaming System]

Figure 3:
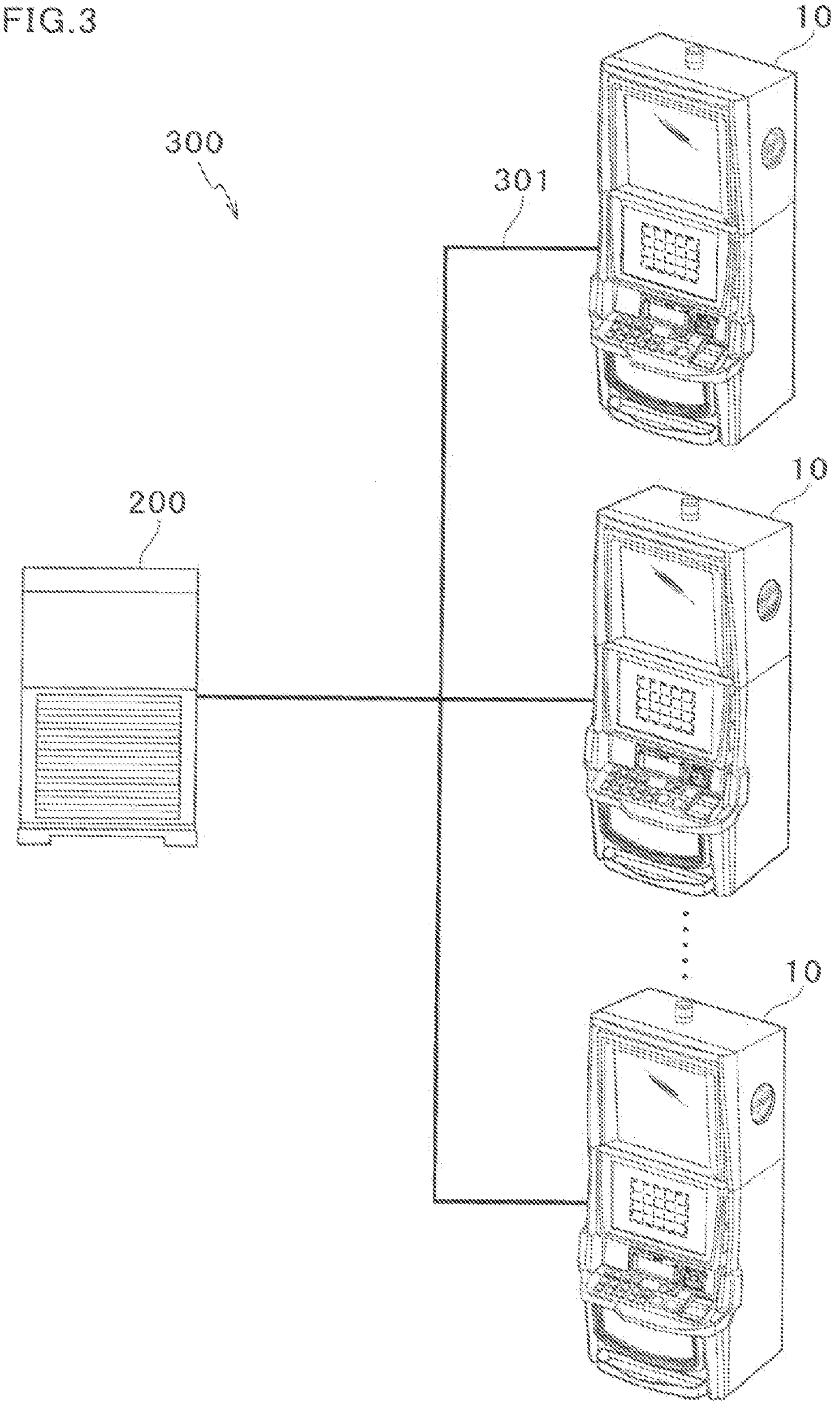
FIG. 3 is a view illustrating a gaming system including the slot machine according to the first embodiment of the present invention.
Figure 4:
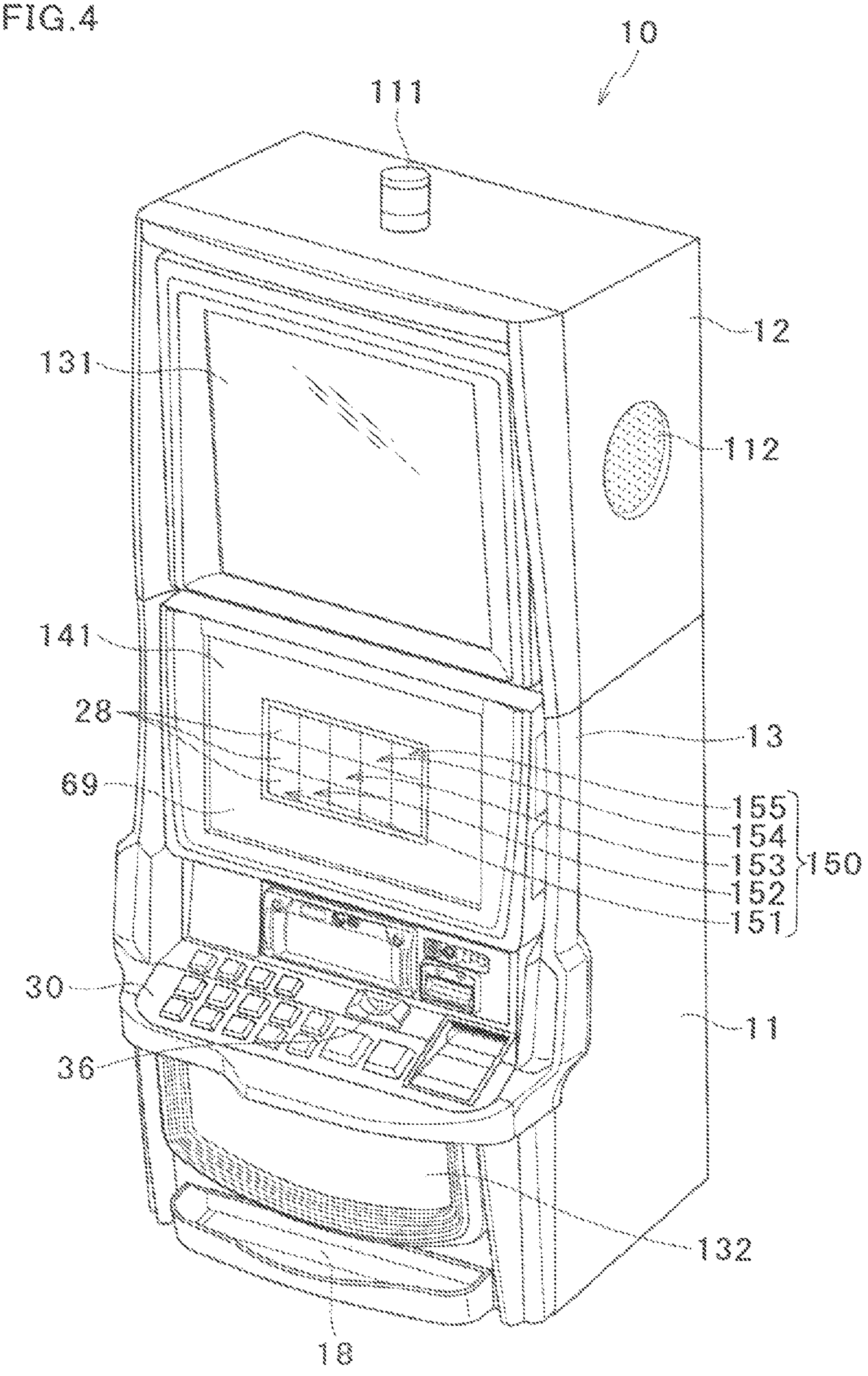
FIG. 4 is a view illustrating the overall configuration of the slot machine according to the first embodiment of the present invention.

Next, the following describes a gaming system 300 including the slot machine 10, with reference to FIG. 3. FIG. 4 is a view illustrating a gaming system 300 including the slot machine 10 according to the first embodiment of the present invention.

The gaming system 300 includes plural slot machines 10, and an external controller 200 connected to the slot machines 10 via a communication line 301.

The external controller 200 is for controlling the slot machines 10. In the present embodiment, the external controller 200 is a so-called hall server provided in a gaming facility having the slot machines 10. Each slot machine 10 is given a unique identification number. The external controller 200 identifies the source of data from any of the slot machines 10, by referring to this identification number. The identification number is also used for designating the transmission destination, when transmitting data from the external controller 200 to any slot machine 10. Further, the external controller 200 performs accumulation of the progressive based on the number of game media placed as a bet in each slot machine 10.

It is to be noted that the gaming system 300 may be constructed within a single gaming facility where various games can be conducted, such as a casino, or may be constructed among a plurality of gaming facilities. Further, when the gaming system 300 is constructed in a single game facility, the gaming system 300 may be constructed in each floor or section of the gaming facility. The communication line 301 may be a wired or wireless line, and can adopt a dedicated line, an exchange line or the like.

[Overall Structure of Slot Machine]

Figure 5:
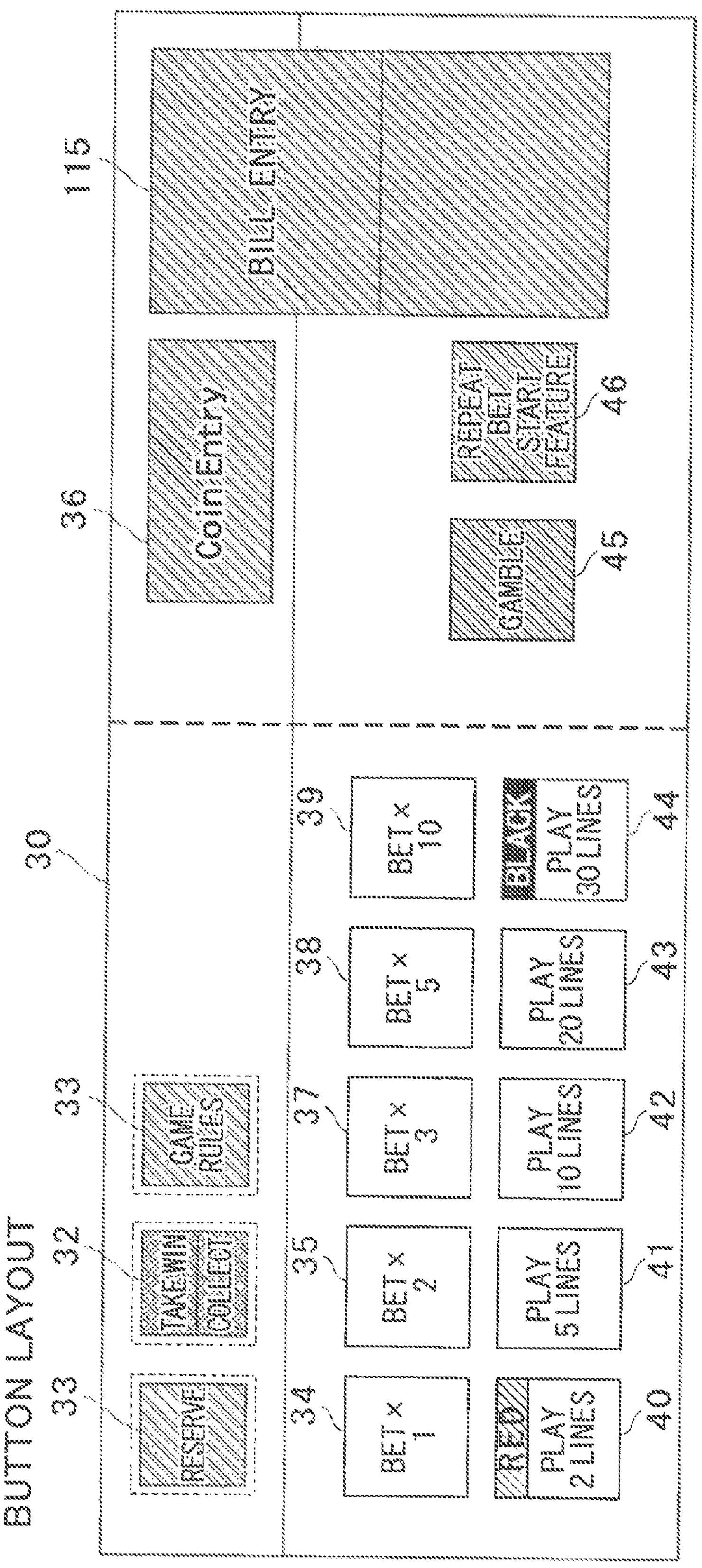
FIG. 5 shows a control panel of the slot machine according to the first embodiment of the present invention.

Now, the overall configuration of the slot machine 10 will be described with reference to FIG. 4 and FIG. 5. FIG. 4 is a view illustrating the overall configuration of the slot machine 10 according to the first embodiment of the present invention. FIG. 5 shows a control panel 30 of the slot machine 10 according to the first embodiment of the present invention.

A coin, a bill, or electronic information equivalent to these is used as a game medium in the slot machine 10. It is to be noted that the game medium is not limited to these, and for example a medal, a token, electronic money or the like can be adopted.

The slot machine 10 includes: a cabinet 11, a top box 12 provided above the cabinet 11, and a main door 13 provided on the front surface of the cabinet 11.

The main door 13 has a lower image display panel 141. The lower image display panel 141 is a touch panel formed of a transparent liquid crystal panel. A screen displayed on the lower image display panel 141 has a display window 150 at its center. The display window 150 includes twenty display blocks 28 which are arranged in five columns and three rows. The columns form video reels 151 to 155, each having three display blocks 28. The three display blocks 28 in each of the video reels 151 to 155 are displayed as if all the display blocks 28 are moving downward at various speed. This enables rearrangement which rotates symbols 501 respectively displayed in the display blocks 28 in a longitudinal direction and then stop the symbols 501 thereafter. In the present embodiment, a video reel depicts through videos the rotational and stop motions of a mechanical reel having a plurality of symbols drawn on the peripheral surface thereof. For each of the video reels 151 to 155, a symbol column having a plurality of symbols is assigned. The lower image display panel 141 corresponds to a symbol display device of the present invention.

In the display window 150, the symbol columns assigned to the respective video reels 151 to 155 are scrolled, and are stopped after a predetermined period. As a result, each symbol column displays a part of symbols thereof (three consecutive symbols in the present embodiment) to the player. For each of the video reels 151 to 155 the display window 150 displays one symbol in each of the three display blocks 28 that are the upper stage, the middle stage, and the lower stage. In short, the display window 150 displays fifteen symbols in total (five columns times three rows).

In the present embodiment, a line formed by selecting one of the aforementioned three regions for each of the video reels 151 to 155 and connecting the respective regions is referred to as a pay line. It is to be noted that any desired shape of the pay line can be adopted, and examples of the shape of the pay line may include a straight line formed by connecting the respective middle stages of the video reels 151 to 155, a V-shaped line, and a bent line. Further, the number of pay lines is thirty in the present embodiment; however, any given number of pay lines can be adopted.

Further, as illustrated in FIG. 8 the lower image display panel 141 displays a credit amount indicator 201, a bet amount display unit 202, a payout amount display unit 203, a Help display button 204, a pay table display button 205, a denomination display unit 206, and a payline occurrence part 65. The payline occurrence part 65L and payline occurrence part 65R forms a pair to form a pay line.

Further, the lower image display panel 141 has a touch panel 114. The player is able to input various instructions by touching the lower image display panel 141. Note that the touch panel 114 corresponds to the input device of the present invention.

As shown in FIG. 4 and FIG. 5, below the lower image display panel 141 are provided various buttons on the control panel 30, a coin entry 36 which guides coins into the cabinet 11, and a bill entry 115.

A reserve button 31 is used when a player temporarily leaves the seat or when a player asks a staff person of the gaming facility to exchange money. A collect button 32 is used when coins stored inside the slot machine 10 are paid out to the coin tray 18. A game rule button 33 is pressed when the operating method of a game is unclear. When the game rule button 33 is pressed, various types of help information are displayed on the upper image display panel 131 and the lower image display panel 141.

A 1-bet button 34 is a button whereby a credit amount of "1" out of the credit currently owned by the player is bet on each active pay line, every time the 1-bet button 34 is pressed. A 2-bet button 35 is pressed to start a game on condition that a credit amount of "2" is bet on each activated pay line. A 3-bet button 37 is pressed to start a game on condition that a credit amount of "3" is bet on each activated pay line. A 5-bet button 38 is pressed to start a game on condition that a credit amount of "5" is bet on each activated pay line. A 10-bet button 39 is pressed to start a game on condition that a credit amount of "10" is bet on each activated pay line. As such, the bet amount on each activated pay line is determined when one of the 1-bet button 34, the 2-bet button 35, the 3-bet button 37, the 5-bet button 38, or the 10-bet button 39 is pressed.

A play-2-line button 43 activates pay lines when pressed. In this case, the number of pay lines to be activated is two. A play-5-line button 41 activates pay lines when pressed. In this case, the number of pay lines to be activated is five. A play-10-line button 42 activates pay lines when pressed. In this case, the number of pay lines to be activated is ten. A play-20-line button 43 activates pay lines when pressed. In this case, the number of pay lines to be activated is twenty. A play-30-line button 44 activates pay lines when pressed. In this case, the number of pay lines to be activated is maximum (thirty).

Note that, in the present embodiment, a game is subject to rescue when the play-30-line button 44 is pressed. In other words, a game is subject to rescue when the game is played with the maximum number of the activated pay lines (i.e., thirty).

A gamble button 45 is pressed to, for example, shift to a gamble game after a free game. This gamble game is played by using obtained credit.

A start button 46 is used to start the scroll of symbols. This start button 46 is also used to start a free game and to add a payout obtained in a free game to the credit.

The coin entry 36 guides coins into the cabinet 11. The bill entry 115 is for validating the legitimacy of a bill input, and takes into the cabinet 11 a bill recognized as legitimate. On a lower front surface of the main door 13, that is, below the control panel 30, a belly glass 132 on which a character of the slot machine 10 or the like is drawn and a coin tray 18 receiving coins paid out from the cabinet 11 are provided.

An upper image display panel 131 is provided at the front face of the top box 12. The upper image display panel 131 includes a liquid crystal panel, and forms the display. The upper image display panel 131 displays images related to effects and images showing introduction of the game contents and explanation of the game rules. Further, the top box 12 is provided with a speaker 112 and a lamp 111. The slot machine 10 produces effects by displaying images, outputting sounds, and outputting the light. Further, the upper image display panel 131 displays the current progressive amount.

[Symbol Column]

Next, with reference to FIG. 7, a configuration of the symbol columns included in the video reels 151 to 155 of the slot machine 10 is described. FIG. 7 shows a base game symbol table of the first embodiment.

The base game symbol table shows arrangements of symbols displayed on the video reels. A first video reel 151, a second video reel 152, a third video reel 153, a fourth video reel 154, and a fifth video reel 155 are associated with symbol columns, respectively. Each symbol column has 22 symbols corresponding to code numbers from "00" to "21" respectively.

There are various symbols related to a fairy-tale "Three Little Pigs", and those symbols include: "Straw", "Wood Plate", "Brick", "Turnip", "Soup", "Apple", "Barrel", "Grandma", "Chimney", "WILD", "FREE GAME", and "BONUS".

[Circuit Structure of Gaming Machine]

Next, with reference to FIG. 6, a configuration of a circuit included in the slot machine 10 is described. FIG. 6 is a block diagram illustrating an internal structure of the slot machine 10 according to the first embodiment of the present invention.

A gaming board 50 is provided with: a CPU 51, a ROM 52, and a boot ROM 53, which are mutually connected by an internal bus; a card slot 55 corresponding to a memory card 54; and an IC socket 57 corresponding to a GAL (Generic Array Logic) 56.

The memory card 54 includes a non-volatile memory, and stores a game program and a game system program. The game program includes a program related to game progression, a random determination program, and a program for producing effects by images and sounds. Further, the aforementioned game program includes data (see FIG. 7) specifying the configuration of the symbol column assigned to each video reel 151 to 155.

The random determination program is a program for randomly determining to-be-stopped symbol of each video reel 151 to 155. The to-be-stopped symbol is data for determining three symbols to be displayed to the display window 150 out of the 22 symbols forming each symbol column. The slot machine 10 of the present embodiment determines as the to-be-stopped symbol the symbol to be displayed in a predetermined area (e.g. the upper area) out of the three areas provided for each of the video reels 151 to 155 of the display window 150.

The aforementioned random determination program includes symbol determination data. The symbol determination data is data that regulates random numbers so that each of the 22 symbols (code numbers from "00" to "21") forming the symbol column is determined at an equal probability for each video reel 151 to 155. The respective probabilities of the 22 symbols being determined are basically equal. However, the numbers of the respective types of symbols included in the 22 symbols vary, and thus the probabilities of the respective types of symbols being determined vary (i.e. different weights on the probabilities are generated).

It is to be noted that, although the data specifies that the equal numbers of symbols be provided to form the symbol columns of the respective video reels 151 to 155 in the present embodiment, different numbers of symbols may form the video reels 151 to 155, respectively. For example, the symbol column of the first video reel 151 may have 22 symbols whereas the symbol column of the second video reel 152 may have 30 symbols. Such a configuration increases the degree of freedom in setting the probabilities of the respective types of symbols being determined for each video reel 151 to 155.

Further, the card slot 55 is configured so that the memory card 54 can be inserted thereinto and removed therefrom, and is connected to a motherboard 70 by an IDE bus.

The GAL 56 is a type of PLD (Programmable Logic Device) having a fixed OR array structure. The GAL 56 is provided with a plurality of input ports and output ports, and predetermined input into the input port causes output of the corresponding data from the output port.

Further, the IC socket 57 is configured so that the GAL 56 can be inserted thereinto and removed therefrom, and is connected to the motherboard 70 by a PCI bus. The contents of the game to be played on the slot machine 10 can be changed by replacing the memory card 54 with another memory card 54 having another program written therein or by rewriting the program written into the memory card 54 as another program.

The CPU 51, the ROM 52 and the boot ROM 53 mutually connected by the internal bus are connected to the motherboard 70 by a PCI bus. The PCI bus enables a signal transmission between the motherboard 70 and the gaming board 50, and power supply from the motherboard 70 to the gaming board 50.

The ROM 52 stores an authentication program. The boot ROM 53 stores a pre-authentication program, a program (boot code) to be used by the CPU 51 for activating the pre-authentication program, and the like. The authentication program is a program (falsification check program) for authenticating the game program and the game system program. The pre-authentication program is a program for authenticating the aforementioned authentication program. The authentication program and the pre-authentication program are written along a procedure (authentication procedure) for proving that the program to be the subject has not been falsified.

The motherboard 70 is provided with a main CPU 71, a ROM 72, a RAM 73, and a communication interface 82. The motherboard 70 corresponds to the controller of the present invention. In the present embodiment, a single CPU (the main CPU 71) structures a controller. However, the controller of the present invention may be structured by a plurality of CPUs.

The ROM 72 includes a memory device such as a flash memory, and stores a program such as BIOS to be performed by the main CPU 71, and permanent data. When the BIOS is performed by the main CPU 71, a process for initializing predetermined peripheral devices is performed. further, through the gaming board 50, processing of loading the game program and the game system program stored in the memory card 54 is started. The ROM 72 stores a table such as a later-mentioned benefit table which is referred to during a game.

The RAM 73 stores data and programs which are used in operation of the main CPU 71. For example, when the processing of loading the aforementioned game program, game system program or authentication program is conducted, the RAM 73 can store the program. The RAM 73 is provided with working areas used for operations in execution of these programs. Examples of the areas include: an area that stores the number of games, the an amount of bet, the amount of payout, the amount of credit and the like; and an area that stores symbols (code numbers) determined by lottery. In other words, the RAM 73 functions as a rescue game number counter which counts the number of games before a payout is triggered as a result of rescue. Further, the RAM 73 stores various sound effects to be used in the slot machine 10. That is, the RAM 73 corresponds to the sound effect storage device.

The communication interface 82 is for communicating with the external controller 200 such as a server, through the communication line 301. Further, the motherboard 70 is connected with a later-described door PCB (Printed Circuit Board) 90 and a body PCB 110 by respective USBs.

The motherboard 70 is also connected with a power supply unit 81. When the power is supplied from the power supply unit 81 to the motherboard 70, the main CPU 71 of the motherboard 70 is activated, and then the power is supplied to the gaming board 50 through the PCI bus so as to activate the CPU 51.

The door PCB 90 and the body PCB 110 are connected with input devices such as a switch and a sensor, and peripheral devices the operations of which are controlled by the main CPU 71. The door PCB 90 is connected with a control panel 30, a reverter 91, a coin counter 92C and a cold cathode tube 93.

The control panel 30 has the following switches corresponding to the aforesaid buttons, respectively: a reserve switch 31S, a collect switch 32S, a game rule switch 33S, a 1-bet switch 34S, a 2-bet switch 35S, a 3-bet switch 37S, a 5-bet switch 38S, a 10-bet switch 39S, a play-2-line switch 40S, a play-5-line switch 41S, a play-10-line switch 42S, a play-20-line switch 43S, a play-30-line switch 44S, a gamble switch 45S, and a start switch 46S. Each of the switches outputs a signal to the main CPU 71 upon detection of press of the button corresponding thereto by the player.

Inside the coin entry 36 is provided a reverter 91 and a coin counter 92C. The reverter 91 validates the legitimacy of coins inserted into the coin entry 36, and discharges those not determined as legitimate coins to the coin tray 18. The coin counter 92C detects the received legitimate coins and counts the number of these coins.

The cold cathode tube 93 functions as a backlight installed on the rear face sides of the upper image display panel 131 and the lower image display panel 141, and lights up based on a control signal outputted from the main CPU 71.

The body PCB 110 is connected with the lamp 111, the speaker 112, the hopper 113, a coin detecting portion 113S, the touch panel 114, the bill entry 115, a graphic board 130, the ticket printer 171, the card reader 172, a key switch 173S and the data display 174.

The lamp 111 flashes based on a control signal output from the main CPU 71. The speaker 112 outputs sounds such as BGM, based on a control signal outputted from the main CPU 71.

The hopper 113 pays out a specified number of coins to the coin tray 18, based on a control signal output from the main CPU 71. The coin detecting portion 113S outputs a signal to the main CPU 71 upon detection of coins paid out by the hopper 113.

The touch panel 114 detects a place on the lower image display panel 141 touched by the player's finger or the like, and outputs to the main CPU 71 a signal corresponding to the detected place. The bill entry 115 outputs, when receiving a legitimate bill, a signal corresponding to the value of the bill to the main CPU 71.

The graphic board 130 controls display of images performed by the respective upper image display panel 131 and lower image display panel 141, based on a control signal outputted from the main CPU 71. The display window 150 of the lower image display panel 141 displays the five video reels 151 to 155 by which the scrolling and stop motions of the symbol columns included in the respective video reels 151 to 155 are displayed. The graphic board 130 is provided with a VDP generating image data, a video RAM temporarily storing the image data generated by the VDP, and the like. The credit amount indicator 201 of the lower image display panel 141 displays the amount of credit stored in the RAM 73. The payout amount display unit 143 of the lower image display panel 141 displays the amount of coins paid out.

The graphic board 130 is provided with the VDP (Video Display Processor) generating image data based on a control signal outputted from the main CPU 71, the video RAM temporarily storing the image data generated by the VDP, and the like. It is to be noted that the image data used in generation of image data by the VDP is included in the game program that has been read from the memory card 54 and stored into the RAM 73.

[Pay Line]

Next, the following describes pay lines with reference to FIG. 8. FIG. 8 shows pay lines displayed on the lower image display panel 141 of the slot machine 10 according to the first embodiment of the present invention.

On the left of the lower image display panel 141 are 15 payline occurrence parts 65L (65La to 65Lo), as illustrated in FIG. 8. Similarly, on the other hand, 15 payline occurrence parts 65R (65Ra to 65Ro) are arranged on the right of the lower image display panel 141.

Each payline occurrence part 65L is paired with one of the payline occurrence parts 65R. pay lines (pay lines L) are prescribed, each extending from one of the payline occurrence parts 65L to one of the payline occurrence parts 65R which are paired with each other. The present embodiment deals with a case of having 30 prescribed pay lines. Further, in the present embodiment, a winning is achieved when three or more of at least one of the following types of symbols are rearranged on a single pay line: "Straw", "Wood Plate", "Brick", "Turnip", "Soup", "Apple", "Barrel", "Grandma", and "Chimney". The "WILD" symbol 182 is a symbol (wild symbol) substitutable for any type of symbol in a base game. That is, when two "Straw" symbols and one "WILD" symbol 182 are displayed along a single pay line, it is deemed that three "Straw" symbols are arranged on the pay line, and a winning is resulted.

Further, when three "FREE GAME" symbols each serving as a free game trigger symbol are rearranged on the display window 150, a "free game" is awarded. Further, three "BONUS" symbols serving as a Three Little Pigs bonus game trigger symbol are rearranged on the display window 150, the "Three Little Pigs bonus game" is awarded.

Note that FIG. 8 also shows the lower image display panel 141 displaying the credit amount indicator 201, the bet amount display unit 202, the payout amount display unit 203, the Help display button 204, the pay table display button 205, the denomination display unit 206, and the payline occurrence part 65.

[Contents of Program]

Next, with reference to FIGS. 9 to 31, the program to be executed by the slot machine 10 is described.

<Main Control Process>

Figure 9:
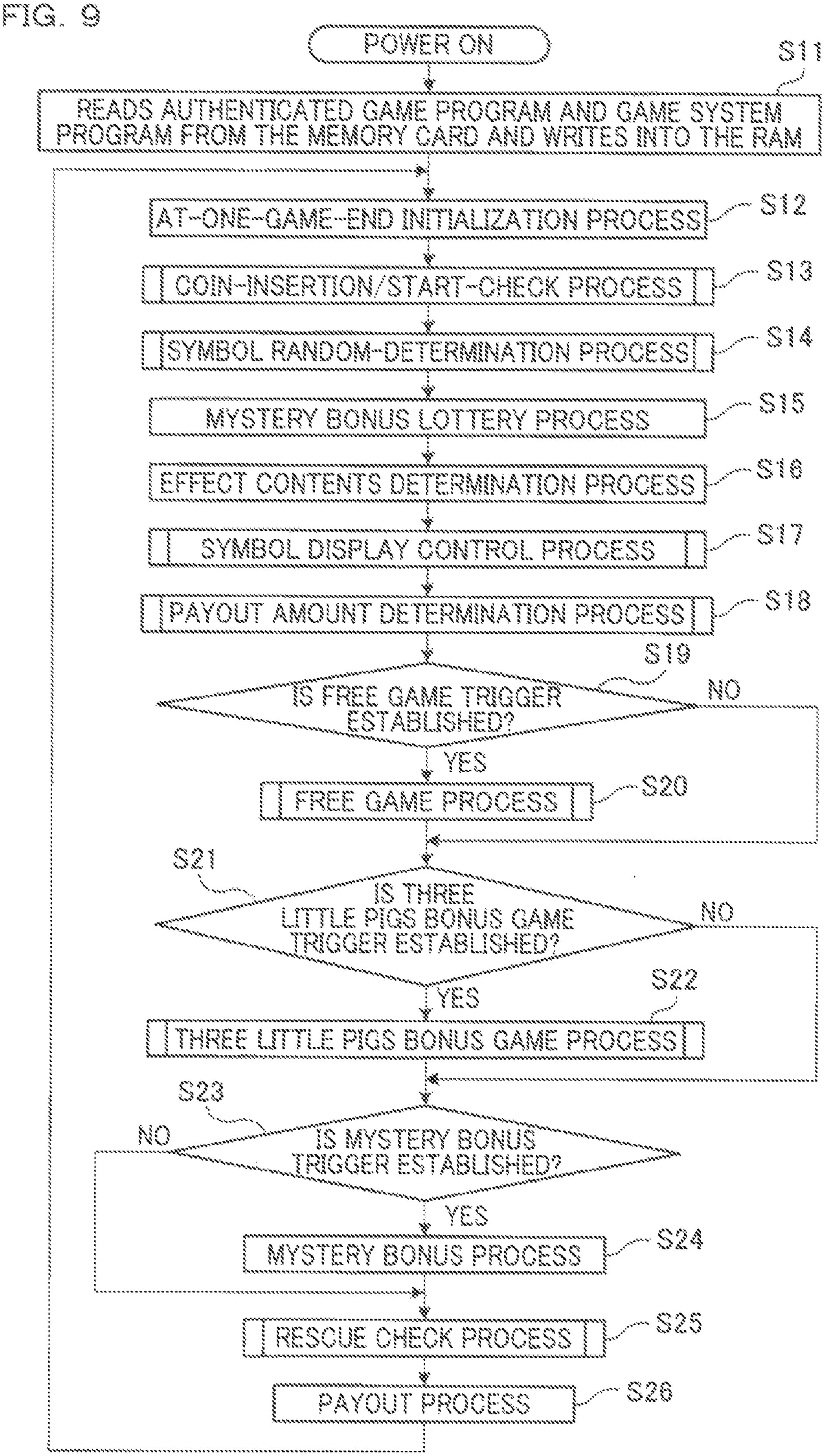
FIG. 9 is a view illustrating a flowchart of the main control process in the slot machine according to the first embodiment of the present invention.
Figure 10:
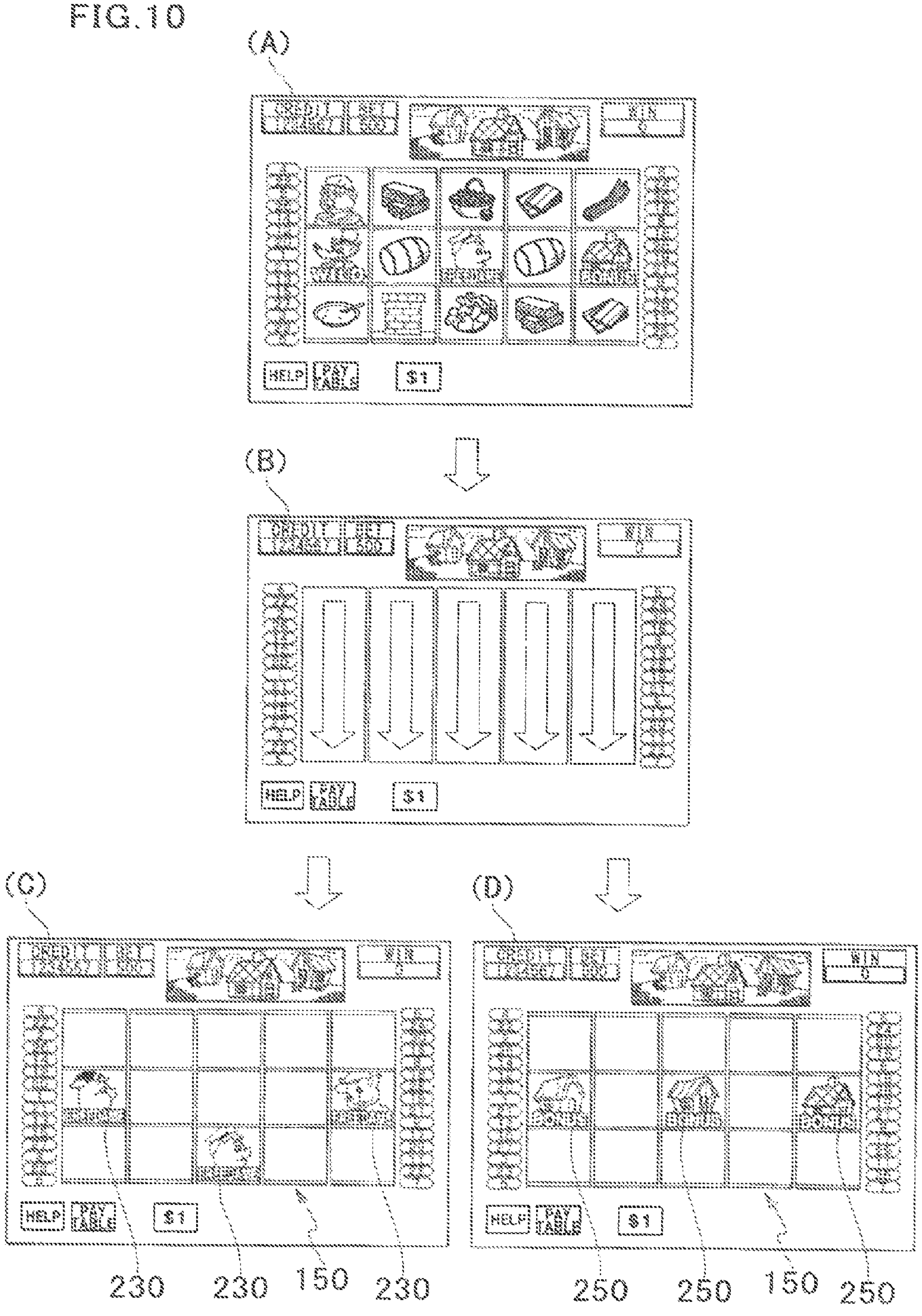
FIG. 10 shows an exemplary image displayed on the lower image display panel of the slot machine according to the first embodiment of the present invention.

First, with reference to FIG. 9 and FIG. 10, a main control process is described. FIG. 9 is a view illustrating a flowchart of the main control process in the slot machine 10 according to the first embodiment of the present invention. FIG. 10 shows an exemplary image displayed on the lower image display panel of the slot machine 10 of the first embodiment, according to the present invention.

First, when the power is supplied to the slot machine 10, the main CPU 71 reads the authenticated game program and game system program from the memory card 54 through the gaming board 50, and writes the programs into the RAM 73 (step S11).

Next, the main CPU 71 executes an at-one-game-end initialization process (step S12). For example, data that becomes unnecessary after each game in the working areas of the RAM 73, such as the amount of bet and the symbols randomly determined, is cleared.

Next, the main CPU 71 performs a coin-insertion/start-check process which is described later with reference to FIG. 11 (step S13). In the process, input from the bet switch and the spin switch is checked.

The main CPU 71 then executes symbol random-determination process which is described later with reference to FIG. 14 (step S14). In the process, to-be-stopped symbols are determined based on the random numbers for symbol determination.

Next, the main CPU 71 performs a mystery bonus lottery process (step S15). In the processing, whether to establish a mystery bonus trigger is randomly determined. For example, the main CPU 71 extracts a random number for mystery bonus from the numbers in a range of "0 to 99", and establishes the mystery bonus trigger when the extracted random number is "0".

The main CPU 71 performs an effect contents determination process (step S16). The main CPU 71 extracts a random number for effect, and determines any of the effect contents from the preset plurality of effect contents by lottery.

The main CPU 71 then executes symbol display control process which is described later with reference to FIG. 15 (step S17). In the processing, scrolling of the symbol column of each video reel 151 to 155 is started, and the to-be-stopped symbol determined in the symbol random-determination process of S14 is stopped at a predetermined position (e.g. the upper area in the display window 150). That is, three symbols including the to-be-stopped symbol are displayed in the display window 150. For example, when the to-be-stopped symbol is the symbol associated with the code number of "10" and it is to be displayed to the upper area, the symbols associated with the respective code numbers of "11" and "12" are to be displayed to the middle stage and the lower stage in the display window 150.

Next, the main CPU 71 executes a payout amount determination process which is described later with reference to FIG. 16 (step S18). In the processing, the amount of payout is determined based on the combination of symbols displayed along the pay line, and is stored into a payout amount storage area provided in the RAM 73.

The main CPU 71 then determines whether or not the free game trigger has been established (step S19). As show in FIG. 10, the trigger of the free game of the present embodiment is established when three "FREE GAME" symbols 230 (see FIG. 10(C)) are stopped in the display window 150. When the main CPU 71 determines that the free game trigger has been established, the main CPU 71 executes a free game process which is described later with reference to FIG. 19 (step S20).

The main CPU 71 then determines whether or not a Three Little Pigs bonus game trigger has been established (step S21). As shown in FIG. 10, the Three Little Pigs bonus game trigger of the present embodiment is established when three "BONUS" symbols 250 (see FIG. 10(D)) are stopped in the display window 150. When the main CPU 71 determines that the Three Little Pigs bonus game trigger has been established, the main CPU 71 executes a Three Little Pigs bonus game process which is described later with reference to FIG. 21 (step S22).

After S22 or when determining in step S21 that the Three Little Pigs bonus game bonus game trigger has not been established, the main CPU 71 determines whether or not the mystery bonus trigger is established (step S23). When determining that the mystery bonus trigger has been established, the main CPU 71 executes the mystery bonus process (step S24). In the process, the number of payouts (e.g. 300) being set for the mystery bonus is stored into the payout amount storage area provided in the RAM 73.

After the processing of S24 or when determining in S23 that the mystery bonus trigger has not been established, the main CPU 71 executes rescue check process which is described later with reference to FIG. 17 (S24). In the processing, whether or not to conduct payout by the rescue is checked.

The main CPU 71 performs a payout process (step S26). The main CPU 71 adds the value stored in the payout amount storage area to a value stored in a credit amount storage area provided in the RAM 73. It is to be noted that operations of the hopper 113 may be controlled based on input from the collect switch 32S, and coins of the number corresponding to the value of the payout amount stored in the payout amount storage area may be discharged to the coin tray 18. After the processing has been conducted, the processing is shifted to step S12.

The game run through the processes of S12 to S18 in the main control process corresponds to the base game of the present invention.

<Coin-Insertion/Start-Check Process>

Figure 11:
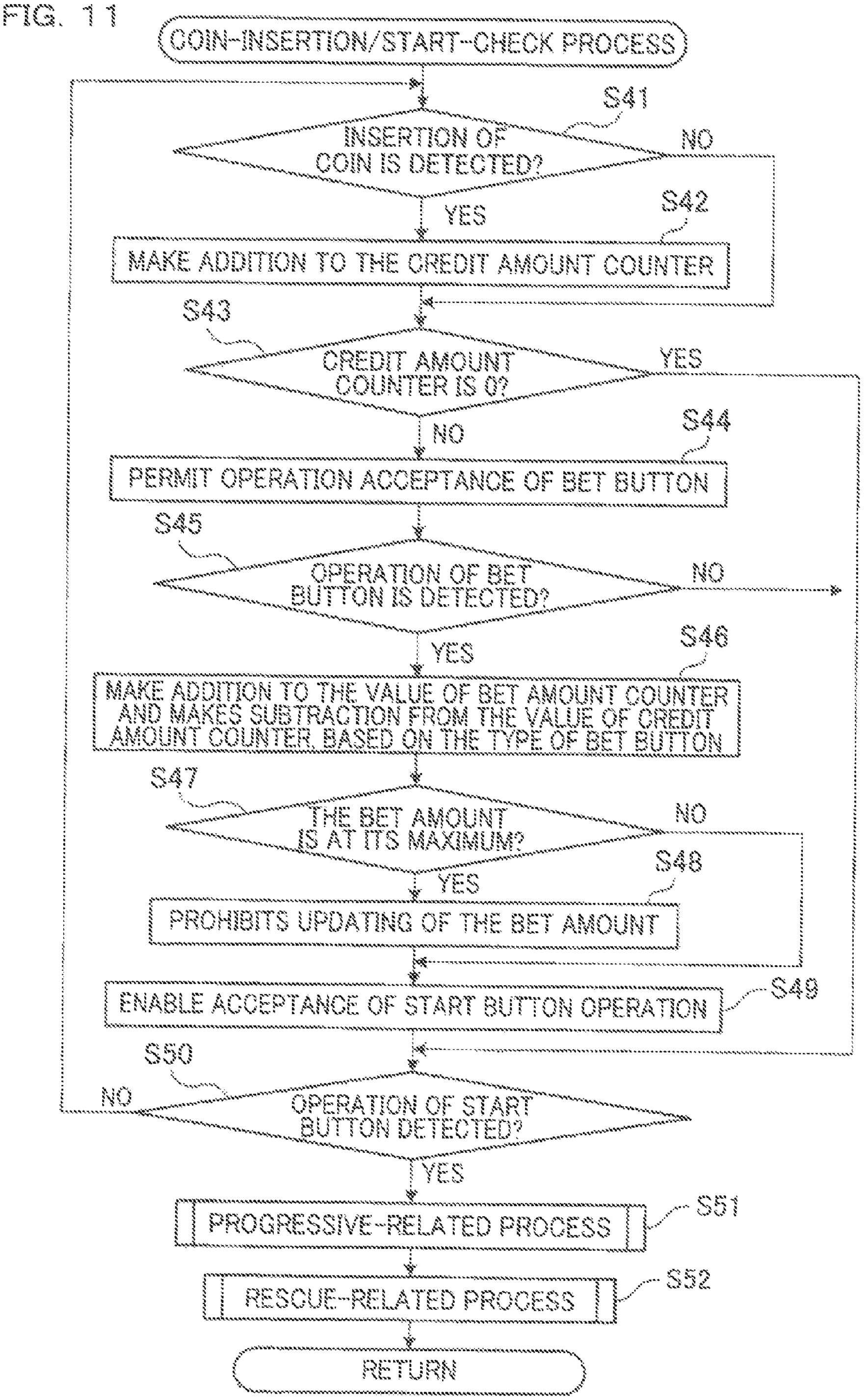
FIG. 11 is a view illustrating a flowchart of the coin-insertion/start-check process in the slot machine according to the first embodiment of the present invention.

Next, with reference to FIG. 11, a coin-insertion/start-check process is described. FIG. 11 is a view illustrating a flowchart of the coin-insertion/start-check process in the slot machine 10 according to the first embodiment of the present invention.

First, the main CPU 71 determines whether or not insertion of a coin has been detected by the coin counter 92C (step S41). When determining that the insertion of a coin has been detected by the coin counter 92C, the main CPU 71 makes an addition to the value stored in the credit amount storage area (step S42). It is to be noted that, in addition to the insertion of a coin, the main CPU 71 may determine whether or not insertion of a bill has been detected by the bill entry 115, and when determining that the insertion of a bill has been detected, the main CPU 71 may add a value according to the bill to the value stored in the credit amount storage area.

After step S42 or when determining in step S41 that the insertion of a coin has not been detected, the main CPU 71 determines whether or not the value stored in the credit amount storage area is zero (step S43). When the main CPU 71 determines that the value stored in the credit amount storage area is not zero, the main CPU 71 permits operation acceptance of the bet buttons (step S44).

Next, the main CPU 71 determines whether or not an operation of a bet button (1-bet button 34, 2-bet button 35, 3-bet button 37, 5-bet button 38, 10-bet button 39) has been detected (step S45). When a bet switch (1-bet switch 34S, 2-bet switch 35S, 3-bet switch 37S, 5-bet switch 38S, 10-bet switch 39S) has detected an operation of the bet button by the player, the main CPU 71 makes an addition to a value stored in a bet amount storage area provided in the RAM 73 and makes a subtraction from the value stored in the credit amount storage area, based on the type of the bet button (step S46).

The main CPU 71 then determines whether or not the value stored in the bet amount storage area is at its maximum (step S47). When the main CPU 71 determines that the value stored in the bet amount storage area is at its maximum, the main CPU 71 prohibits updating of the value stored in the bet amount storage area (step S48). After step S48 or when determining in step S47 that the value stored in the bet amount storage area is not at its maximum, the main CPU 71 permits operation acceptance of the start button 46 (step S49).

After step S49 or when determining in step S45 that the operation of any of the bet buttons has not been detected, or when determining in step S43 that the value stored in the credit amount storage area is zero, the main CPU 71 determines whether or not operation of the start button 46 has been detected (step S50). When the main CPU 71 determines that the operation of the start button 46 has not been detected, the process shifts to S41.

When the main CPU 71 determines that the operation of the start button 46 has been detected, the main CPU 71 executes progressive-related process which is described later with reference to FIG. 12 (step S51). In the processing, the amount to be accumulated to the amount of progressive prize is calculated, and the amount is transmitted to the external controller 200.

Next, the main CPU 71 executes rescue-related process which is described later with reference to FIG. 13 (S52). In the processing, counting of the number of games is conducted which triggers a payout by the rescue. After the processing has been conducted, the coin-insertion/start-check process is completed.

<Progressive-Related Process>

Figure 12:
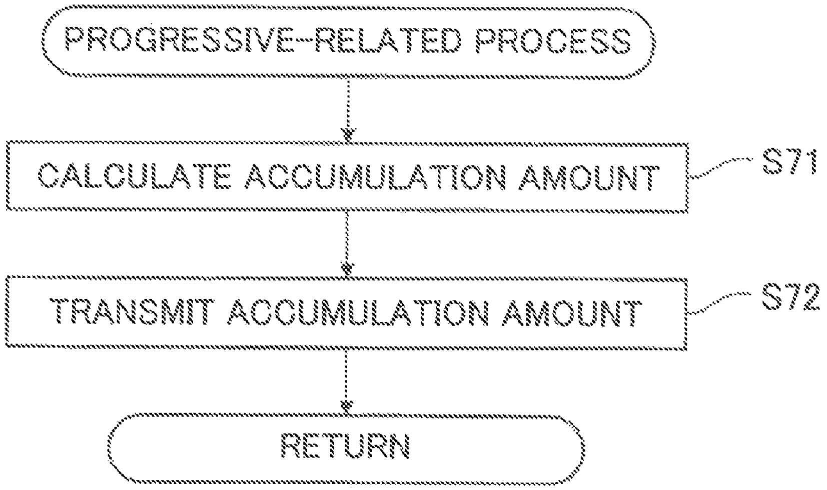
FIG. 12 is a view illustrating a flowchart of the progressive-related process in the slot machine according to the first embodiment of the present invention.

Next, the following describes with reference to FIG. 12 a progressive-related process. FIG. 12 is a view illustrating a flowchart of the progressive-related process in the slot machine 10 according to the first embodiment of the present invention.

First, the main CPU 71 calculates the amount for accumulation (step S71). The main CPU 71 obtains the product of the value stored in the bet amount storage area and a preset accumulation ratio, so that the amount for accumulation to the amount of progressive prize is calculated.

Next, the main CPU 71 transmits the calculated amount for accumulation to the external controller 200 (step S72). Upon reception of the amount for accumulation, the external controller 200 updates the amount of progressive prize. After the processing has been conducted, the progressive-related process is completed.

<Rescue-Related Process>

Figure 13:
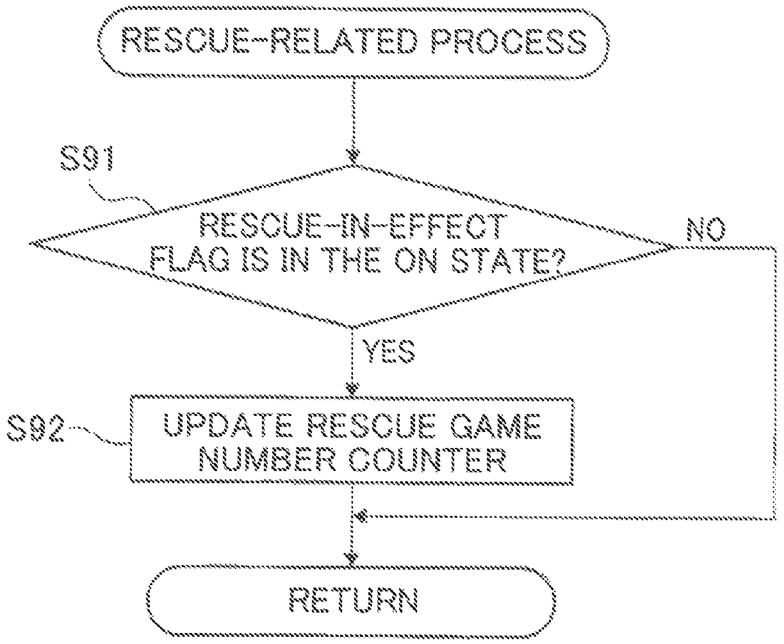
FIG. 13 is a view illustrating a flowchart of a rescue-related process in the slot machine according to the first embodiment of the present invention.

Next, with reference to FIG. 13, the rescue-related process is described. FIG. 13 is a view illustrating a flowchart of the rescue-related process in the slot machine 10 according to the first embodiment of the present invention.

First, the main CPU 71 determines whether or not a rescue-in-effect flag is turned on (step S91). The rescue-in-effect flag set to the on-state upon input of an instruction to activate rescue mode by the player in the rescue selection process described later with reference to FIG. 18. Specifically, a game is subject to rescue when the player presses a play-30-line button 44. That is, when a game is played with the maximum number of activated pay lines (i.e. "30" active pay lines), the rescue-in-effect flag is set to the on-state.

When the main CPU 71 determines that the rescue-in-effect flag is not in the on-state, the main CPU 71 completes the rescue-related process. On the other hand, when the main CPU 71 determines that the rescue-in-effect flag is in the on-state, the main CPU 71 updates the value of a rescue game number counter provided in the RAM 73 (S92). This rescue game number counter manages the number of games until a payout is carried out on account of the rescue. In S92, the main CPU 71 adds 1 to the value rescue game number counter. After the processing has been conducted, the rescue-related process is completed.

<Symbol Random-Determination Process>

Figure 14:
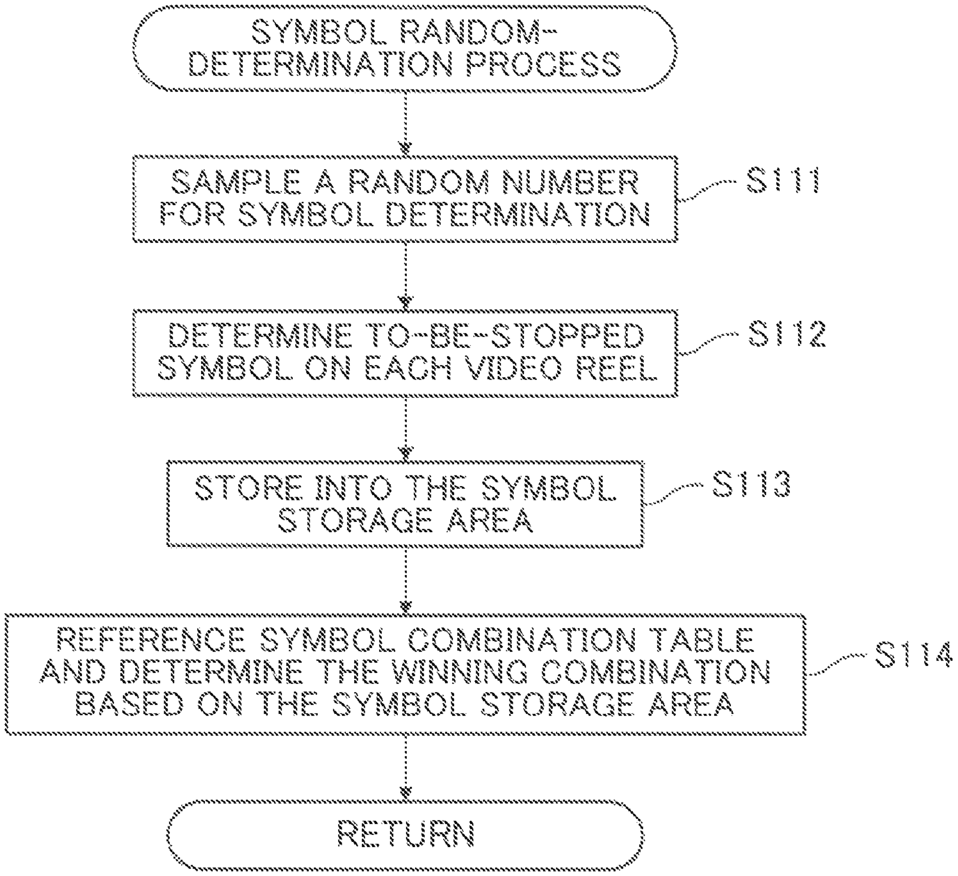
FIG. 14 is a view illustrating a flowchart of the symbol random-determination process in the slot machine according to the first embodiment of the present invention.

Next, with reference to FIG. 14, the symbol random-determination process is described. FIG. 15 is a view illustrating a flowchart of the symbol random-determination process in the slot machine 10 according to the first embodiment of the present invention.

First, the main CPU 71 extracts random numbers for symbol determination (step S111). The main CPU 71 then randomly determines to-be-stopped symbols for the respective video reels 151 to 155 (S112). As shown in FIG. 7, the video reels 151 to 155 (first video reel 151, second video reel 152, third video reel 153, fourth video reel 154 and fifth video reel 155) in the slot machine 10 of the present embodiment are respectively associated with symbol columns each structured by a plurality of symbols to each of which a code number is assigned. A data table storing the video reels 151 to 155 and the corresponding to the symbol columns is stored in the ROM 72. The main CPU 71 performs random determination for each video reel 151 to 155 to determine any of the symbols as a to-be-stopped symbol. At this time, the probability of each symbol being determined as a to-be-stopped symbol is the same as that of the others.

The main CPU 71 then stores the to-be-stopped symbols respectively determined for the video reels 151 to 155 into a symbol storage area provided in the RAM 73 (step S113). Next, the main CPU 71 refers to the symbol combination table and determines a winning combination based on the symbol storage area (step S114). The symbol combination table specifies combinations of symbols relating to winning, and the number of payouts. On the slot machine 10, the scrolling of symbol columns of the video reels 151 to 155 is stopped, and winning is established when the combination of symbols displayed along the pay line matches one of the combinations of symbols specified by the symbol combination table. It is to be noted that winning is not established (i.e. the game is lost) when the combination of symbols displayed along the pay line does not match any of the combinations of symbols specified by the symbol combination table. The main CPU 71 determines whether or not the combination of symbols on the video reels 151 to 155 to be displayed along the pay line matches any of the combinations of symbols specified by the symbol combination table and determines the winning combination. After the processing has been conducted, the symbol random-determination process is completed.

In the present embodiment, when it is determined in the symbol random-determination process that three "BONUS" symbols 250 serving as the trigger symbol of the Three Little Pigs bonus game are to be stop-displayed, there is determined which one of the benefits (fixed payout, Piggy, Barrel and Wolf game, or pick-up bonus game) will be associated with each of the "BONUS" symbols 250. This determination process is executed based on the data table stored in the ROM 72, which stores the respective stop positions of the "BONUS" symbols 250 and the associated benefit (fixed payout, Piggy, Barrel and Wolf game, or pick-up bonus game).

<Symbol Display Control Process>

Figure 15:
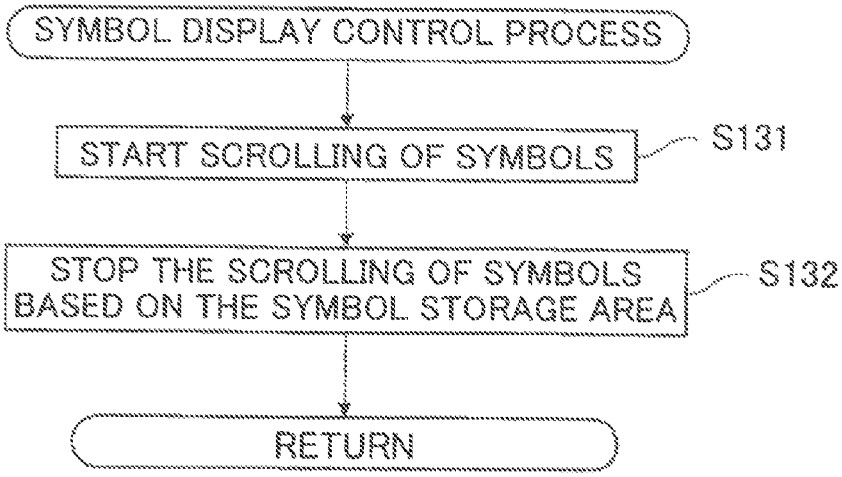
FIG. 15 is a view illustrating a flowchart of the symbol display control process in the slot machine according to the first embodiment of the present invention.

Next, with reference to FIG. 15, the symbol display control process is described. FIG. 15 is a view illustrating a flowchart of the symbol display control process in the slot machine 10 according to the first embodiment of the present invention.

First, the main CPU 71 starts scrolling of the symbol columns of the video reels 151 to 155 that are displayed to the display window 150 of the lower image display panel 141 (S131). The main CPU 71 then stops the scrolling of the symbol columns of the video reels 151 to 155, based on the aforementioned symbol storage area (step S132). After the processing has been conducted, the symbol display control process is completed.

Note that, although the present embodiment deals with a case where each symbol structures a symbol column and is scrolled longitudinally, the variably display of symbols of the present invention is not limited to such an example. The symbols may scroll in a horizontal direction. Alternatively, each symbol may be displayed so as to move separately from the other symbols within a display area.

In the base game, when the first stopped symbol column includes a "BONUS" symbol 250 to serve as a trigger for a Three Little Pigs bonus game and a "FREE GAME" symbol 230 to serve as a trigger for a free game, a special-stopping sound effect among various types of sound effects stored in the RAM 73 is read out and played. On the other hand, when the first stopped symbol column lacks at least one of the "BONUS" symbol 250 to serve as a trigger for a Three Little Pigs bonus game and the "FREE GAME" symbol 230 to serve as a trigger for a free game, a ordinary stopping sound effect among various types of sound effects stored in the RAM 73 is read out and played. In the present embodiment, the symbol column to stop first is the first column on the video reel 151. When the symbols out of those on the video reel 151, corresponding to code numbers "00", "01", and "02", i.e., "FREE GAME" symbol, "Grandma" symbol, and "BONUS" symbol are stopped in the display window 150, the special-stopping sound effect is output from the speaker 112. The ordinary stopping sound effect is output from the speaker 112 in other cases.

Thus, the player is able to know, by the special-stopping sound effect, the possibility of winning a special benefit or a payout, Three Little Pigs bonus game, or a free game. Notifying the possibility of winning a Three Little Pigs bonus game or a free game by means of special-stopping sound effect causes a great expectation of the player.

<Payout Amount Determination Process>

Figure 16:
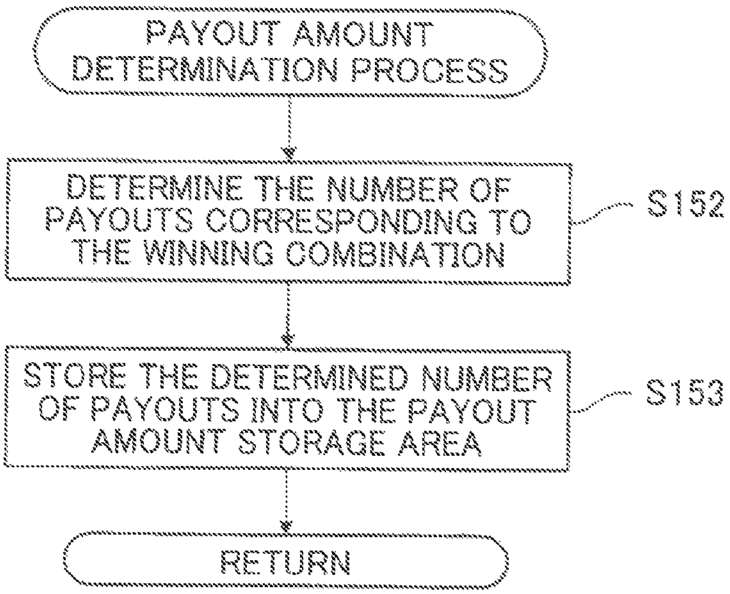
FIG. 16 is a view illustrating a flowchart of the payout amount determination process in the slot machine according to the first embodiment of the present invention.

Next, with reference to FIG. 16, the payout amount determination process is described. FIG. 16 is a view illustrating a flowchart of the payout amount determination process in the slot machine 10 according to the first embodiment of the present invention.

First, the main CPU 71 determines the number of payouts corresponding to the winning combination (step S152). It is to be noted that the main CPU 71 determines "0" as the number of payouts in the case where the game is lost. Next, the main CPU 71 stores the determined number of payouts into the payout amount storage area (step S153). After the processing has been conducted, the payout amount determination process is completed.

<Rescue Check Process>

Figure 17:
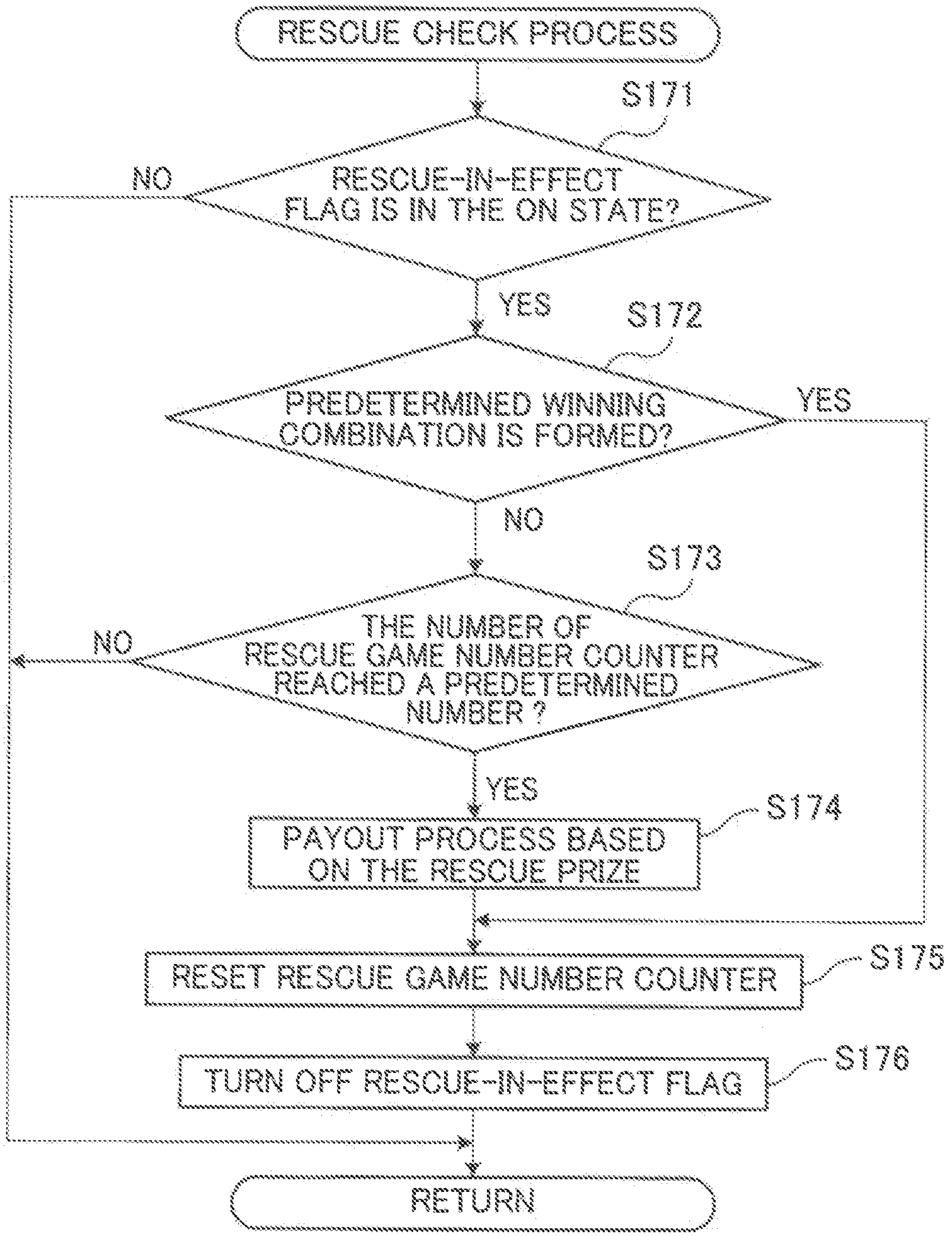
FIG. 17 is a view illustrating a flowchart of the rescue check process in the slot machine according to the first embodiment of the present invention.

Next, with reference to FIG. 17, a rescue check process is described. FIG. 17 shows a flowchart of a rescue check process in the slot machine 10 according to the first embodiment of the present invention.

First, the main CPU 71 determines whether or not the rescue-in-effect flag in the on-state (step S171). If it is determined that the rescue-in-effect flag is not in the on state, the main CPU 71 completes the rescue check process. When the main CPU 71 determines that the rescue-in-effect flag is in the on-state, the main CPU 71 determines whether or not a predetermined winning combination has been established (S172). In the present embodiment, the predetermined winning combination is the "Free Game trigger", the "Three Little Pigs bonus game trigger", a "Mystery Bonus", or a "Progressive".

When the main CPU 71 determines that the predetermined winning combination has not been established, the main CPU 71 determines whether or not the value of the rescue game number counter has reached a predetermined number of times (e.g. 300) (S173). The main CPU 71 completes the rescue check process if it is determined that the rescue game number counter has not reached the predetermined number. The main CPU 71 executes a payout process based on an amount of rescue, if it is determined that the rescue game number counter has reached the predetermined number (S174). The main CPU 71 adds an amount (e.g. 200) previously set as the amount of rescue to the value stored in the credit amount counter.

After S174 or when determining in S172 that the predetermined winning combination has been established, the main CPU 71 resets the rescue game number counter (S175). Next, the main CPU 71 switches the rescue-in-effect flag to the off-state (step S176). After the processing has been conducted, the rescue check process is completed.

<Rescue Selection Process>

Figure 18:
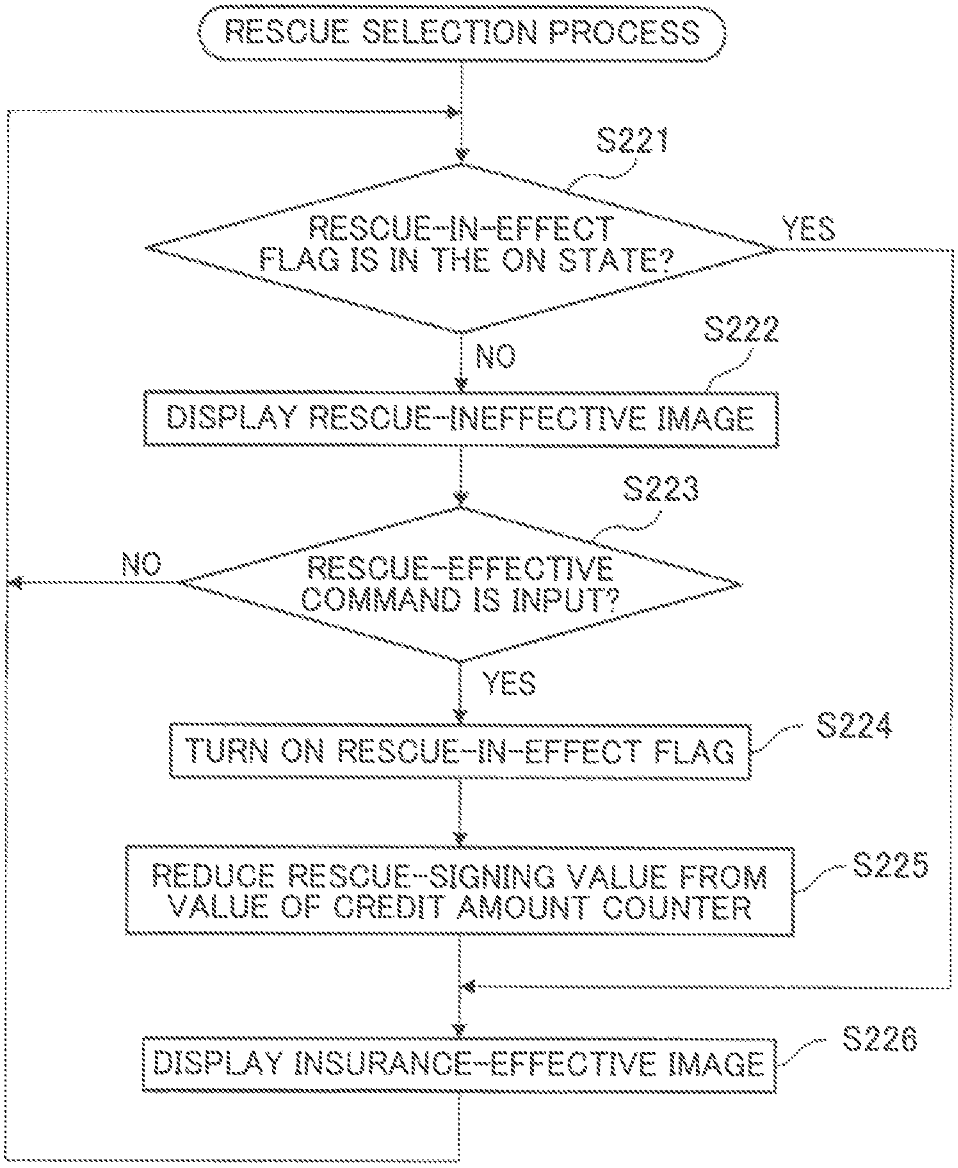
FIG. 18 is a view illustrating a flowchart of a rescue selection process in the slot machine according to the first embodiment of the present invention.

Next, with reference to FIG. 18, the rescue selection process is described. FIG. 14 is a view illustrating a flowchart of the rescue selection process in the slot machine 10 according to the first embodiment of the present invention.

First, the main CPU 71 determines whether or not the rescue-in-effect flag is in the on-state (step S221). When the main CPU 71 determines that the rescue-in-effect flag is not in the on-state, the main CPU 71 displays a rescue-ineffective image (step S222). The main CPU 71 transmits to the graphic board 130 a command to display the rescue-ineffective image. Based on the command, the graphic board 130 generates the rescue-ineffective image and displays the image on the lower image display panel 141. As the rescue-ineffective image, for example, an image showing "INSURANCE BET $1.00 TOUCH TO BET" is displayed. This image prompts the player to determine whether to activate the rescue mode, and at the same time, inform the player of the prize required for activating the rescue mode. The player can input a command to make the rescue effective by touching a predetermined place on the touch panel 114.

Subsequently, the main CPU 71 determines whether or not a rescue-effective command input has been entered (step S223). When the main CPU 71 determines that the insurance-effective command input has not been entered, the main CPU 71 shifts the processing to step S221 with the rescue-in-effect flag kept in the off-state. On the other hand, when the main CPU 71 determines that the rescue-effective command input has been entered, the main CPU 71 switches the rescue-in-effect flag to the on-state (step S224).

Next, the main CPU 71 reduces a rescue-signing value from the value of the credit amount counter (S225). In the present embodiment, an amount corresponding to, for example, one dollar is subtracted from the value of the credit amount counter. After step S225 or when determining in step S221 that the rescue-in-effect flag is in the on-state, the main CPU 71 displays the insurance-effective image (step S226). As the rescue-effective image, for example, an image showing "RESCUE IN EFFECT, WIN 200 CREDIT" is displayed. This is an image for letting the player know that the rescue mode is active, and that a value of "200" is added to the value of the credit amount counter when a rescue condition is satisfied. After the process has been performed, the process is shifted to step S221.

<Free Game Process>

Figure 19:
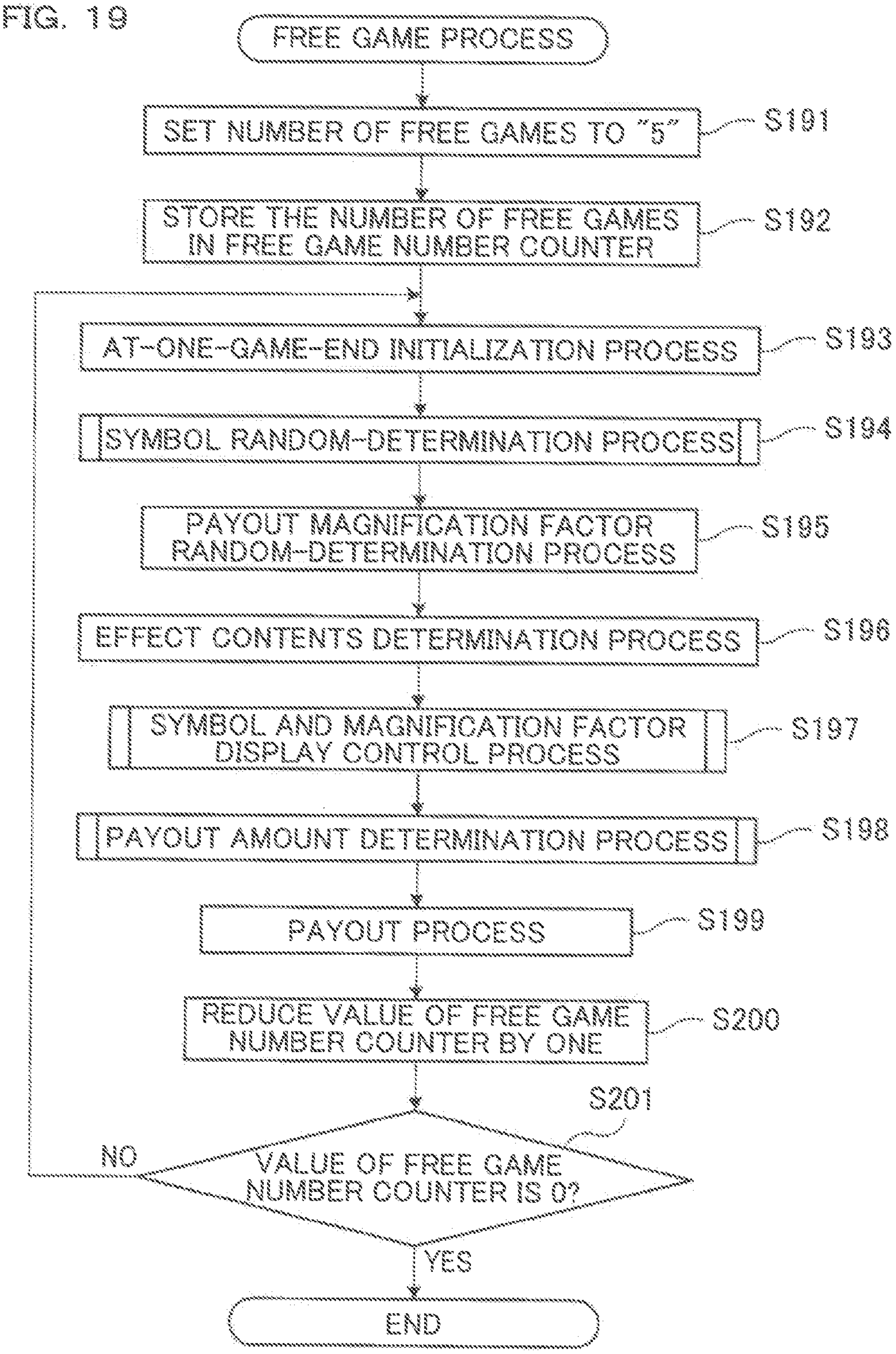
FIG. 19 is a view illustrating a flowchart of the free game process in the slot machine according to the first embodiment of the present invention.
Figure 20:
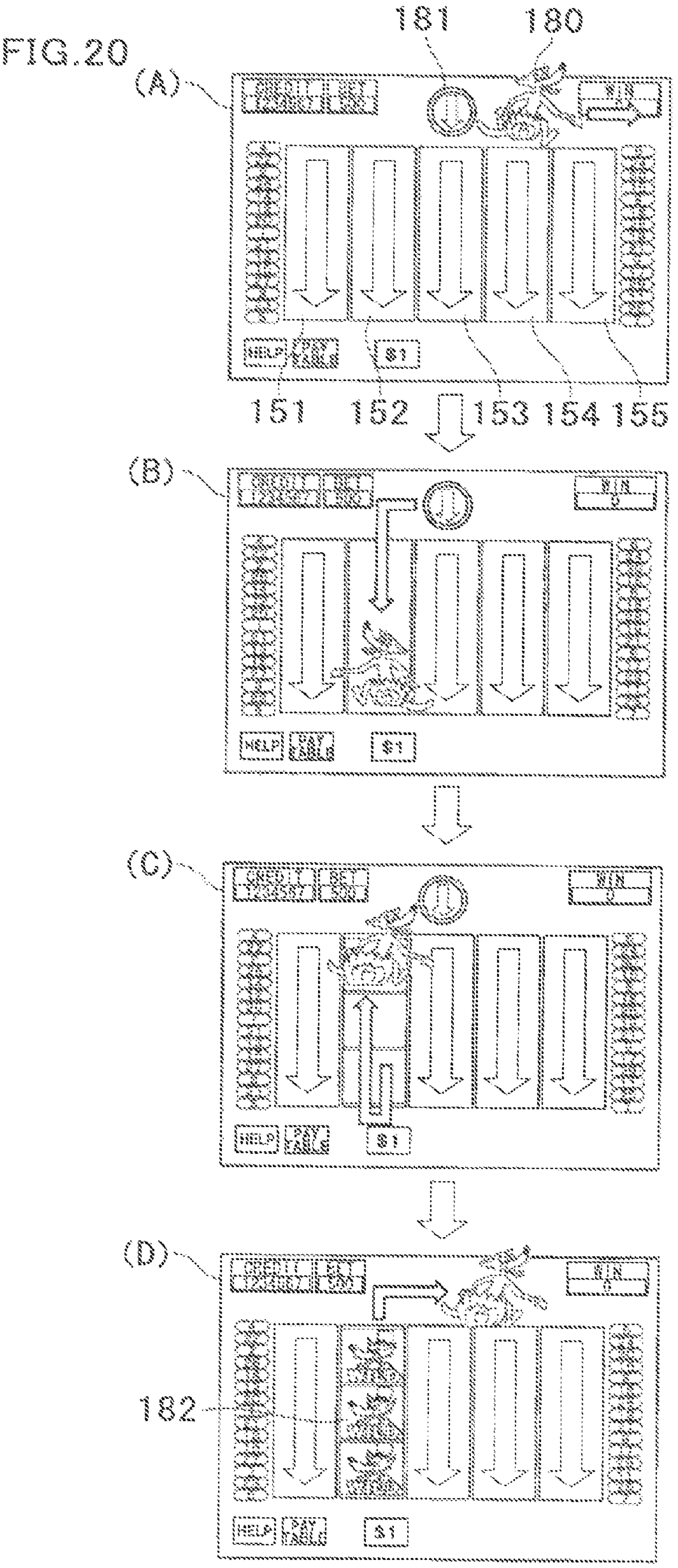
FIG. 20 shows an exemplary free game image displayed on the lower image display panel of the slot machine according to the first embodiment of the present invention.

Next, a free game process will be described with reference to FIGS. 19 and 20. FIG. 19 shows a flowchart of a free game process of the slot machine 10 according to the first embodiment of the present invention. Next, FIG. 20 shows an exemplary image of the free game displayed on the lower image display panel of a slot machine 10, according to the first embodiment of the present invention. The free game in the first embodiment is a game run when three "FREE GAME" symbols 230 (see FIG. 10(C)) are stop-displayed in the display window 150 of the lower image display panel 141 during the base game.

First, the main CPU 71 sets the number of free games to "5" (S191). Next, the main CPU 71 stores the set number of free games in a free game number counter provided in the RAM 73 (S192).

The main CPU 71 then executes at-one-game-end initialization process in the same way as S12 described with reference to FIG. 9 (step S193). The main CPU 71 then executes the symbol random-determination process described with reference to FIG. 14 (step S194). Next, the main CPU 71 executes a payout magnification factor random-determination process (S195). This is a process for randomly determining a magnification factor of payout, which is executed when it is determined that a winning is achieved and a payout is to be awarded symbol random-determination process. Then, the main CPU 71 executes the effect contents determination process in the same way as S16 described with reference to FIG. 9 (step S196). Next, the main CPU 71 executes a symbol and magnification factor display control process (S197).

As shown in FIG. 20 (A), the following effect is provided when scrolling of the symbol columns of the video reels 151 to 155 is started in the free game. Namely, a wolf character 180 falls into the fireplace 181 at the top portion of the screen of the lower image display panel 141. Then, the wolf character 180 cracks the pot in the fireplace 181 and a "magnification factor" in the fireplace 181 rotates. Next, as illustrated in FIG. 20(B), the following effect is provided. Namely, the wolf character 180 runs down from the top portion of the screen to above the video reels 151 to 155 being scrolled, and set a fire on the video reels 151 to 155. Then as shown in FIG. 20 (C), one of the video reels 151 to 155 set on fire becomes a "WILD" symbol 182. Further, as shown in FIG. 20 (D), when another one of the video reels 151 to 155 is to be turned into a "WILD" symbol 182, the wolf character 180 runs down from the top part of the screen to another video reel, and set a fire on that reel. The effect is finished when the wolf character 180 having returned to the top part of the screen exit the screen. After this, the video reels 151 to 155 stop and the payout is determined. The rotation of the magnification factor in the fireplace 181 stops and an image display effect is provided and the magnification factor is determined.

The main CPU 71 then executes the payout amount determination process described with reference to FIG. 16 (step S198). The main CPU 71 performs a payout process (step S199). In this payout process, the main CPU 71 adds a value of a payout amount counter which is stored in the payout amount determination process of S198 to the value of the free game payout amount counter. The free game payout amount counter manages the total payout amount determined in the free game. The main CPU 71 adds the value stored in the free game payout amount counter to the credit amount counter provided in the RAM 73. That is, the total amount of payout determined during the free games is collectively paid out. A structure that delivers coins from the coin tray 18 is also possible.

Next, the main CPU 71 subtract 1 from the value of the free game number counter (S200). Next, the main CPU 71 determines whether or not the value of the free game number counter is 0 (S201). When the main CPU 71 determines that the value of the free game number counter is not 0, then the process shifts to S193. On the other hand, when it is determined that the value of the free game number counter is 0, the free game process is completed. When the free game process is completed, the processing is shifted to S21 described with reference to FIG. 9.

In the above structure, a player is entitled to play a free game when the symbol ("FREE GAME" symbol 230) that causes an occurrence of a free game is stop-displayed in the base game. If the player wins the free game and a predetermined amount of payout is to be awarded, the magnification factor for that predetermined amount of payout is randomly determined. Thus, the player is able to receive a payout resulting from multiplying that predetermined amount of payout by the randomly determined magnification factor. This enables provision of greater satisfaction to the player. This structure also causes the player for the situation where a payout is multiplied by a magnification factor.

<Three Little Pigs Bonus Game Process>

Figure 21:
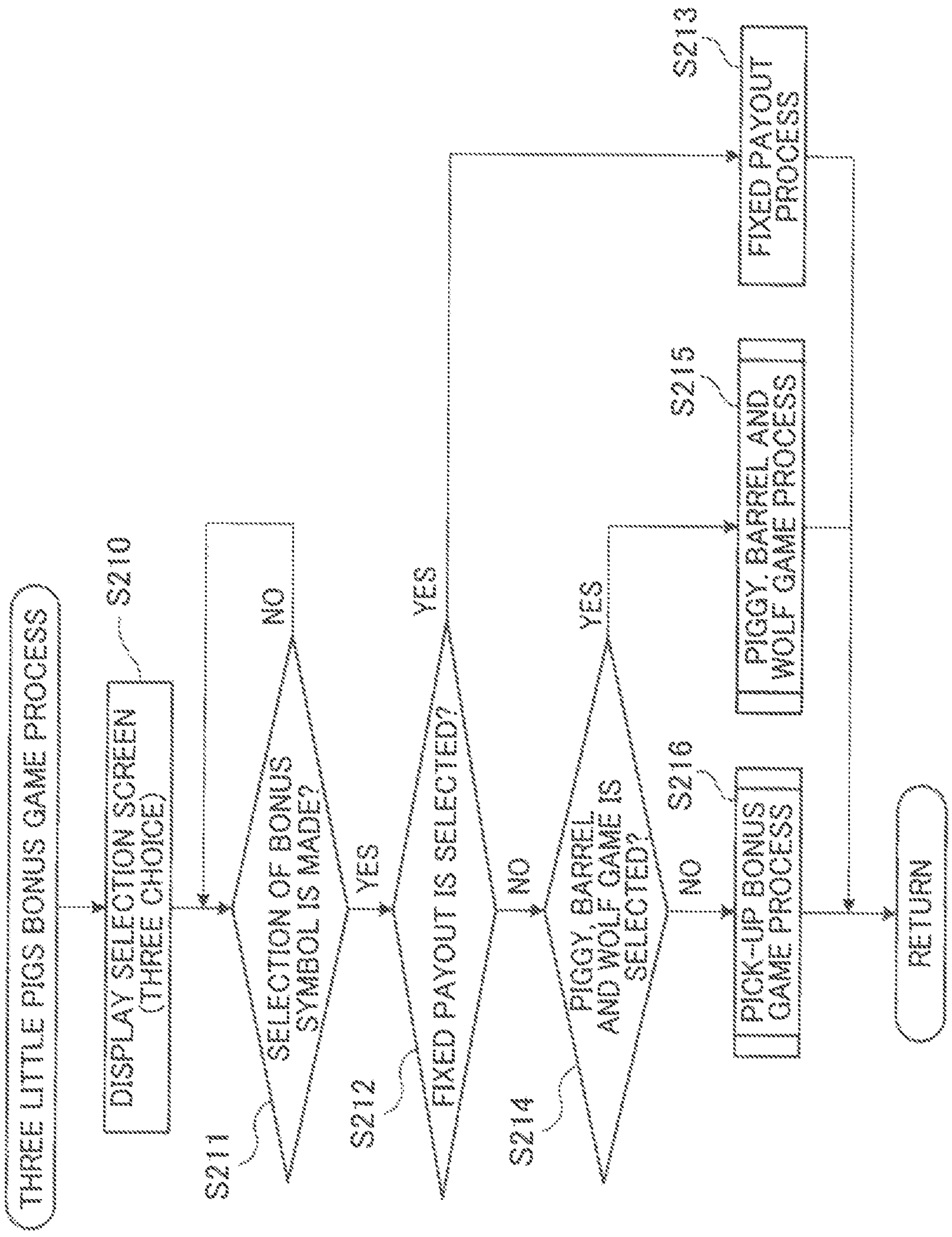
FIG. 21 shows a flowchart of the Three Little Pigs bonus game process in the slot machine according to the first embodiment of the present invention.

Next, with reference to FIG. 21, the Three Little Pigs bonus game process is described. FIG. 21 shows a flowchart of the Three Little Pigs bonus game process in the slot machine according to the first embodiment of the present invention. The Three Little Pigs bonus game of the present embodiment is a game which is run when three "BONUS" symbol 250 (see FIG. 10(D)) are stop-displayed in the display window 150 of the lower image display panel 141 during the base game.

First in step S210, the main CPU 71 causes the lower image display panel 141 to display a selection screen which prompts selection of any one of three "BONUS" symbols 250 stop-displayed (see FIG. 10(D)).

Next, in step S211, the main CPU 71 determines whether or not the selection of the "BONUS" symbol 250 is made through the selection screen. Specifically, the main CPU 71 determines whether or not any of portions of the touch panel 114 respectively corresponding to the "BONUS" symbols 250 is touched. When it is determined that selection of the "BONUS" symbol 250 is not made (S211: NO), the main CPU 71 shifts the process back to step S211.

On the other hand, when it is determined that the selection of the "BONUS" symbol 250 is made (S211: YES), the main CPU 71 in step S212 determines whether or not the selected "BONUS" symbol 250 corresponds to the "fixed payout". If the selected "BONUS" symbol 250 is determined as to correspond to the "fixed payout" (S212: YES), the main CPU 71 executes the fixed payout process (S213). An amount of the fixed payout is then added to the value of the payout amount stored in the RAM 73, and the process is completed thereafter.

Note that in step S213, a process of determining whether to generate a "RESCUE PRESENT". Specifically the main CPU 71 samples a random number, and when the sampled random number is within a predetermined range of numbers, the main CPU 71 determines to generate a "RESCUE PRESENT". The "RESCUE PRESENT" is a game state where selecting one "BONUS" symbol 250 out of the non-selected "BONUS" symbol 250 is enabled. Further, generation of the "RESCUE PRESENT" in step S213 may be determined at a probability of 1/4.

When the selected "BONUS" symbol 250 is not determined as to correspond to the "fixed payout" (S212: NO), the main CPU 71 in step S214 determines whether or not the selected "BONUS" symbol 250 corresponds to the "Piggy, Barrel and Wolf game". When the selected "BONUS" symbol 250 is determined as to correspond to the "Piggy, Barrel and Wolf game" (S214: YES), the main CPU 71 executes a later-described Piggy, Barrel and Wolf game process (S215). The process is completed thereafter.

On the other hand, when the selected "BONUS" symbol 250 is not determined as to correspond to the "Piggy, Barrel and Wolf game" (S214: NO), the main CPU 71 executes a later-described pick-up bonus game process (S216). The process is completed thereafter. When the Three Little Pigs bonus game process is completed, the process is shifted to step S23 described with reference to FIG. 9.

<Piggy, Barrel and Wolf Game Process>

Figure 22:
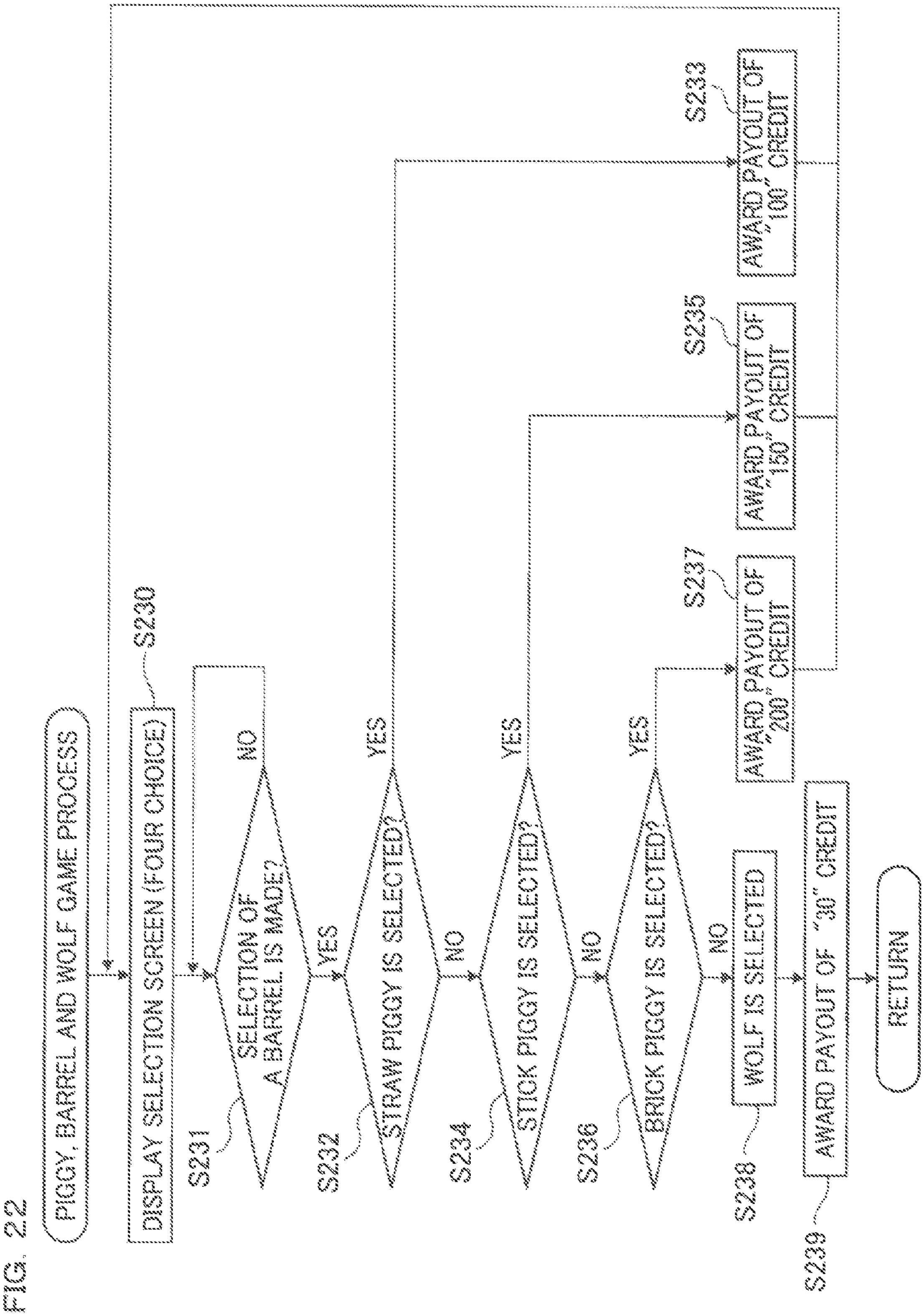
FIG. 22 is a view illustrating a flowchart of the Piggy, Barrel and Wolf game process in the slot machine according to the first embodiment of the present invention.
Figure 23:
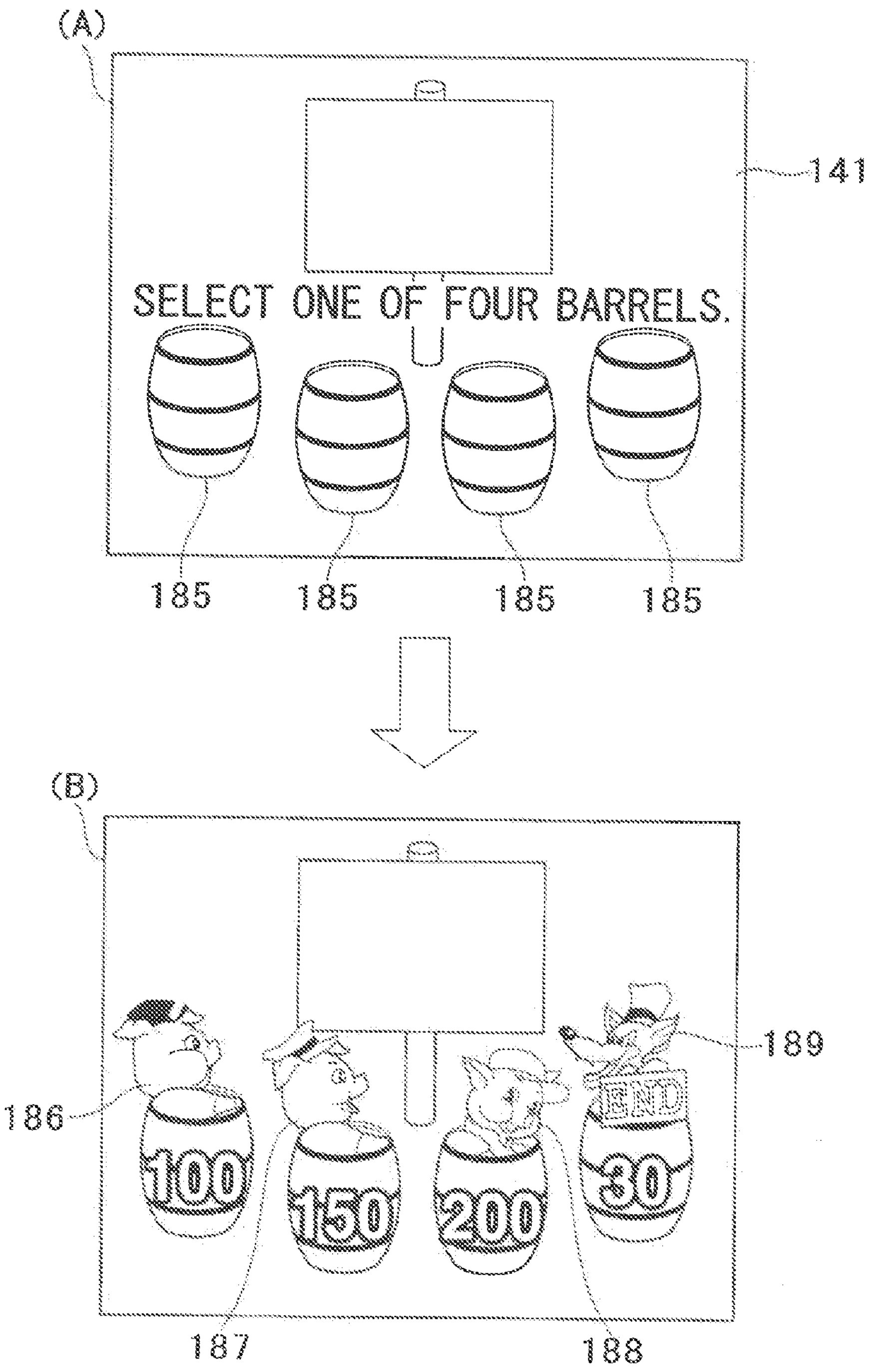
FIG. 23 shows an exemplary image of the Piggy, Barrel and Wolf game displayed on the lower image display panel of the slot machine according to the first embodiment of the present invention.

Next, with reference to FIG. 22 and FIG. 23, the Piggy, Barrel and Wolf game process is described. FIG. 22 shows a flowchart of the Piggy, Barrel and Wolf game process in the slot machine according to the first embodiment of the present invention. FIG. 23 is a diagram showing an exemplary image of the Piggy, Barrel and Wolf game displayed on the lower image display panel 141 of the slot machine 10 according to the first embodiment of the present invention. The Piggy, Barrel and Wolf game process is a process executed in S215 of the Three Little Pigs bonus game process. As shown in FIG. 23 (A), the Piggy, Barrel and Wolf game is a game that enables a player to select one of four Barrels 185, and awarding a payout according to the selected character (Straw Piggy 186, Stick Piggy 187, Brick Piggy 188, Wolf 189) (see FIG. 23 (B)). Note that when a piggy character is selected (i.e. Straw Piggy 186, Stick Piggy 187, Brick Piggy 188), the Barrels 185 are shuffled and the Piggy, Barrel and Wolf game is repeated until the Wolf 189 is selected.

First, in step S230, the main CPU 71 displays a selection screen that prompts the player to select one of four Barrels 185 displayed on the lower image display panel 141 (see FIG. 23(A)).

Next, in step S231, the main CPU 71 determines whether any of the Barrels 185 is selected through the selection screen of the Barrels 185. Specifically, the main CPU 71 determines whether any of the portions of the touch panel 114 respectively corresponding to the Barrel 185 is touched. When it is determined that the selection of a Barrel 185 is not made (S231: NO), the main CPU 71 shifts the process back to S231.

When it is determined step S232 that the selection of a Barrel 185 is made (S231: YES), the main CPU 71 determines whether or not the selected Barrel 185 correspond to the "Straw Piggy 186". When the selected Barrel 185 is determined as to correspond to the "Straw Piggy 186" (S232: YES), the main CPU 71 causes payout of "100" credit, as shown in FIG. 23 (B)(S233). The payout amount of "100" credit is added to the value of payout amount stored in the RAM 73, and the process returns to S230.

On the other hand, when the selected Barrel 185 is not determined as to correspond to the "Straw Piggy 186" (S232: NO) the main CPU 71 in step S234 determines whether the selected Barrel 185 corresponds to the "Stick Piggy 187". When the selected Barrel 185 is determined as to correspond to the "Stick Piggy 187" (S234: YES), the main CPU 71 causes payout of 150 credit, as shown in FIG. 23 (B)(S235). The payout amount of 150 credit is added to the value of payout amount stored in the RAM 73, and the process then returns to S230.

On the other hand, when the selected Barrel 185 is not determined as to correspond to the "Stick Piggy 187" (S234: NO), the main CPU 71 in step S236 determines whether the selected Barrel 185 corresponds to the "Brick Piggy 188". Then, when the selected Barrel 185 is determined as to correspond to the "Brick Piggy 188" (S236: YES), the main CPU 71 causes payout of 200 credit, as shown in FIG. 23 (B) (S237). The payout amount of 200 credit is added to the value of payout amount stored in the RAM 73, and the process then returns to S230.

On the other hand, when the selected Barrel 185 is not determined as to correspond to the "Brick Piggy 188" (S236: NO), the main CPU 71 in step S238 determines whether the selected Barrel 185 corresponds to the "Wolf 189". In this case, the main CPU 71 causes payout of "30" credit as shown in FIG. 23 (B)(S239). The payout amount of "30" credit is added to the value of payout amount stored in the RAM 73. This process is completed thereafter.

In the above structure, a plurality of specific symbols ("BONUS" symbols 250) are stop-displayed in the base game, and in response to this, the player is able to select one of the plurality of specific symbols stop-displayed via the input device. When a specific symbol that causes an occurrence of the selection game (Piggy, Barrel and Wolf) is selected, the selection game is started, and the player is able to select any of a plurality of selectable object (four Barrels 185). Then, a payout according to the object selected is awarded. Further, the selection game is continued until the player selects an object (Wolf 189) that terminates the selection game. This causes greater expectation of the player for the payout in the selection game.

<Pick-Up Bonus Game Process>

Figure 24:
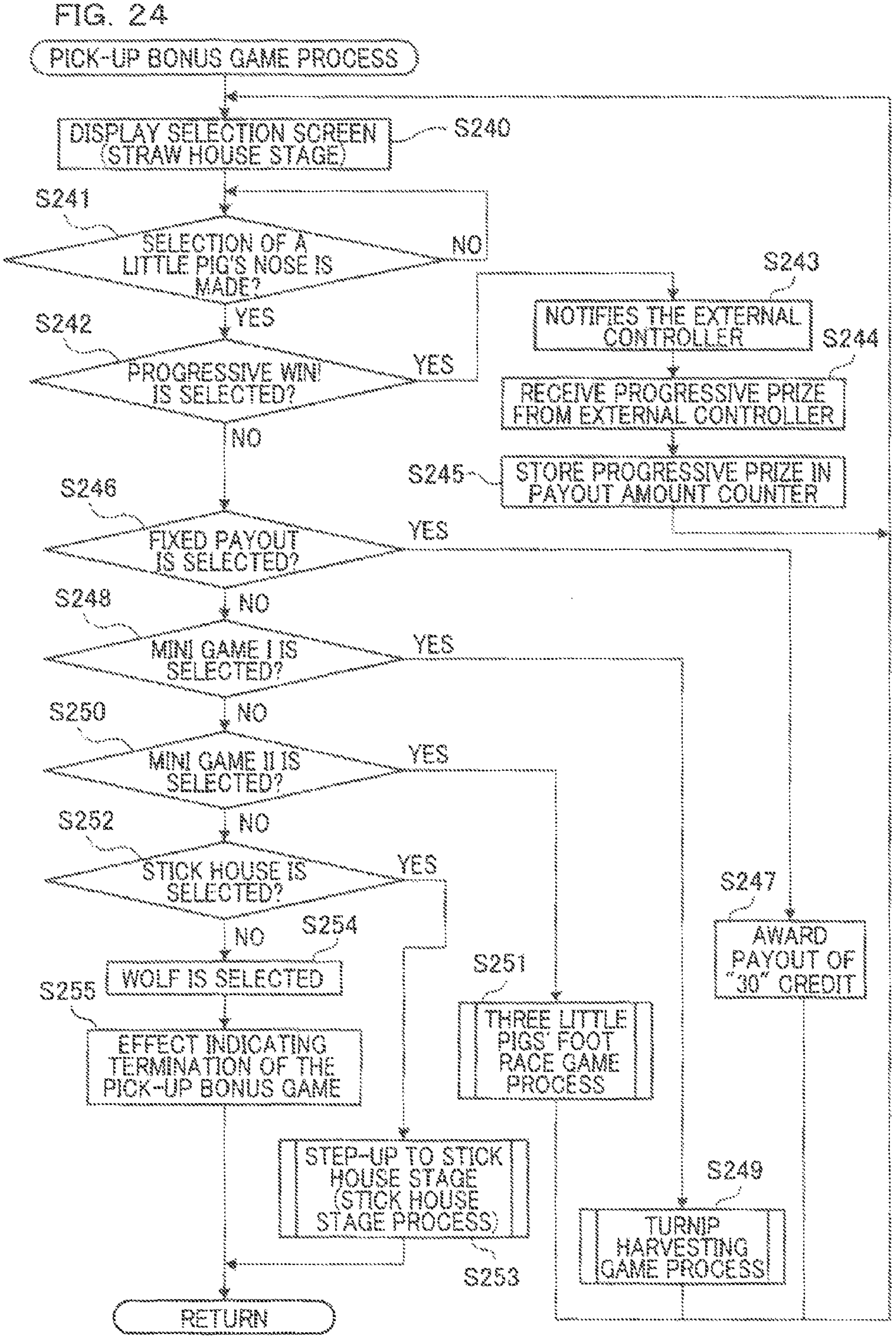
FIG. 24 shows a flowchart of the pick-up bonus game process in the slot machine according to the first embodiment of the present invention.

Next, with reference to FIG. 24 and FIG. 27, the pick-up bonus game process is described. FIG. 24 shows a flowchart of the pick-up bonus game process in the slot machine 10 according to the first embodiment of the present invention. The pick-up bonus game process is a process executed in S216 of the Three Little Pigs bonus game process shown in FIG. 21. FIG. 27(A) is a view showing a selection screen prompting selection of one of little pig's noses 210 displayed on the lower image display panel 141 of the slot machine 10 according to the first embodiment of the present invention. FIG. 27(B) shows a benefit table containing benefits associated with the little pig's noses 210 to be selected in the pick-up bonus game process and the stick house stage. FIG. 27(C) shows a benefit table containing benefits associated with the little pig's noses 210 to be selected in the brick house stage.

First, in step S240, the main CPU 71 displays a selection screen that prompts selection of one of twenty little pig's noses 210 displayed on the lower image display panel 141 (see FIG. 27(A)). Note that the House 211 in the background of the selection screen is the straw house.

Next, in step S241, main CPU 71 determines whether the selection of any of the little pig's noses 210 is made through the selection screen of the little pig's noses 210. Specifically, the main CPU 71 determines whether any of the portions of the touch panel 114 respectively corresponding to the little pig's nose 210 is touched. When it is determined that the selection of a little pig's nose 210 is not made (S241: NO), the main CPU 71 shifts the process back to S241.

On the other hand, when it is determined that the selection of a little pig's nose 210 is made (S241: YES), the main CPU 71 determines whether the selected little pig's nose 210 is a "progressive WIN!" 214 which means winning of a progressive prize (S242). When the main CPU 71 determines that the selected little pig's nose 210 is the "progressive WIN!"214 which means winning of a progressive prize (S242: YES), the main CPU 71 notifies the external controller 200 of the occurrence of the winning of the progressive prize (S243). Note that, upon reception of the notification, the external controller 200 transmits to the slot machine 10 the most updated amount of progressive prize. At this time, a part (e.g. 80%) of the amount of progressive prize may be paid out and the rest (e.g. 20%) may be carried over for the upcoming winning of the progressive prize. Next, the main CPU 71 receives an amount of progressive prize from the external controller 200 (S244). Next, the main CPU 71 stores the amount of progressive prize received to the payout amount counter (S245). After the process, the process then returns to S240.

On the other hand, when the selected little pig's nose 210 is not determined as to correspond to the "progressive WIN!" 214 which means winning of a progressive prize (S242: NO), the main CPU 71 in step S246 determines whether the selected little pig's nose 210 corresponds to the "fixed payout"215. Then, when the selected little pig's nose 210 is determined as to correspond to the "fixed payout"215 (S246: YES), the main CPU 71 causes a payout of "30" credit, as shown in FIG. 27 (B) (S247). The payout amount of "30" credit is added to the value of payout amount stored in the RAM 73, and the process then returns to S240.

On the other hand, when the selected little pig's nose 210 is not determined as to correspond to the "fixed payout"215 (S246: NO), the main CPU 71 in step S248 determines whether the selected little pig's nose 210 corresponds to the "mini game I" 216. Then, when the selected little pig's nose 210 is determined as to correspond to the "mini game I" 216 (S248: YES), the main CPU 71 executes a later-described "Turnip Harvesting" game process, as shown in FIG. 27 (B) (S249). Then, the process then returns to S240.

On the other hand, when the selected little pig's nose 210 is not determined as to correspond to the "mini game I" 216 (S248: NO), the main CPU 71 in step S250 determines whether the selected little pig's nose 210 corresponds to the "mini game II" 217. When the selected little pig's nose 210 is determined as to correspond to the "mini game II" 217 (S250: YES), the main CPU 71 executes a later-described "Three Little Pigs' Foot Race" game process, as shown in FIG. 27 (B) (S251). Then, the process then returns to S240.

On the other hand, when the selected little pig's nose 210 is not determined as to correspond to the "mini game II" 217 (S250: NO), the main CPU 71 in step S252 determines whether the selected little pig's nose 210 corresponds to the "stick house" 218. When the selected little pig's nose 210 is determined as to correspond to the "stick house" 218 (S252: YES), the main CPU 71 causes a shift to a later-described stick house stage process as shown in FIG. 27 (B) (S253). This is an effect provided at the time of step-up from the stage in the mochief of the straw house to the stage in the mochief of the stick house. When the step-up occurs, the expectation value for a payout is raised. Then, after S253, the pick-up bonus game process is completed.

When the selected little pig's nose 210 is not determined as to correspond to the "stick house" 218 (S252: NO), the main CPU 71 in step S254 determines whether or not the selected little pig's nose 210 corresponds to the Wolf 220. In this case, the main CPU 71 provides an effect indicating termination of the pick-up bonus game (S255). Specifically the straw house displayed in the upper portion of the screen is blown away by the breath of the wolf 220. After S255, the pick-up bonus game process is completed.

<Stick House Stage Process>

Figure 25:
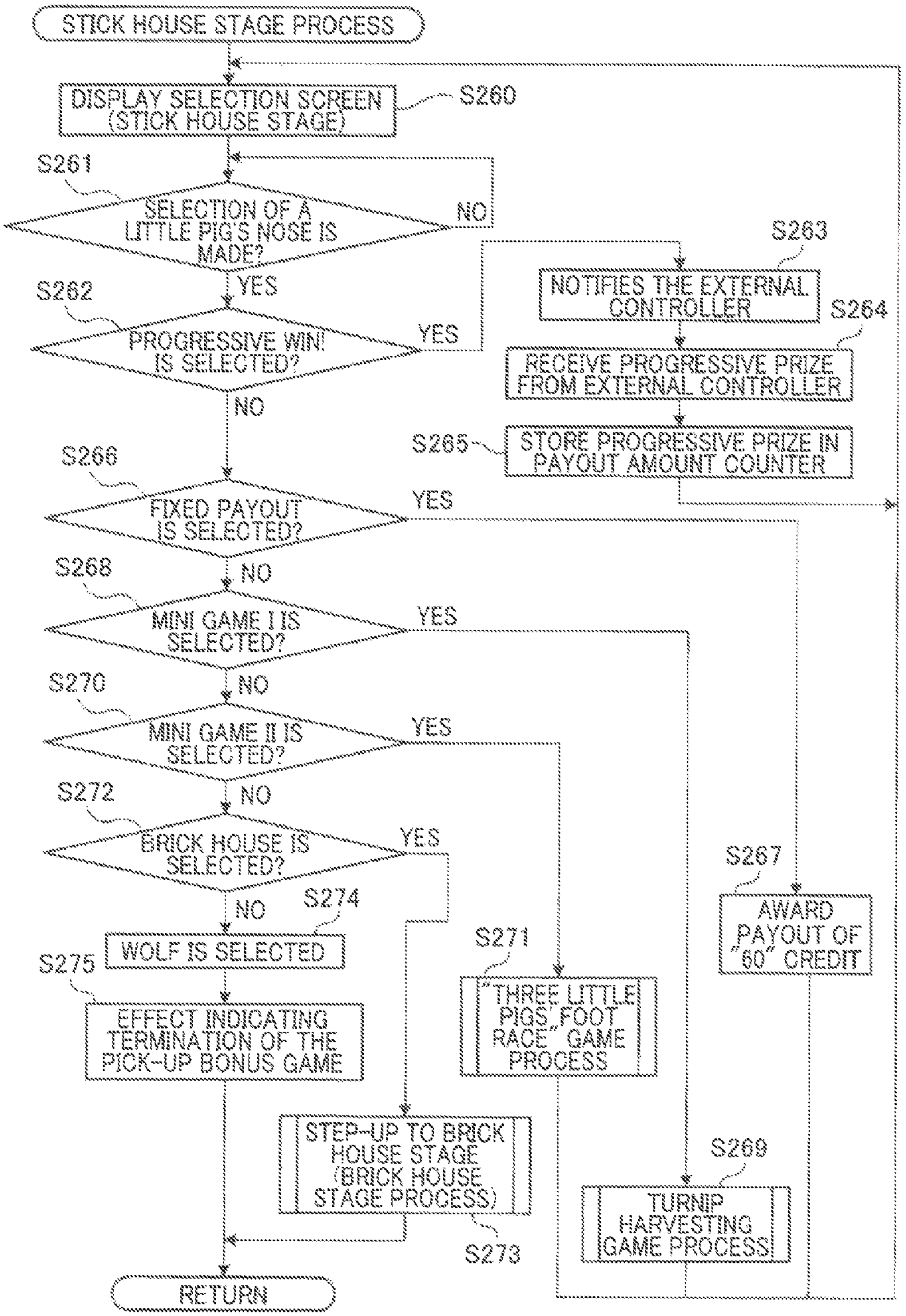
FIG. 25 shows a flowchart of a stick house stage process in the slot machine according to the first embodiment of the present invention.

Next, with reference to FIG. 25 and FIG. 27, the stick house stage process is described. FIG. 25 shows a flowchart of the stick house stage process in the slot machine 10 according to the first embodiment of the present invention. The stick house stage process is a process executed in S253 in the pick-up bonus game process shown in FIG. 24.

First, in step S260, the main CPU 71 displays a selection screen that prompts selection of one of the twenty little pig's noses 210 displayed on the lower image display panel 141 (see FIG. 27(A)). Note that in stick house stage process, the House 211 in the background of the selection screen is the stick house.

Next, in step S261, main CPU 71 determines whether the selection of any of the little pig's noses 210 is made through the selection screen of the little pig's noses 210. Specifically, the main CPU 71 determines whether any of the portions of the touch panel 114 respectively corresponding to the little pig's nose 210 is touched. When it is determined that the selection of a little pig's nose 210 is not made (S261: NO), the main CPU 71 shifts the process back to S261.

On the other hand, when it is determined that the selection of a little pig's nose 210 is made (S261: YES), the main CPU 71 determines whether the selected little pig's nose 210 corresponds to the "progressive WIN!" 214 which means winning of a progressive prize (S262). When the main CPU 71 determines that the selected little pig's nose 210 corresponds to the "progressive WIN!" 214 which means winning of a progressive prize (S262: YES), the main CPU 71 notifies the external controller 200 of the winning of a progressive prize (S263). Next, the main CPU 71 receives an amount of progressive prize from the external controller 200 (S264). Next, the main CPU 71 stores the amount of progressive prize received in the payout amount counter (S265). After the process, the process then returns to S260.

On the other hand, when the selected little pig's nose 210 is not determined as to correspond to the "progressive WIN!" 214 which means winning of a progressive prize (S262: NO), the main CPU 71 in step S266 determines whether the selected little pig's nose 210 corresponds to the "fixed payout" 225. Then, when the selected little pig's nose 210 is determined as to correspond to the "fixed payout" 225 (S266: YES), the main CPU 71 causes a payout of "60" credit as shown in FIG. 27 (B) (S267). The payout amount of "60" credit is added to the value of payout amount stored in the RAM 73, and the process then returns to S260.

On the other hand, when the selected little pig's nose 210 is not determined as to correspond to the "fixed payout" 225 (S266: NO), the main CPU 71 in step S268 determines whether the selected little pig's nose 210 corresponds to the "mini game I" 216. Then, when the selected little pig's nose 210 is determined as to correspond to the "mini game I" 216 (S268: YES), the main CPU 71 executes a later-described "Turnip Harvesting" game process as shown in FIG. 27 (B) (S269). The process then returns to S260.

On the other hand, when the selected little pig's nose 210 is not determined as to correspond to the "mini game I" 216 (S268: NO), the main CPU 71 in step S270 determines whether the selected little pig's nose 210 corresponds to the "mini game II" 217. Then, when the selected little pig's nose 210 is determined as to correspond to the "mini game II" 217 (S270: YES), the main CPU 71 executes a later-described Three Little Pigs foot race game process as shown in FIG. 27 (B) (S271). The process then returns to S260.

On the other hand, when the selected little pig's nose 210 is not determined as to correspond to the "mini game II" 217 (S270: NO), the main CPU 71 in step S272 determines whether the selected little pig's nose 210 corresponds to the "brick house" 219. Then, when the selected little pig's nose 210 is determined as to correspond to the "brick house" 219 (S272: YES), the main CPU 71 causes a shift to a later-described brick house stage process as shown in FIG. 27 (B) (S273). This is an effect provided at the time of step-up from the stage in the mochief of the stick house to the stage in the mochief of the brick house. When the step-up occurs, the expectation value for a payout is raised. Then, after S273, the stick house stage process is completed.

On the other hand, when the selected little pig's nose 210 is not determined as to correspond to the "brick house" 219 (S272: NO), the main CPU 71 in step S274 determines whether the selected little pig's nose 210 corresponds to Wolf 220. In this case, the main CPU 71 provides an effect indicating termination of the pick-up bonus game (S275). Specifically, the stick house displayed in the upper portion of the screen is blown away by the breath of the wolf 220. After S275, the stick house stage process is completed.

<Brick House Stage Process>

Figure 26:
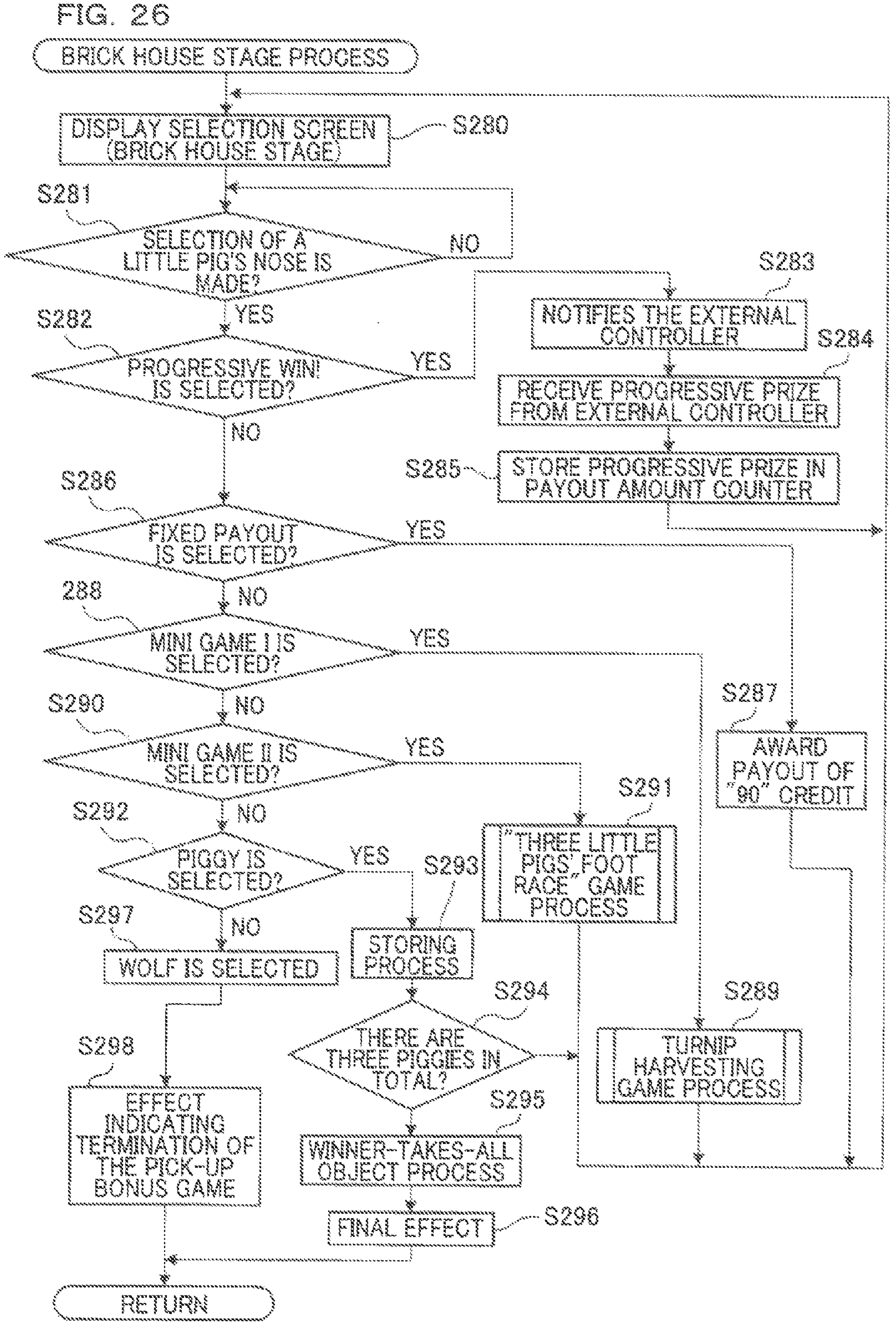
FIG. 26 shows a flowchart of a brick house stage process in the slot machine according to the first embodiment of the present invention.

Next, with reference to FIG. 26 and FIG. 27, the brick house stage process is described. FIG. 25 shows a flowchart of the brick house stage process in the slot machine 10 according to the first embodiment of the present invention. The brick house stage process is a process executed in S273 of the stick house stage process shown in FIG. 25.

First, in step S280, main CPU 71 displays a selection screen that prompts selection of one of the twenty little pig's noses 210 displayed on the lower image display panel 141 (see FIG. 27(A))

Note that in the brick house stage process, the House 211 in the background of the selection screen is the brick house.

Next, in step S281, the main CPU 71 determines whether the selection of any of the little pig's noses 210 is made through the selection screen of the little pig's noses 210. Specifically, the main CPU 71 determines whether any of the portions of the touch panel 114 respectively corresponding to the little pig's nose 210 is touched. When it is determined that the selection of a little pig's nose 210 is not made (S281: NO), the main CPU 71 shifts the process back to S281.

On the other hand, when it is determined that the selection of a little pig's nose 210 is made (S281: YES), the main CPU 71 determines whether the selected little pig's nose 210 corresponds to "progressive WIN!" 214 which means winning of a progressive prize (S282). When the main CPU 71 determines that the selected little pig's nose 210 correspond to the "progressive WIN!" 214 which means winning of a progressive prize (S282: YES), the main CPU 71 notifies the external controller 200 of the winning of the progressive prize (S283). Next, the main CPU 71 receives an amount of progressive prize from the external controller 200 (S284). Next, the main CPU 71 stores the amount of progressive prize received in the payout amount counter (S285). After the process, the process returns to S280.

On the other hand, when the selected little pig's nose 210 is not determined as to correspond to the "progressive WIN!" 214 which means winning of a progressive prize (S282: NO), the main CPU 71 in step S286 determines whether the selected little pig's nose 210 corresponds to the "fixed payout"226. When the selected little pig's nose 210 is determined as to correspond to the "fixed payout" 226 (S286: YES), the main CPU 71 causes a payout of "90" credit as shown in FIG. 27 (C) (S287). The payout amount of "90" credit is added to the value of payout amount stored in the RAM 73, and the process then returns to S280.

On the other hand, when the selected little pig's nose 210 is not determined as to correspond to the "fixed payout" 226 (S286: NO), the main CPU 71 in step S288 determines whether the selected little pig's nose 210 corresponds to the "mini game I" 216. When the selected little pig's nose 210 is determined as to correspond to the "mini game I" 216 (S288: YES), the main CPU 71 executes a later-described "Turnip Harvesting" game process as shown in FIG. 27(C) (S289). The process then returns to S280.

On the other hand, when the selected little pig's nose 210 is not determined as to correspond to the "mini game I" 216 (S288: NO), the main CPU 71 in step S290 determines whether the selected little pig's nose 210 corresponds to the "mini game II" 217. When the selected little pig's nose 210 is determined as to correspond to the "mini game II" 217 (S290: YES), the main CPU 71 executes a later-described Three Little Pigs foot race game process as shown in FIG. 27 (C) (S291). The process then returns to S280.

On the other hand, when the selected little pig's nose 210 is not determined as to correspond to the "mini game II" 217 (S290: NO), the main CPU 71 in step S292 determines whether the selected little pig's nose 210 corresponds to the piggy character (Straw Piggy 221, Stick Piggy 222, Brick Piggy 223). When the selected little pig's nose 210 is determined as to correspond to the piggy character (Straw Piggy 221, Stick Piggy 222, Brick Piggy 223) (S292: YES), the main CPU 71 in step S293 stores the selected piggy character (Straw Piggy 221, Stick Piggy 222, Brick Piggy 223) in the RAM 73 (S293).

The main CPU 71 in step S294 refers to RAM 73 to determine whether three (three kinds of) piggy characters (Straw Piggy 221, Stick Piggy 222, Brick Piggy 223) in total are stored. When three (three kinds of) piggy characters are not stored (S294: NO), the process then returns to S280.

On the other hand, when three (three kinds of) piggy characters are store (S294: YES), the "winner-takes-all object" process is executed (S295). The "winner-takes-all object" is a type of benefit which awards the player all the gains associated with the little pig's nose 210 ("fixed payout", "mini game I", "mini game II", and the like). After S295, a final effect is provided (S296). Specifically, the amount of credit won throughout the entire pick-up bonus game is displayed on the upper image display panel 131. After S296, the brick house stage process is completed.

When the selected little pig's nose 210 does not correspond to the piggy character (Straw Piggy 221, Stick Piggy 222, Brick Piggy 223) (S292: NO), the main CPU 71 in step S297 determines whether the selected little pig's nose 210 corresponds to the Wolf 220. In this case, the main CPU 71 provides an effect indicating termination of the pick-up bonus game (S298). Specifically, the wolf 220 enters the brick house displayed in the upper portion of the screen. After S298, the brick house stage process is completed.

<"Turnip Harvesting" Game Process>

Figure 28:
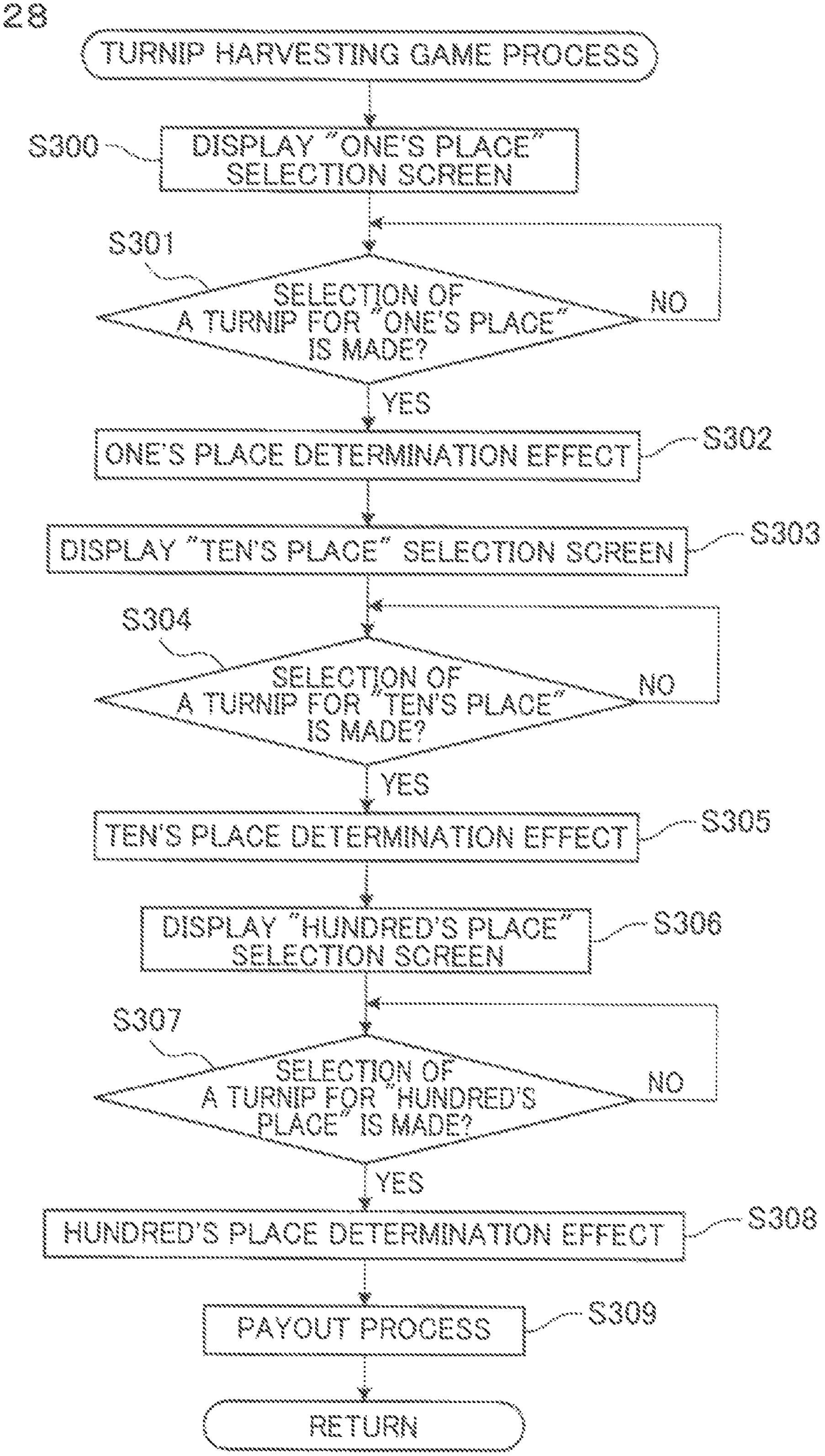
FIG. 28 is a view illustrating a flowchart of a "Turnip Harvesting" game process in the slot machine according to the first embodiment of the present invention.
Figure 29:
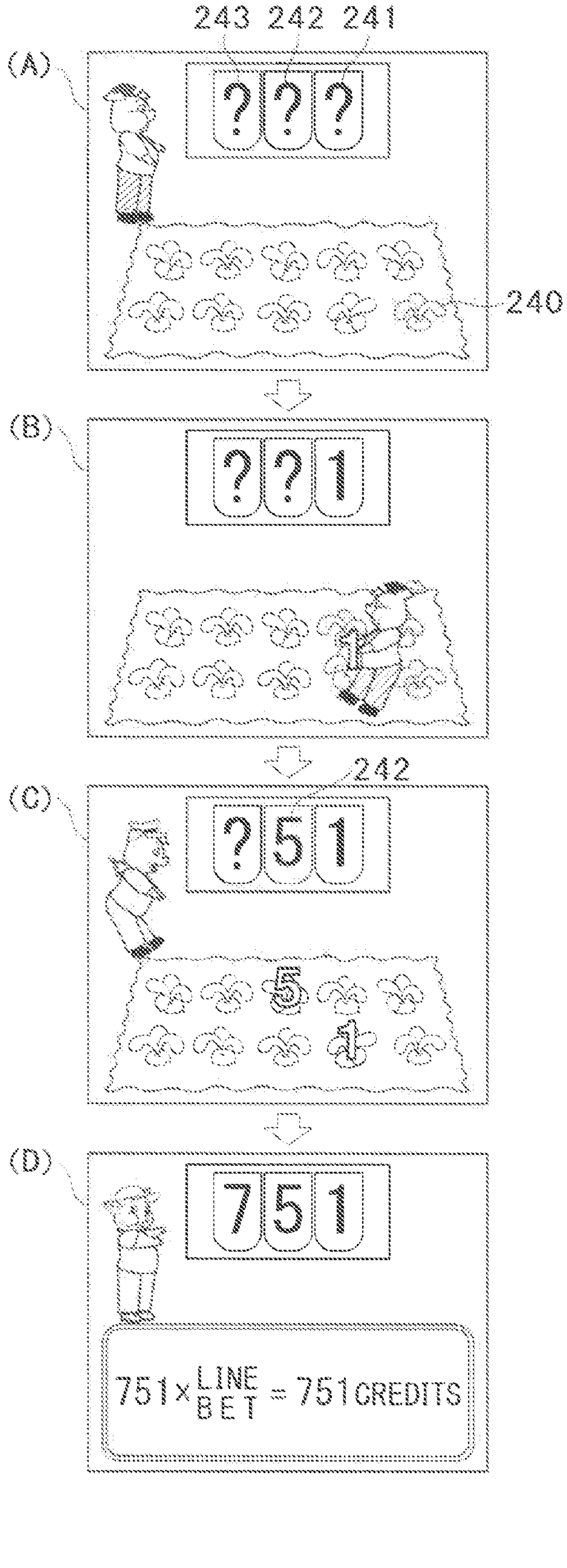
FIG. 29 shows an exemplary image of the "Turnip Harvesting" game displayed on the lower image display panel of the slot machine of the first embodiment according to the present invention.

Next, with reference to FIG. 28 and FIG. 29, the "Turnip Harvesting" game process is described below. FIG. 28 shows a flowchart of the "Turnip Harvesting" game process in the slot machine 10 according to the first embodiment of the present invention. FIG. 29 is a diagrams showing an exemplary image of the "Turnip Harvesting" game displayed on the lower image display panel 141 of the slot machine 10 according to the first embodiment of the present invention. The "Turnip Harvesting" game process is a process executed in S249 of the pick-up bonus game process shown in FIG. 24, in S269 of the stick house stage process shown in FIG. 25, and in S289 of the brick house stage process shown in FIG. 26. In each "Turnip Harvesting" game process, the expectation value for a payout is raised every time a step-up occurs from the pick-up bonus game to the stick house stage and the brick house stage.

First, in step S300, the main CPU 71 displays a selection screen that prompts selection of a Turnip 240 corresponding to the one's place 241 among the ten Turnips 240 displayed on the lower image display panel 141 (see FIG. 29(A)). Note that the number of Turnips 240 displayed on the lower image display panel 141 is set to three in S249 of the pick-up bonus game process, five in S269 of the stick house stage process, and ten in S289 of the brick house stage process. As should be understood from this, the number of selectable Turnips 240 is increased when step-up of the stage occurs.

Next, in step S301, the main CPU 71 determines whether the Turnip 240 corresponding to the one's place 241 is selected through the selection screen of the Turnips 240. Specifically, the main CPU 71 determines whether any of the portions of the touch panel 114 respectively corresponding to the Turnip 240 is touched. When it is determined that the Turnip 240 is not selected (S301: NO), the main CPU 71 shifts the process back to S301.

On the other hand, when it is determined that the Turnip 240 is selected (S301: YES), the "one's place" determination effect is executed (S302). In the "one's place" determination effect, the main CPU 71 samples a random number from a range of 0 to 9, and displays the sampled random number in the one's place 241 displayed on the lower image display panel 141 (see FIG. 29 (B)).

Next, in step S303, the main CPU 71 displays a selection screen that prompts selection of a Turnip 240 corresponding to the ten's place 242 out of the nine Turnips 240 displayed on the lower image display panel 141. Note that the number of selectable Turnips 240 on the lower image display panel 141 is one less than the number of the same in the selection screen for the "one's place" 241 displayed in S300.

Next, in step S304, the main CPU 71 determines whether the Turnip 240 corresponding to the ten's place 242 is selected through the selection screen of the Turnips 240. Specifically, the main CPU 71 determines whether any of the portions of the touch panel 114 respectively corresponding to the Turnip 240 is touched. When it is determined that the Turnip 240 is not selected (S304: NO), the main CPU 71 shifts the process back to S304.

On the other hand, when it is determined that the Turnip 240 is selected (S304: YES), the "ten's place" determination effect is executed (S305). In the "ten's place" determination effect, the main CPU 71 samples a random number from a range of 0 to 9, and displays the sampled random number in the ten's place 242 displayed on the lower image display panel 141 (see FIG. 29 (C)).

Next, in step S306, main CPU 71 displays a selection screen that prompts selection of a Turnip 240 corresponding to the hundred's place 243 out of the eight Turnips 240 displayed on the lower image display panel 141

Note that the number of selectable Turnips 240 on the lower image display panel 141 is further one less than the number of the same in the selection screen for the "ten's place" 242 displayed in S303.

Next, in step S307, the main CPU 71 determines whether the Turnip 240 corresponding to the hundred's place 243 is selected through the selection screen of the Turnips 240. Specifically, the main CPU 71 determines whether any of the portions of the touch panel 114 respectively corresponding to the Turnip 240 is touched. When it is determined that the Turnip 240 is not selected (S307: NO), the main CPU 71 shifts the process back to S307.

On the other hand, when it is determined that the Turnip 240 is selected (S307: YES), the "hundred's place" determination effect is provided (S308). In the "hundred's place" determination effect, the main CPU 71 samples a random number from a range of 0 to 9, and displays the sampled random number in the hundred's place 243 displayed on the lower image display panel 141. Thus, a three digit value is determine (see FIG. 29 (D)).

Then, an amount of credit corresponding to the three digit value determined (e.g., "751" of FIG. 29 (D)) is added to the value of payout amount stored in the RAM 73, and the payout process is executed (S309). The "Turnip Harvesting" game process is then completed.

In the above structure, when the object selected in the pick-up bonus game is an object related to awarding of the "Turnip Harvesting" game, selection of any one of the plurality of options displayed (Turnips 240) is made, and then a random number is sampled. The above selection is repeated a predetermined number of times, and the random numbers sampled are sequentially aligned from the one's place 241 to form a series of numbers. Then, a payout corresponding to a value which is the series of numbers is awarded. Thus, the player is able to play the mini game I 216 ("Turnip Harvesting" game) while being excited for an increase in the payout every time he/she makes his/her selection. The above structure therefore significantly enhances the player's expectation for the payout in the mini game I 216 ("Turnip Harvesting" game).

Further, in the above structure, when the object selected is an object that increases the expectation value of a payout to be awarded in the pick-up bonus game ("Stick House" 218, "Brick House" 219), the expectation value of a payout of the mini game I 216 ("Turnip Harvesting" game) is increased. That is, when the expectation value of a payout is increased, the player is given more chances for a greater payout than a case of not selecting the object for increasing the expectation value of a payout to be awarded in the pick-up bonus game. This enables provision of greater satisfaction to the player. Further, it is possible to cause the player to expect an occurrence of such a state where the expectation value of a payout is increased.

<Three Little Pigs Foot Race Game Process>

Figure 30:
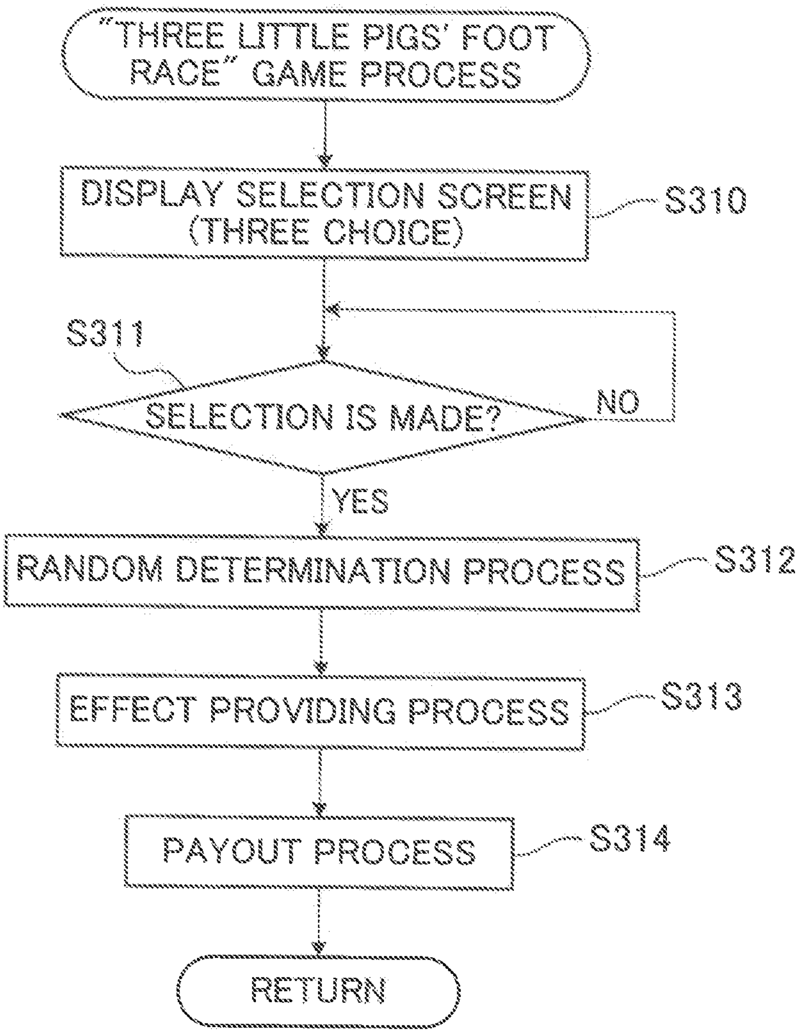
FIG. 30 is a view illustrating a flowchart of the "Three Little Pigs' Foot Race" game process in the slot machine according to the first embodiment of the present invention.
Figure 31:
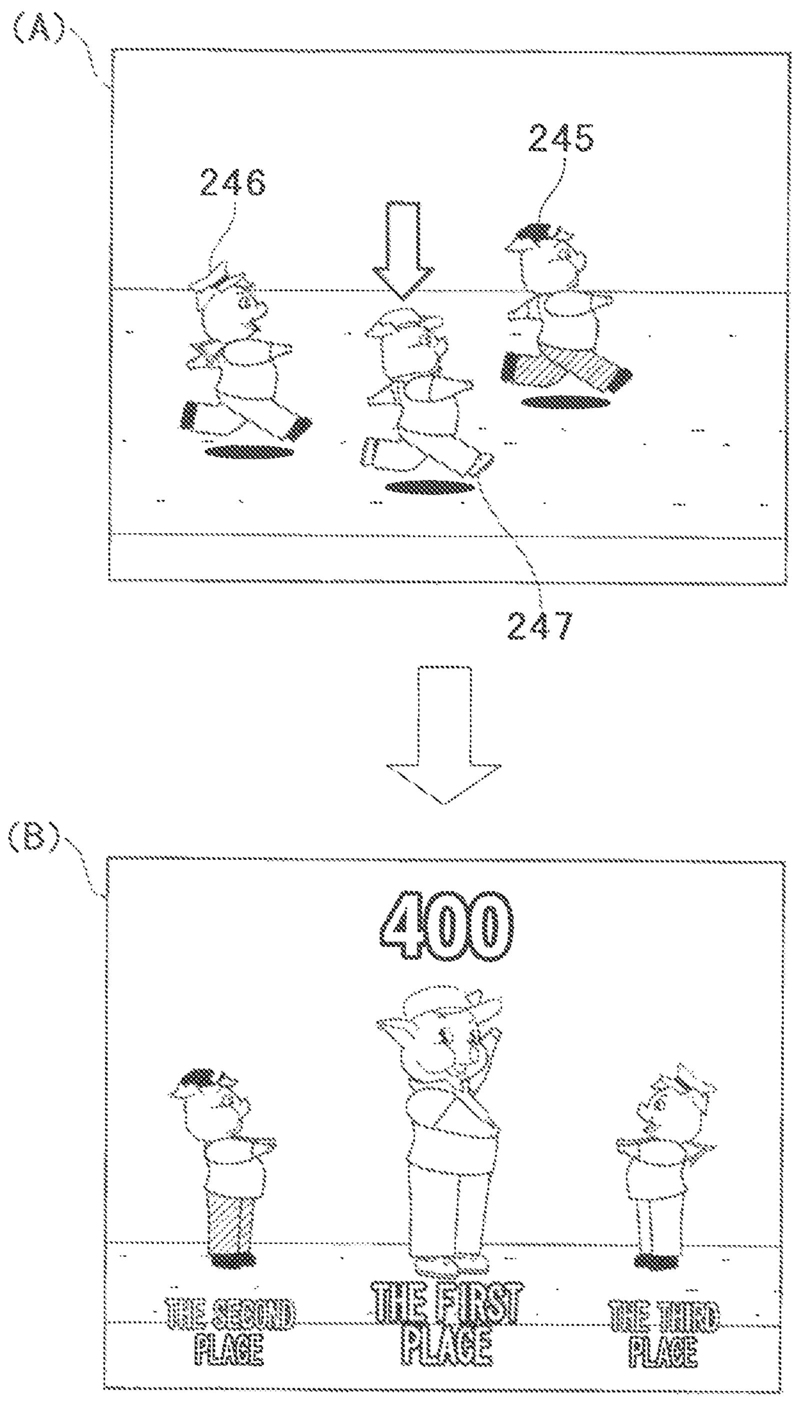
FIG. 31 shows an exemplary image of "Three Little Pigs' Foot Race" game displayed on the lower image display panel of the slot machine according to the first embodiment of the present invention.

Next, with reference to FIG. 30, the Three Little Pigs foot race game process is described below. FIG. 30 shows a flowchart of the Three Little Pigs Foot Race bonus game process in the slot machine 10 according to the first embodiment of the present invention. FIG. 31 shows an exemplary image of the Three Little Pigs foot race game displayed on the lower image display panel 141 of the slot machine 10 according to the first embodiment of the present invention. The Three Little Pigs foot race game process is a process executed in S251 of the pick-up bonus game process shown in FIG. 24, in S271 of the stick house stage process shown in FIG. 25, and in S291 of the brick house stage process shown in FIG. 26. In the Three Little Pigs foot race game, a player guesses which one of Three Little Pigs in a foot race goals first.

First, in step S310, the main CPU 71 displays a selection screen that prompts selection of one of the Three Little Pigs displayed on the lower image display panel 141, i.e., one piggy out of the Three Little Pigs (Straw Piggy 245, Stick Piggy 246, and Brick Piggy 247), as shown in FIG. 31 (A).

Next, in step S311, the main CPU 71 determines whether the selection of any of the Three Little Pigs is made through the selection screen of the Three Little Pigs. Specifically, the main CPU 71 determines whether any of the portions of the touch panel 114 respectively corresponding to the Three Little Pigs is touched. When it is determined that the selection of a Three Little Pigs is not made (S311: NO), the main CPU 71 shifts the process back to S311.

On the other hand, when it is determined that the selection of a Three Little Pigs is made (S311: YES), a random determination process is executed (S312). In this random determination process, there is determined whether to let the piggy selected in S311 goal first in the foot race. Specifically, the main CPU 71 samples a random number for a foot race, from the numbers ranging from 1 to 3. When the sampled random number is "1", the main CPU 71 determines to let the piggy selected in S311 goal first in the foot race.

Next, in S313, the main CPU 71 executes an effect providing process. Specifically, first, the lower image display panel 141 displays a video of the Three Little Pigs foot racing (see FIG. 31 (A)). When it is determined in the random determination process of S312 that the piggy selected in S311 is the piggy to goal first in the foot race, a video showing the piggy selected in S311 goaling first in the foot race is displayed (see FIG. 31 (B)). On the other hand, when it is determined in the random determination process of S312 that the piggy selected in S311 is not the piggy to goal first in the foot race, a video showing the piggy selected in S311 losing the foot race is displayed.

Next, when it is determined that the piggy selected in S311 goals first in the foot race, a payout process is executed (S314). Specifically, the main CPU 71 causes a payout of "400" credit as shown in FIG. 31 (B). The payout amount of "400" credit is added to the value of payout amount stored in the RAM 73. Thus, the Three Little Pigs foot race game process is completed.

As described above, the slot machine 10 of the first embodiment executes the following processes.

(a1) running a base game which variably displays the symbols on the symbol display device (lower image display panel 141) and stop-displays the symbols thereafter;

(a2) when the symbols stop-displayed in the base game run in (a1) includes a plurality of (three) specific symbols ("BONUS" symbol 250), enabling the input device (touch panel 114) to accept an input related to selection of any of the specific symbols stop-displayed;

(a3) determining whether or not the specific symbol selected in (a2) is a symbol that causes occurrence of a pick-up bonus game;

(a4) when the symbol is determined as to be a symbol that causes occurrence of a pick-up bonus game in (a3), enabling the input device to accept an input of selection of any of a plurality of selectable objects (twenty little pig's noses) displayed on the symbol display device;

(a5) awarding a payout according to an object selected out of the selectable objects in (a4);

(a6) when the object selected in (a4) is an object that increases an expectation value for a payout awarded in the pick-up bonus game (i.e., step-up), raising the expectation value for the payout;

(a7) repeating (a4) to (a6), until an object that terminates the pick-up bonus game is selected in (a4).

In the above structure, a plurality of (three) specific symbols (e.g. "BONUS" symbols 250) are stop-displayed in the base game, and in response to this, the player is able to select one of the plurality of specific symbols stop-displayed via the input device (touch panel 114). Then, when a specific symbol that causes occurrence of the pick-up bonus game is selected, the pick-up bonus game is started, and the player is able to select any of a plurality of selectable objects (20 little pig's noses 210). Then, a payout according to the object selected is awarded. Further, when the object selected is an object that increases the expectation value of a payout to be awarded in the pick-up bonus game ("Stick House" 218, "Brick House" 219), the expectation value of a payout is increased. That is, when the expectation value of a payout is increased, the player is given more chances for a greater payout than a case of not selecting the object for increasing the expectation value of a payout to be awarded in the pick-up bonus game. This enables provision of greater satisfaction to the player. Further, it is possible to cause the player to expect an occurrence of such a state where the expectation value of a payout is increased.

Further, the slot machine 10 of the first embodiment executes the following processes.

(a8) receiving a bet input of game media via the input device;

(a9) accumulatively storing at least a part of the game media having placed as a bet in (a8); and (a10) when the object selected in (a4) is an object that relates to awarding of a progressive payout, awarding at least a part of the game media stored in (a9) as a progressive payout.

In the above structure, the pick-up bonus game is started, and any of a plurality of selectable objects is selected. When the object selected relates to awarding of a progressive payout, a progressive payout is awarded. Note that the progressive payout is an amount of game media which are accumulatively stored by pooling at least a part of game media placed as a bet. That is, when a selectable object related to the progressive payout is selected, the player is able to win an accumulation of game media which are pooled from the player's own and the other player's game media placed as a bet. This is more delightful for the player.

Further, the slot machine 10 of the first embodiment executes the following processes. (a11) when the object selected in (a4) is a winner-takes-all object (when a total of three little pigs (Straw Piggy 221, Stick Piggy 222, Brick Piggy 223) are stored in the RAM 73), awarding the all the gains associated with the other selectable objects.

In the above structure, the pick-up bonus game is started, and any of a plurality of selectable objects is selected. When the object selected is a winner-takes-all object, all the gains associated with any of the remaining selectable objects are awarded. In other words, by selecting the winner-takes-all object, the player is able to receive the maximum amount of payout in the pick-up bonus game. This is more delightful for the player.

Further, a control method for the slot machine 10 of the first embodiment includes the steps of:

(b1) a controller (motherboard 70) running a base game which variably displays a plurality of symbols on a symbol display device capable of variably displaying the symbols and which stop-displays the symbols thereafter;

(b2) when a plurality of specific symbols are stop-displayed in the base game run in (b1), the controller receiving a selection of any of the specific symbols stop-displayed, via an input device capable of receiving a game-related instructions;

(b3) the controller determining whether a specific symbol selected in (b2) is a specific symbol that causes an occurrence of a pick-up bonus game;

(b4) when the controller determines in (b3) that the symbol is a symbol that causes occurrence of the pick-up bonus game, enabling the input device to accept an input of selection of any of a plurality of selectable objects displayed on the symbol display device;

(b5) the controller awarding a payout according to the object selected in (b4);

(b6) when the object selected in (b4) is determined as to be an object that increases the expectation value of a payout to be awarded in the pick-up bonus game (stage up), the controller increasing the expectation value of a payout; and (b7) the controller repeating (b4) to (b6) until the object selected in (b4) is an object that terminates the pick-up bonus game.

In the above structure, a plurality of specific symbols are stop-displayed in the base game, and in response to this, the player is able to select one of the plurality of specific symbols stop-displayed via the input device. Then, when a specific symbol that causes occurrence of the pick-up bonus game is selected, the pick-up bonus game is started, and the player is able to select any of a plurality of selectable objects. Then, a payout according to the object selected is awarded. Further, when the object selected is an object that increases the expectation value of a payout to be awarded in the pick-up bonus game, the expectation value of a payout is increased. That is, when the expectation value of a payout is increased, the player is given more chances for a greater payout than a case of not selecting the object for increasing the expectation value of a payout to be awarded in the pick-up bonus game. This enables provision of greater satisfaction to the player. Further, it is possible to cause the player to expect an occurrence of such a state where the expectation value of a payout is increased.

Further, the slot machine 10 of the first embodiment executes the following processes.

(c1) running a base game which variably displays and then stop-displays the symbols on the symbol display device;

(c2) determining whether symbols first stopped in the base game run in (c1) include both a symbol ("BONUS" symbol 250) needed for an occurrence of a bonus game (Three Little Pigs bonus game) and a symbol ("FREE GAME" symbol 230) needed for an occurrence of a free game;

(c3) when it is determined in (c2) that the symbols first stopped do not include the both a symbol needed for an occurrence of a bonus game and a symbol needed for an occurrence of a free game, reading out a sound effect for an ordinary stopping from the sound effect storage device (RAM 73) and playing the sound effect;

(c4) when it is determined in (c2) that the symbols first stopped include the both a symbol needed for an occurrence of a bonus game and a symbol needed for an occurrence of a free game, reading out a special-stopping sound effect from the sound effect storage device and playing the sound effect.

In the above structure, when the symbols first stopped on the symbol display device in a base game include the both a symbol needed for an occurrence of a bonus game and a symbol needed for an occurrence of a free game, a special-stopping sound effect is provided. With the special-stopping sound effect to notify the player that a bonus game or a free game which awards a special benefit or a payout may be given, it is possible to enhance the player's expectation. With the special-stopping sound effect to notify the player that a bonus game or a free game may be given, it is possible to enhance the player's expectation.

Further, the slot machine 10 of the first embodiment executes the following processes.

(d1) running a base game which variably displays the symbols on the symbol display device and stop-displays the symbols thereafter;

(d2) determining whether a plurality of symbols stop-displayed in the base game run in (d1) includes a symbol ("FREE GAME" symbol 230) that causes an occurrence of a free game;

(d3) running a free game when it is determined in (d2) that a symbol that causes an occurrence of a free game is included;

(d4) determining whether to award a payout according to the status of the free game run in (d3);

(d5) when it is determined in (d4) that a payout is to be awarded, randomly determining a magnification factor for the payout; and (d6) awarding as a payout of the free game a value resulting from multiplying the payout determined in (d4) by the magnification factor determined in (d5).

In the above structure, a player is entitled to play a free game when the symbol that causes an occurrence of a free game is stop-displayed in the base game. If the player wins the free game and a predetermined amount of payout is to be awarded, the magnification factor for that predetermined amount of payout is randomly determined. Thus, the player is able to receive a payout resulting from multiplying that predetermined amount of payout by the randomly determined magnification factor. This enables provision of greater satisfaction to the player. This structure also causes the player for the situation where a payout is multiplied by a magnification factor.

Further, the slot machine 10 of the first embodiment executes the following processes.

(e1) running a base game which variably displays the symbols on the symbol display device and stop-displays the symbols thereafter;

(e2) when the symbols stop-displayed in the base game run in (e1) includes a plurality of specific symbols, enabling the input device to accept an input related to selection of any of the specific symbols stop-displayed;

(e3) determining whether or not the specific symbol selected in (e2) is a symbol that causes an occurrence of a selection game (Piggy, Barrel and Wolf game);

(e4) when it is determined in (e3) that the specific symbol selected is a symbol that causes an occurrence of the selection game, receiving via the input device a selection of any of a plurality of selectable objects (four Barrels 185) displayed on the symbol display device;

(e5) awarding a payout according to an object selected out of the selectable objects in (e4);

(e6) repeating (e4) to (e5) until an object (Wolf 189) that terminates the selection game is selected in (e4).

In the above structure, a plurality of specific symbols are stop-displayed in the base game, and in response to this, the player is able to select one of the plurality of specific symbols stop-displayed via the input device. When a specific symbol that causes an occurrence of the selection game is selected, the selection game is started, and the player is able to select any of a plurality of selectable object (four Barrels 185). Then, a payout according to the object selected is awarded. Further, the selection game is continued until the player selects an object (Wolf 189) that terminates the selection game. This causes greater expectation of the player for the payout in the selection game.

Further, the slot machine 10 of the first embodiment executes the following processes.

(f1) running a base game which variably displays the symbols on the symbol display device and stop-displays the symbols thereafter;

(f2) when the symbols stop-displayed in the base game run in (f1) includes a plurality of specific symbols, enabling the input device to accept an input related to selection of any of the specific symbols stop-displayed;

(f3) determining whether or not the specific symbol selected in (f2) is a symbol that causes occurrence of a pick-up bonus game;

(f4) when the symbol is determined as to be a symbol that causes occurrence of a pick-up bonus game in (f3), enabling the input device to accept an input of selection of any of a plurality of selectable objects (twenty little pig's noses 210) displayed on the symbol display device;

(f5) when the object selected in (f4) is an object ("mini game I" 216) that relates to awarding of a mini game, receiving via the input device a selection of any one of a plurality of options (Turnips 240) displayed;

(f6) when any of the options is selected in (f5), sampling a random number ranging from 0 to 9;

(f7) repeating (f5) to (f6) a predetermined number of times;

(f8) after repeating the processes a predetermined number of times in (f7), aligning random numbers sampled sequentially from the one's place 241; and (f9) awarding a payout corresponding to a value which is a series of numbers aligned in (f8).

In the above structure, when the object selected in the pick-up bonus game is an object related to awarding of a "mini game I" 216, a selection of any one of the plurality of options (Turnips 240) displayed is received, and then a random number is sampled. The above selection is repeated a predetermined number of times, and the random numbers sampled are sequentially aligned from the one's place 241 to form a series of numbers. Then, a payout corresponding to a value which is the series of numbers is awarded. Thus, the player is able to play the ("mini game I" 216) while being excited for an increase in the payout every time he/she makes his/her selection. The above structure therefore significantly enhances the player's expectation for the payout in the mini game ("mini game I" 216).

Further, the slot machine 10 of the first embodiment executes the following processes.

(f10) when the object selected in (f4) is an object that increases an expectation value for a payout awarded in the pick-up bonus game (i.e., "Stick House "218," Brick House 219"), raising the expectation value for the payout to be awarded in (f9);

In the above structure, when the object selected is an object that increases an expectation value for a payout awarded in the pick-up bonus game (i.e. "Stick House" 218, "Brick House" 219), the expectation value for the payout in the mini game ("mini game I" 216) is increased. That is, when the expectation value of a payout is increased, the player is given more chances for a greater payout than a case of not selecting the object for increasing the expectation value of a payout to be awarded in the pick-up bonus game. This enables provision of greater satisfaction to the player. Further, it is possible to cause the player to expect an occurrence of such a state where the expectation value of a payout is increased.

[Second Embodiment]

A second embodiment deals with the structures of (1) to (9) described in Summary of the Invention hereinabove. The elements of the following embodiments that are identical to those structuring the slot machine 10 of the foregoing embodiment are given the same reference numerals in the following description. Further, the descriptions of the foregoing embodiment which also applies to the second embodiment are omitted here. First, an overview of the second embodiment is described.

[Outline of the Second Embodiment]

As shown in FIG. 3, a gaming system 300 of the present embodiment is structured to enable participation of multiple players, and a plurality of slot machines 10 each serving as a gaming terminal are connected in a data-communicable manner to the center controller 200. That is, the entire gaming system is driven as a gaming machine. However, the gaming system may be a single slot machine 10 which is driven as a stand-alone gaming machine.

The slot machine 10 of the present embodiment (see FIG. 4) runs a slot game as a base game. In the slot game of the base game, symbol columns each structured by a plurality of symbols are variably displayed, on condition that game media is bet.

When three bonus symbols are stopped in the slot game, an input of selection of one of the three bonus symbols stopped is waited. This game which is run when three bonus symbols are stopped is hereinafter referred to as a three-choice bonus game. Note that the three-choice bonus game including various feature games started in the three-choice bonus game is also referred to as a branching bonus game or simply as a bonus game.

The three bonus symbols are respectively associated with predetermined benefits, and a benefit associated with the selected bonus symbol is awarded. The benefit is a credit payout (fixed payout), a credit determination game, or a 29-choice game. Note that the 29-choice game is also referred to as a pick-up bonus game.

In the present embodiment, when a bonus symbol corresponding to the credit payout is selected, a game state that further enables selection of one of two remaining bonus symbols occurs at a predetermined probability. When one of the bonus symbols is selected during this game state, the credit determination game or the 29-choice game associated with that bonus symbol is executed. In the present embodiment, the three-choice bonus game including the 29-choice game or the like started in the three-choice bonus game is referred to as a bonus game.

In the 29-choice game, a plurality of selectable objects (29 objects in the present embodiment) is displayed, and a benefit associated with the selectable object is awarded. The benefit is a credit payout, an entitlement to play roulette, or an item accumulation game.

In the present embodiment, when the selectable object selected in the 29-choice game is not an object that causes termination of the 29-choice game, selection of another one of the selectable objects excluding the already selected object is enabled.

Further, in the slot machine 10 of the present embodiment, the free game is started when three free game symbols 603 are stopped in the slot game run as the base game. Unlike the base game, the free game does not require a bet of game media. Note that in the present embodiment, the free game is started without a bet of a game media; however, the free game may be configured to start on condition that a less amount of game media than the base game is bet.

<Base Game>

Figure 32:
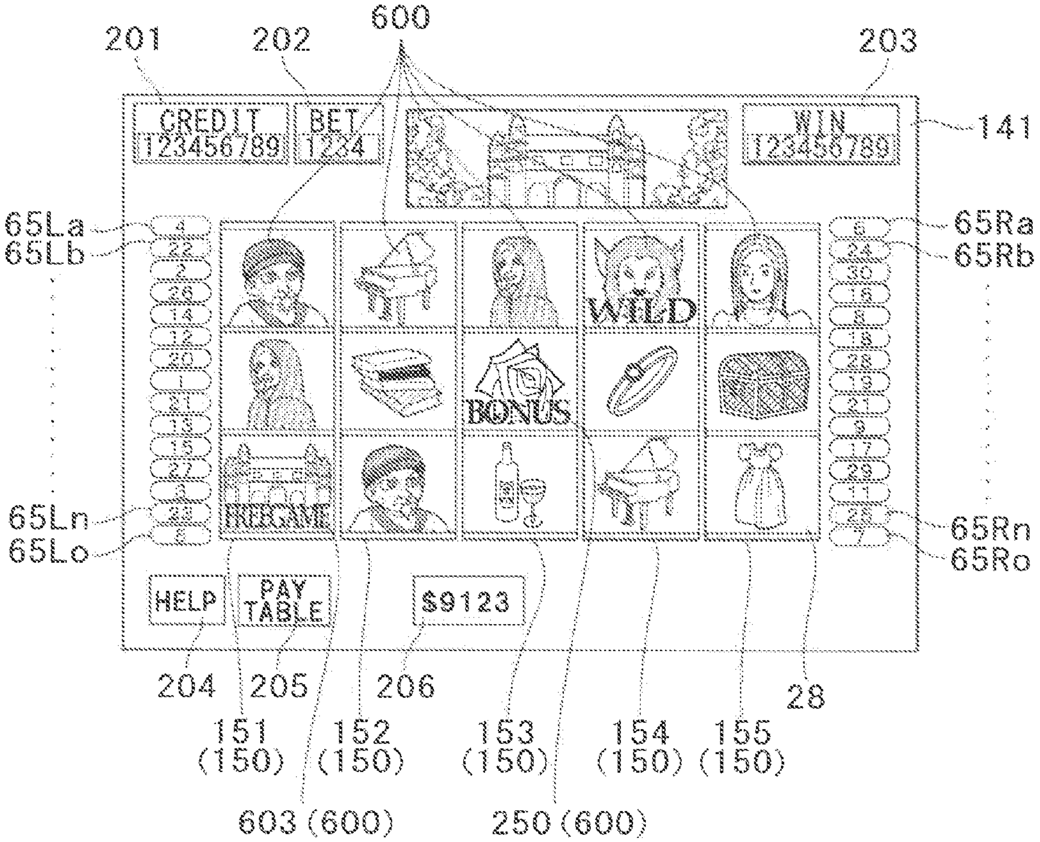
FIG. 32 shows an exemplary image of the base game displayed on the lower image display panel of a slot machine according to a second embodiment of the present invention.

The following describes the second embodiment with reference to attached drawings. as shown in FIG. 32, the lower image display panel 141 (see FIG. 4) of the slot machine 10 of the present embodiment displays five video reels 150 (151, 152, 153, 154, 155) substantially at its center portion, as is the case with the first embodiment. Each video reel 150 has three display blocks 28. That is, each of the video reels 151, 152, 153, 154, 155 has three display blocks 28 which are: an upper stage, a middle stage, and a lower stage. These video reels 150 while being stop-displayed are able to display fifteen symbols in total. The expression "stop-display" means a state where the symbols can be visually observed by a player, and the wording "arranging" is also used in the same meaning. Further, the expression "rearrange" means to dismiss an arrangement of symbols and then again arrange symbols.

FIG. 32 shows the video reels 150 on which base game symbols 600 are scroll-displayed and then stop-displayed in the base game. That is, the lower image display panel 141 corresponds to the symbol display device of the present invention capable of variably displaying a plurality of symbols. In other words, the symbol display device is capable of scroll-displaying on the video reels 150 a plurality of symbol columns (see FIG. 33) each structured by a plurality of base game symbols 600.

The following describes with reference to FIG. 33 the symbol columns scroll-displayed on the video reels 150. FIG. 33 shows a base game symbol table. The base game symbol table indicates the symbol columns to be scroll-displayed on the video reels 150. To each of the 22 base game symbols 600 constituting the symbol columns is given one of code numbers 0 to 21. As shown in FIG. 33, each symbol column is structured by a combination of symbols related to a folklore "Beauty and Beast". Those symbols includes: "Beauty", "Merchant", "Treasure Box", "Ring", "Clavecin", "Book", "Dress", "Wine", "Witch", "FREE GAME", "BONUS", and "WILD". Note that the base game symbol 600 of "WILD" is a symbol that can be deemed as any of the other symbols.

Further, similarly to the first embodiment, the lower image display panel 141 displays a credit amount indicator 201 displaying a credit amount, a bet amount display unit 202 displaying a bet amount, a payout amount display unit 203 displaying a payout amount, a Help display button 204, a pay table display button 205 for displaying a payout table, a denomination display unit 206 displaying the minimum unit of the game media used in the game, and a total of 30 payline occurrence part 65. Note that there are thirty different pay lines to be formed by the payline occurrence parts 65 as is the case with the first embodiment.

Rearrangement of a predetermined combination of the base game symbols 600 on the pay line results in an advantageous game state for the player. Such a predetermined combination is also referred to as a winning combination. The wording "advantageous" means that: a predetermined number of coins according to the winning combination are paid out; the number of coins to be paid out is added to the credit; and a bonus game is started; or the like. Note that formation of a winning combination by the symbols rearranged is also expressed as "establishment of a winning combination", or "winning of a winning combination".

Winning combinations of the present embodiment are: a "Mini Win combination" which awards a Mini-Win payout, a "Special Winning Combination A" that starts a bonus game, and a "Special Winning Combination B" that starts a free game. The "Mini Win combination" occurs when symbols rearranged on a single pay line includes a predetermined number or more of at least one of the following types of the base game symbol 600: "Beauty", "Merchant", "Treasure Box", "Ring", "Clavecin", "Book", "Dress", "Wine", and "Witch". When the "Mini Win combination" is won, a payout is awarded according to the symbol, and the number of the symbols on the pay line. Note that the present embodiment deals with a case where the "WILD" symbol is effective only in relation to the "Mini Win combination".

Further, the "Special Winning Combination A" occurs when the base game symbol 600 of "BONUS" is rearrange in the respective display blocks 28 in the middle stages of the video reels 151, 153, and 155. Note that winning of the "Special Winning Combination A" is also expressed as the bonus game trigger is established. That is, the base game symbol 600 of "BONUS" serves as a specific symbol that starts the bonus game.

Further, the "Special Winning Combination B" occurs when a predetermined number of "FREE GAME" base game symbols 600 are rearranged on a single pay line. Unlike the function flow of FIG. 2, the free game of the present embodiment is started when the "Special Winning Combination B" is won during the base game. Note that winning of the "Special Winning Combination B" is also expressed as the free game trigger is established. That is, the base game symbol 600 of "free game" serves as a specific symbol that starts a free game.

<Main Control Process>

The following describes with reference to FIG. 9 a main control process of the present embodiment in which a base game is run. However, the following description deals only with the parts of the main control process that are different from main control process of the first embodiment.

The flowchart of the main control process of the present embodiment is different from that of the first embodiment in that the main CPU 71 determines whether or not the bonus game trigger is established in step S21. That is, the main CPU 71 determines whether the "Special Winning Combination A" is won. Another difference from the first embodiment is that the main CPU 71 executes the bonus game process in step S22.

(Bonus Game: Three-Choice Bonus Game)

Figure 34:
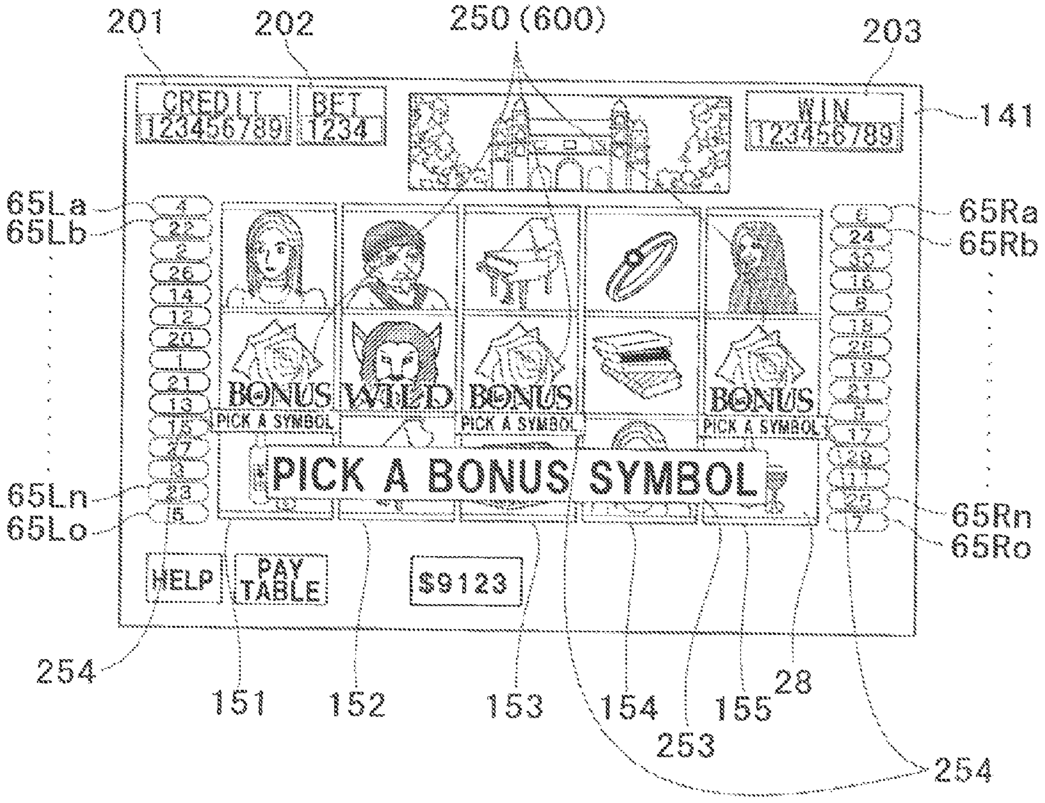
FIG. 34 shows an exemplary image of a three-choice bonus game displayed on the lower image display panel of the slot machine according to the second embodiment of the present invention.

Next, the following describes a bonus game which is run when the bonus game trigger is established. FIG. 34 shows a situation where the three-choice bonus game is started in response to stop-displaying of three bonus symbols 250 in the respective display blocks 28 in the middle stages of the video reels 151, 153, and 155, after the scroll-display of the symbols shown in FIG. 32. Note that the bonus symbol 250 of the present embodiment is the "Rose" and is different from the bonus symbol of the first embodiment.

Specifically, the lower image display panel 141 displays at its lower part an image 253 that prompts the player to select any one of the bonus symbols 250, and displays in the respective lower parts of the bonus symbols an image 254 that prompts the player to select any of the bonus symbols 250. As shown in FIG. 34, the player at this point is not able to visually confirm which benefit (credit payout, bonus symbol 250, credit determination game or 29-choice game) is associated with the bonus symbols 250.

The lower image display panel 141 is provided with a touch panel 114 (see FIG. 6), and the player is able to select one of the bonus symbols 250 by touching any one of portions of the touch panel 114 respectively corresponding to the three bonus symbols 250 stop-displayed. In other words, the touch panel 114 accepts an input related to selection of any of the plurality of bonus symbols 250 stop-displayed. That is, the touch panel 114 corresponds to the input device of the present invention capable of receiving an input of instructions related to the game.

Figure 35:
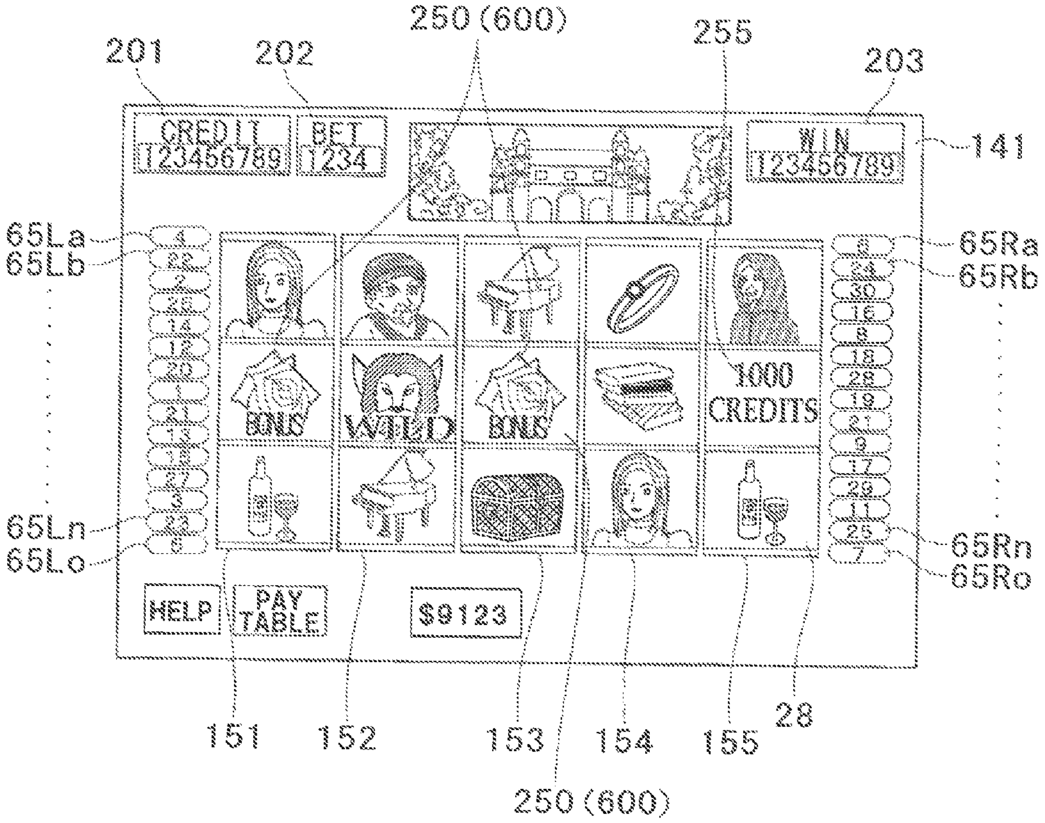
FIG. 35 shows another exemplary image of the three-choice bonus game displayed on the lower image display panel of the slot machine according to the second embodiment of the present invention.

When a bonus symbol 250 is selected by the player, an image indicating the benefit (credit payout, credit determination game, or 29-choice game) associated with the selected bonus symbol 250 is displayed in a portion corresponding to that bonus symbol 250, as shown in FIG. 35. FIG. 35 shows a situation where a bonus symbol 250 stop-displayed on the fifth video reel 155 is selected, and the an image 255 indicating the credit payout is displayed in the display block 28 of the bonus symbol 250.

<Bonus Game Process>

In relation to the bonus game process of the present embodiment which mainly runs the three-choice bonus game, the following describes only the parts that are different from the "Three Little Pigs bonus game process" described in the first embodiment with reference to FIG. 21. Note that the present embodiment refers to FIG. 34 instead of FIG. 10(D) referred in the description of the process in the first embodiment.

The present embodiment differs from the first embodiment in that the main CPU 71 in step S214 determines whether a bonus symbol 250 indicating a credit determination game is selected. Further, step S215 executed when a bonus symbol 250 indicating the credit determination game is selected is different from the first embodiment in that the credit determination game is run.

<Bonus Game: Credit Determination Game>

Next, the following describes the credit determination game which is run when a bonus symbol 250 indicating the credit determination game is selected in the three-choice bonus game shown in FIG. 34.

Figure 36:
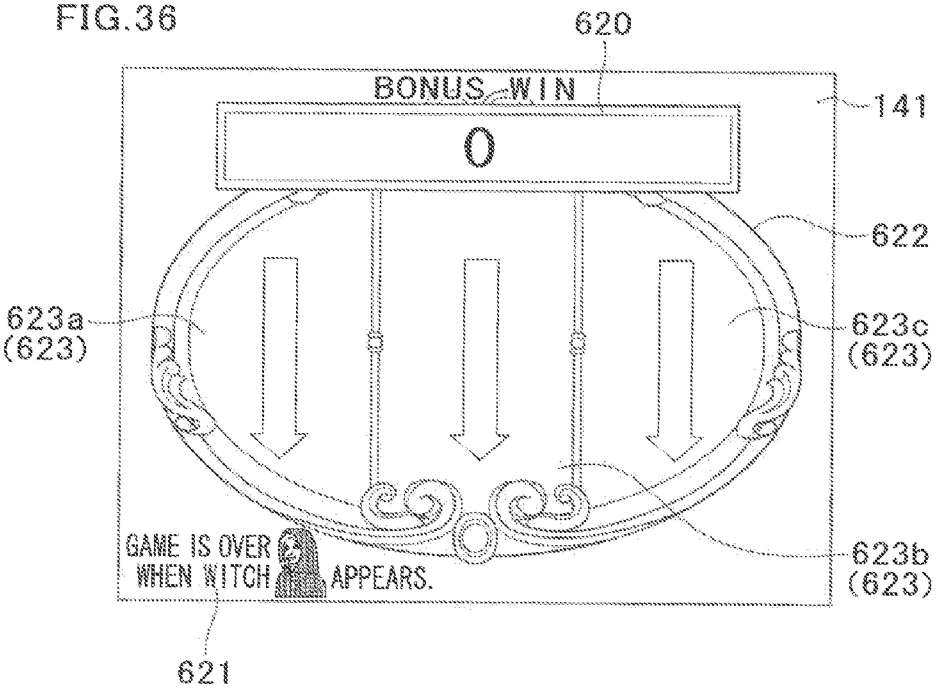
FIG. 36 shows an exemplary image of a credit determination game displayed on the lower image display panel of the slot machine according to the second embodiment of the present invention.
Figure 37:
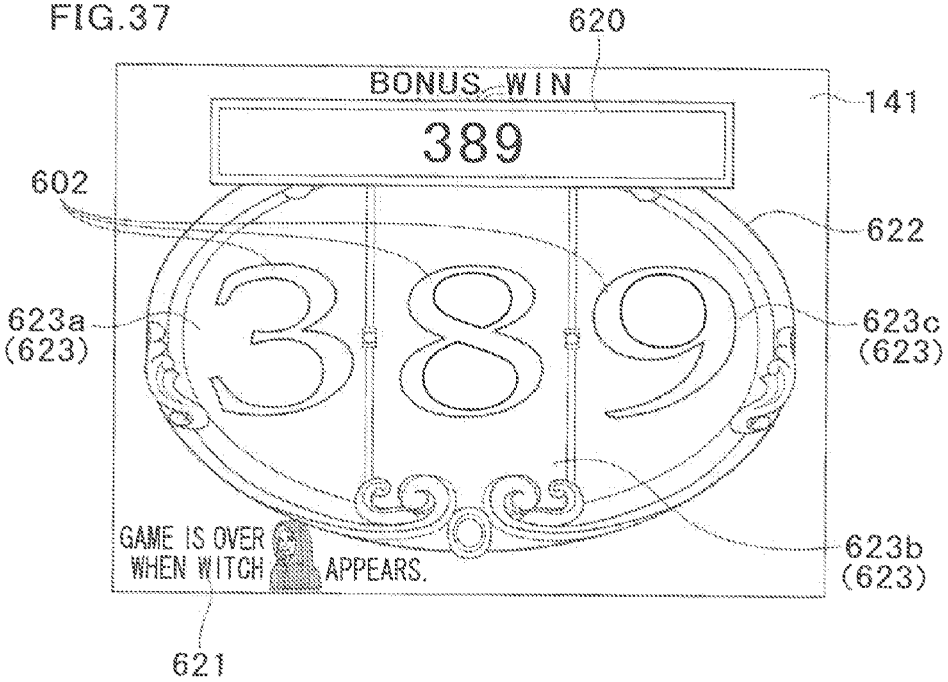
FIG. 37 shows another exemplary image of the credit determination game displayed on the lower image display panel of the slot machine according to the second embodiment of the present invention.
Figure 38:
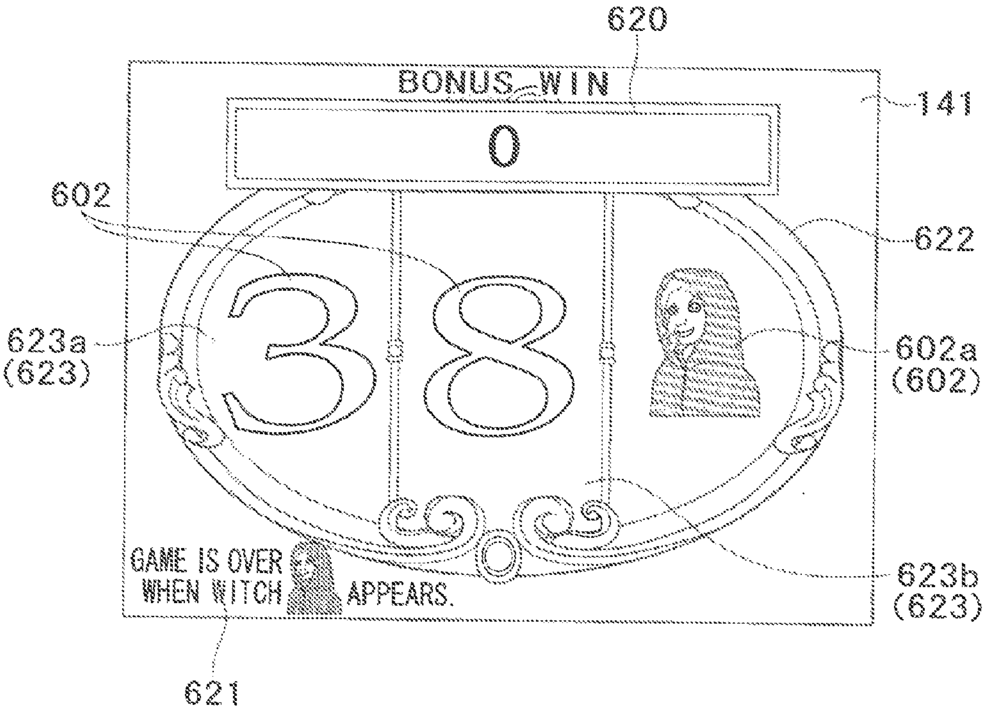
FIG. 38 shows yet another exemplary image of the credit determination game displayed on the lower image display panel of the slot machine according to the second embodiment of the present invention.

The credit determination game is so-called slot game. As shown in FIG. 36 through 38, in the credit determination game, the lower image display panel 141 displays a Mirror reel area 622 in the center thereof, and video reels 623 (623*a*, 623*b*, 623*c*) are displayed in the Mirror reel area 622. Each video reel 623 scroll-displays and then stop-displays a symbol column structured by a plurality of credit determination game symbols 602. Note that the Mirror reel area 622 is an area which displays an image of a mirror in a horizontally stretched oval shape. In this area, the plurality of symbol column (three columns in the present embodiment) are scroll-displayed and then stop-displayed.

The following describes with reference to FIG. 39 the symbol columns scroll-displayed on the video reels 623. FIG. 39 shows a credit determination game symbol table. The credit determination game symbol table indicates the symbol columns scroll-displayed on the video reels 623. To each of the 22 credit determination game symbols 602 constituting the symbol columns is given one of code numbers 0 to 21. As shown in FIG. 39, each symbol column on the video reels 623*a* and 623*b* is structured by a combination of symbols indicating single digit numbers, i.e., "0", "1", "2", "3", "4", "5", "6", "7", "8", and "9". The symbol column on the video reel 623*c* is structured by a combination of these symbols indicating the single digit numbers and "Witch" symbol. That is, the credit determination game symbols 602 include: "1", "2", "3", "4", "5", "6", "7", "8", "9", and "Witch" symbol.

Further, as shown in FIG. 36 through FIG. 38, the lower image display panel 141 displays at its top an acquired credit display unit 620 displaying the credit awarded in the credit determination game, and displays at its lower left part a terminating condition image 621 including text reading "Game is Over When Witch Appears", which is an image indicating a condition for terminating the credit determination game.

As shown in FIG. 36, when the credit determination game is started, the symbol columns are scroll-displayed on the video reels 623. Then, as shown in FIG. 37, the symbol columns scroll-displayed on the video reels 623 are stop-displayed, and one credit determination game symbol 602 is visibly displayed on each video reel 623. That is, the credit determination game of the present embodiment is one-line three-reel slot game.

In the credit determination game, a credit indicated by the credit determination game symbols 602 stop-displayed is awarded. That is, the credit determination game is a bonus game configured to award a three digit credit, and each video reel 623 corresponds to one of the three digits. Specifically, the video reel 623*a* at the first column corresponds to the third digit, and the video reel 623*b* at the second column corresponds to the second digit, and the video reel 623*c* of the third column corresponds to the third digit.

In the example shown in FIG. 37, a "3" symbol is arranged on the video reel 623*a*, a "7" symbol on the video reel 623*b*, and a "8" symbol on the video reel 623*a*. Thus, the credit to be awarded is "378 credit". As should be understood from this, the credit is determined by the number indicated by the credit determination game symbols 602 stop-displayed on the video reels 623 serving as the symbol display regions.

Note that the payout awarded in the credit determination game may be a product resulting from the multiplication of the number arranged on the reels by a predetermined value. In this case, the multiplying value may be varied according to the bet amount when the bonus trigger is established. For example, the multiplying value may be increased with an increase in the amount of bet when the bonus trigger is established. Further, the number of video reels is not limited.

Further, the credit determination game is terminated when the witch symbol 602*a* is arranged on the video reel 623*c* as shown in FIG. 38, as a result of stop-displaying the symbol columns on the video reels 623. Note that when the credit determination game is terminated, an effect is displayed such that the image of mirror in the Mirror reel area 622 is cracked.

<Credit Determination Game Process>

Figure 40:
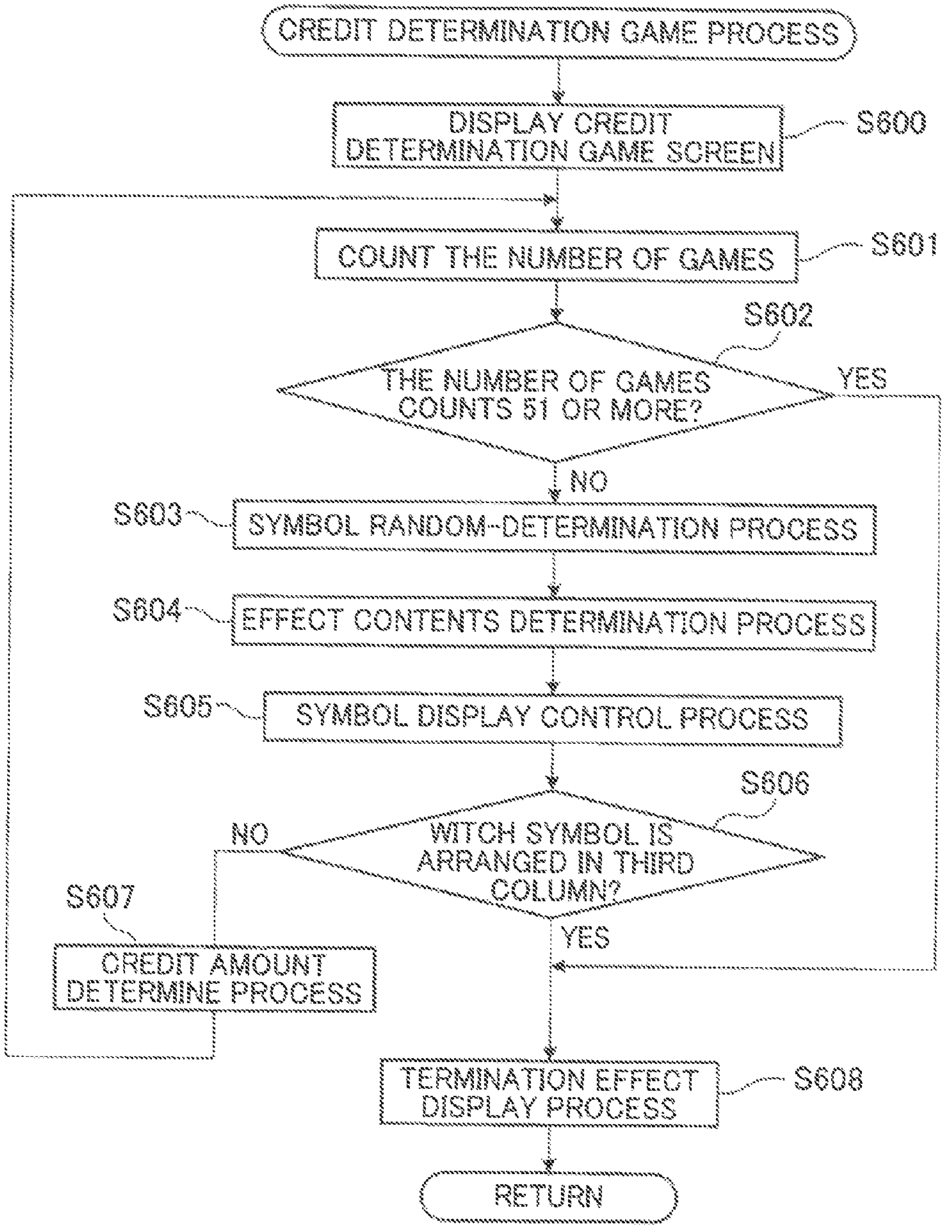
FIG. 40 is a view illustrating a flowchart of the credit determination game process in the slot machine according to the second embodiment of the present invention.

Next, the following describes with reference to FIG. 40 the credit determination game. FIG. 40 is a diagram showing a flowchart of the credit determination game process executed in the bonus game process described with reference to FIG. 10(D).

First, the main CPU 71 displays a credit determination game screen (S600). Then, the game to be started is counted (S601). Specifically, the number of credit determination games in the RAM 73 is incremented by one. Then, there is determined whether the number of games is 51 or more (S602). When it is determined that the number of games is less than 51 (S602: NO), the symbol random-determination process is executed (S603).

The symbol random-determination process of the first embodiment described with reference to FIG. 14 is executed for each of the video reels 623, and there is determined which one of the credit determination game symbol 602 in the credit determination game symbol table is to be stop-displayed. Then, the effect contents determination process is executed (S604), and the symbol display control process is executed thereafter to stop-display and arrange the determined credit determination game symbols 602, after the video reels 623 are scroll-displayed according to the contents of effect determined (S605).

Next, there is determined whether the witch symbol 602*a* is arranged on the third column (S606). If the witch symbol 602*a* is not arranged (S606: NO), the credit amount determine process is executed (S607). Specifically, in the process, a credit amount is calculated from the numbers indicated by the credit determination game symbols 602 arranged on the video reels 623. The credit amount thus calculated is accumulatively added to the acquired credit amount of the credit determination game stored in the RAM 73, and the acquired credit display unit 620 displaying an accumulation of the acquired credit amount is updated. Then the process shifts to step S601 and step S601 to S606 are repeated.

On the other hand, when the witch symbol 602*a* is arranged in step S606 (S606: YES), or the number of games is 51 or more in step S602 (S602: YES), a termination effect display process is executed to provide an effect such that the image of mirror in the Mirror reel area 622 is cracked (S608). This routine is completed thereafter. Further, although illustration is omitted, an accumulation of the credit amount awarded in the credit determination game is added to the current credit amount of the player in the RAM 73, at the end of this routine.

As described, when the plurality of bonus symbols 250 stop-displayed forms a predetermined combination in the base game, the player is able to select any of the plurality of bonus symbols 250 stop-displayed via the touch panel 114. When the bonus symbol 250 that causes an occurrence of the credit determination game is selected, there is started a credit determination game configured to award a credit whose maximum digit number is prefixed.

In the credit determination game, a plurality of symbol columns structured by symbols for the credit determination game 602 including symbols indicating a single digit number are scroll-displayed and then stop-displayed on the video reels 623 corresponding to the digits of credits, respectively. Based on the value indicated by the symbols for the credit determination game 602 thus stop-displayed, the credit is determined. The number indicated by each of the symbols for the credit determination game which are stop-displayed and arranged as an effect indicates the number of the corresponding digit of the credit to be awarded. This realizes a gaming machine with a new type of entertainment characteristic such that the player expects he/she may be able to determine the credit.

<Bonus Game: Pick-Up Bonus Game>

Next, the following describes the pick-up bonus game (29-choice game) which is run in the present embodiment. In the present embodiment, when a bonus symbol 250 corresponding to the pick-up bonus game is selected in the selection screen (see FIG. 34) of the three-choice bonus game, the pick-up bonus game is run which enables the player to select any of 29 touch symbols serving as selectable objects. In the pick-up bonus game, various types of benefits are awarded according to the selected touch symbol. The benefits are: awarding of a predetermined credit payout, winning of a character (entitlement to roulette game), and item accumulation game. When the object selected indicates termination of the pick-up bonus game, a four-choice game is runnable at the end.

Figure 41:
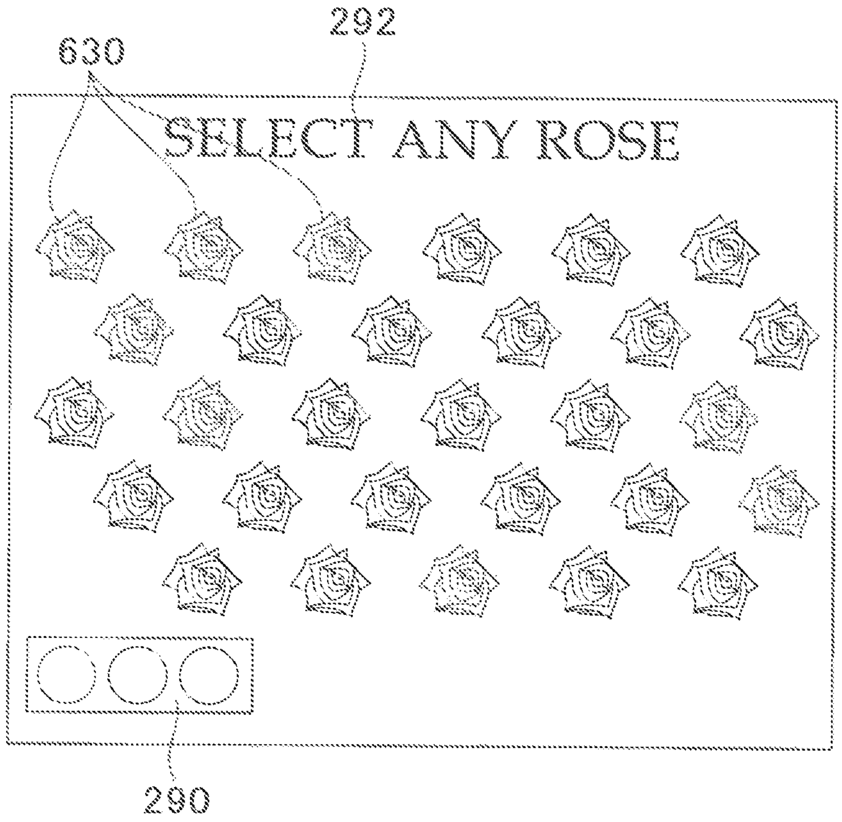
FIG. 41 shows an exemplary image of a pick-up bonus game displayed on the lower image display panel of the slot machine according to the second embodiment of the present invention.

First, the 29-choice game is outlined with reference to FIG. 41. First, when the bonus symbol 250 corresponding to the 29-choice game is selected in the selection screen of the three-choice bonus game, there is displayed a selection screen with 29 touch symbols serving as the selectable objects, as shown in FIG. 41. The selection screen with the touch symbols is such that 29 touch symbols 630 which are symbols of red roses are displayed in the predetermined positions at substantially the center of the lower image display panel 141. At this point, the player is not able to see which one of: awarding of a credit payout, winning of a character, running of the item accumulation game, and termination of the 29-choice game, each touch symbol 630 is associated with.

In the lower left part of the lower image display panel 141 is displayed a character meter image 290 displaying a character acquired. Further, in the upper part of the lower image display panel 141 is displayed an image 292 that prompts selection of the touch symbol 630.

When the selection screen with 29 touch symbols is displayed, the player is able to select a touch symbol 630 by touching a portion of the touch panel 114 corresponding to the touch symbol 630. When any of the touch symbols 630 is selected, the associated contents of the touch symbols 630 is displayed, and one of the following is executed: awarding of a credit payout, winning of a character, running of the item accumulation game, and termination of the 29-choice game. Note that the 29 selectable objects include, at a predetermined probability, a touch symbol 630 which awards a progressive payout.

<Pick-Up Bonus Game Process>

Figure 42:
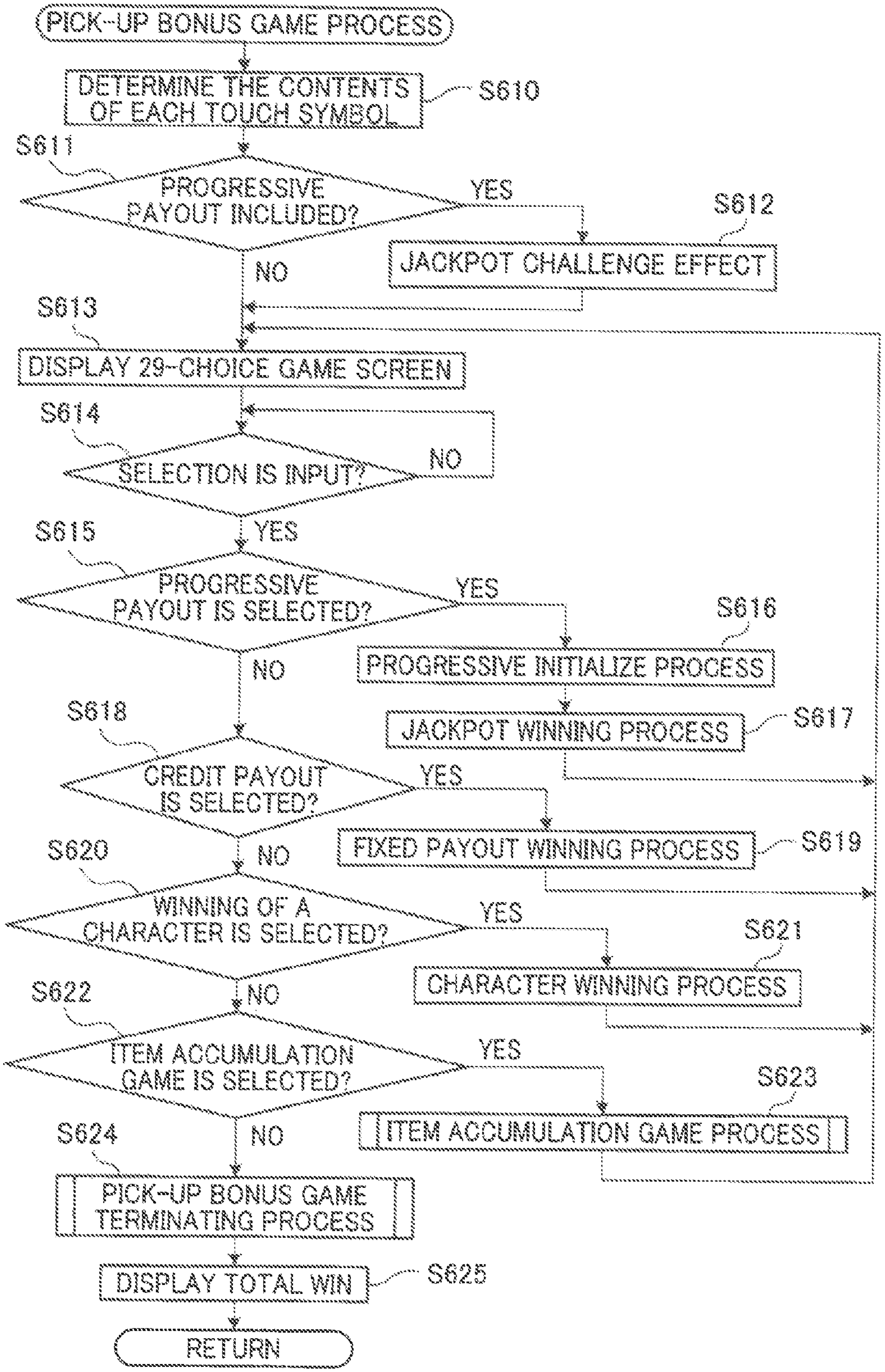
FIG. 42 shows a flowchart of the pick-up bonus game process in the slot machine according to the second embodiment of the present invention.

Next, the following describes with reference to FIG. 42 a pick-up bonus game. FIG. 42 shows a flowchart of the pick-up bonus game process executed in the bonus game process described with reference to FIG. 10(D).

First, the main CPU 71 determines the content of a touch symbol 630 (S610). Specifically, first, the main CPU 71 determines whether to include a touch symbol 630 indicating awarding of the progressive payout. Then, for each position of the touch symbol 630, the contents to be associated are randomly determined. Of the 29 touch symbols 630, 18 of them are associated with awarding of a credit payout, three of them are associated winning of a character (one of three types), another three of them are associated with running of item accumulation game, and the remaining five are associated with termination of the pick-up bonus game. Note that of the 18 touch symbols 630 associated with awarding of a credit payout, three of them are associated with awarding of “90” credit, six of them are associated with awarding of “60” credit, and nine of them are associated with awarding of “30” credit. When the 29 touch symbols 630 includes one associated with awarding of a progressive payout, the number of touch symbols 630 associated with awarding of “60” credit is eight. Note that the contents of the touch symbols 630 of the pick-up bonus game are not limited to those mentioned above.

Next, there is determined whether the 29 touch symbols 630 includes a touch symbol 630 associated with awarding of a progressive payout (S611). When a touch symbol 630 associated with awarding of a progressive payout is included (S611: YES), a “JACKPOT CHALLENGE” effect is provided (S612). Specifically, an indication that one of the 29 touch symbols 630 is associated with a progressive payout is performed in the selection screen of the pick-up bonus game. After step S612, or when it is determined in step S612 that no touch symbol is associated with a progressive payout (S611: NO), the lower image display panel 141 displays a selection screen that prompts selection of one of the 29 touch symbols 630 displayed, as shown in FIG. 41 (S613). The selection screen is displayed on the lower image display panel 141 in such a manner that the player is not able to visually confirm the associated contents of the 29 touch symbols 630. Note that, when displaying this selection screen, there is executed a process of updating the character meter image 290 by referring to a later mentioned character acquisition flag.

Next, in step S614, the main CPU 71 determines whether selection of any of the touch symbols 630 is input via the selection screen. Specifically, the main CPU 71 determines whether a portion of the touch panel 114 corresponding to any of the touch symbols 630 is touched. When it is determined that the selection of a touch symbol 630 is not made, the main CPU 71 re-executes step S614.

On the other hand, when it is determined that the selection of a touch symbol 630 is made, the main CPU 71 determines which one of the touch symbols 630 is selected. That is, the main CPU 71 determines which one of: awarding of a credit payout, winning of a character, running of the item accumulation game, and termination of the 29-choice game, the selected touch symbol 630 is associated with.

Specifically, in S615, whether a progressive payout is selected is determined. When it is determined that the progressive payout is selected (S615: YES), the progressive initialize process is executed (S616). Specifically, a progressive payout winning signal is transmitted to the center controller 200.

Although illustration is omitted, the center controller 200 having received the progressive payout winning signal initializes a progressive value collected from the slot machines 10 connected to the gaming system 300. Note that signals indicating progressive value are successively transmitted from the center controller 200 to the slot machines 10. Each slot machine 10, by receiving the signal after the progressive value is initialized, is able to notify the player playing games thereon that the progressive value has been initialized.

Next, after step S616, the JACKPOT winning process is executed (S617). Although illustration is omitted, in the JACKPOT winning process, an amount of progressive payout to be awarded is displayed on the selection screen for the 29-choice game. Note that the credit indicating the progressive payout is kept displayed while the 29-choice game is continued. The 29-choice TOTAL WIN is added to the progressive payout, and the process returns to step S613. Note that the 29-choice TOTAL WIN indicates the credit acquired in the 29-choice game stored in a predetermined area of RAM 73. Further, it is possible to include a process by which step S615 to S617 are not executed, when awarding of a progressive payout is not associated with any of the 29 touch symbols 630 in step S610, or when it is determined in step S611 that a touch symbol 630 associated with the progressive payout is not included.

When it is determined in step S615 that the progressive payout is not selected (S615: NO), whether or not the credit payout is selected is determined (S618). When it is determined that the credit payout is selected (S619: YES), a fixed payout winning process is executed (S619). In the fixed payout winning process, the credit ("90", "60", or "30") indicated by the selected touch symbol 630 is added to the 29-choice TOTAL WIN, and the process returns to step S613.

On the other hand, in step S618, when it is determined that the credit payout is not selected (S619: NO), whether or not winning of a character is selected is determined (S620). When it is determined that winning of a character is selected (S620), a character winning process (S621). Specifically, a process of updating a character flag stored in the RAM 73 which indicates whether or not a character is won is executed. There are three types of characters, which are: Beauty character, Beast character, and Palace character. For each of the characters, a character flag is provided. In step S613, the character flags are referenced, and a character whose corresponding flag indicates "Acquired" is displayed in the character meter image 290.

On the other hand, when it is determined, in step S620, that winning of a character is not selected (S620: NO), whether or not the item accumulation game is selected is determined (S622). When it is determined that the item accumulation game is selected (S622: YES), the item accumulation game process is executed (S623). The item accumulation game process is described later.

On the other hand, when it is determined in step S622 that the item accumulation game is not selected (S622: NO), the 29-choice game terminating process is executed (S624). A pick-up bonus game terminating process capable of running the four-choice game is described later. Subsequently, the 29-choice TOTAL WIN stored in the RAM 73 is referenced and the total credit win in the 29-choice game is displayed (S625). This routine is then completed.

<Bonus Game: Item Accumulation Game>

Next, the following describes the item accumulation game (ten-choice game) which is run in the present embodiment. In the present embodiment, when a touch symbol 630 corresponding to the item accumulation game is selected through the selection screen (see FIG. 41) in the pick-up bonus game, the item accumulation game is run which enables the player to select any one of ten touch symbols serving as the selectable objects. The touch symbols are associated with item symbols 633 including three types of item symbols (i.e., Ring symbol 633*a*, Clavecin symbol 633*b*, Book symbol 633*c*), and a witch symbol 634 that terminates the item accumulation game. In the item accumulation game, a payout according to the item is awarded when a predetermined number (three in the present embodiment) of any one of the items are selected.

Figure 43:
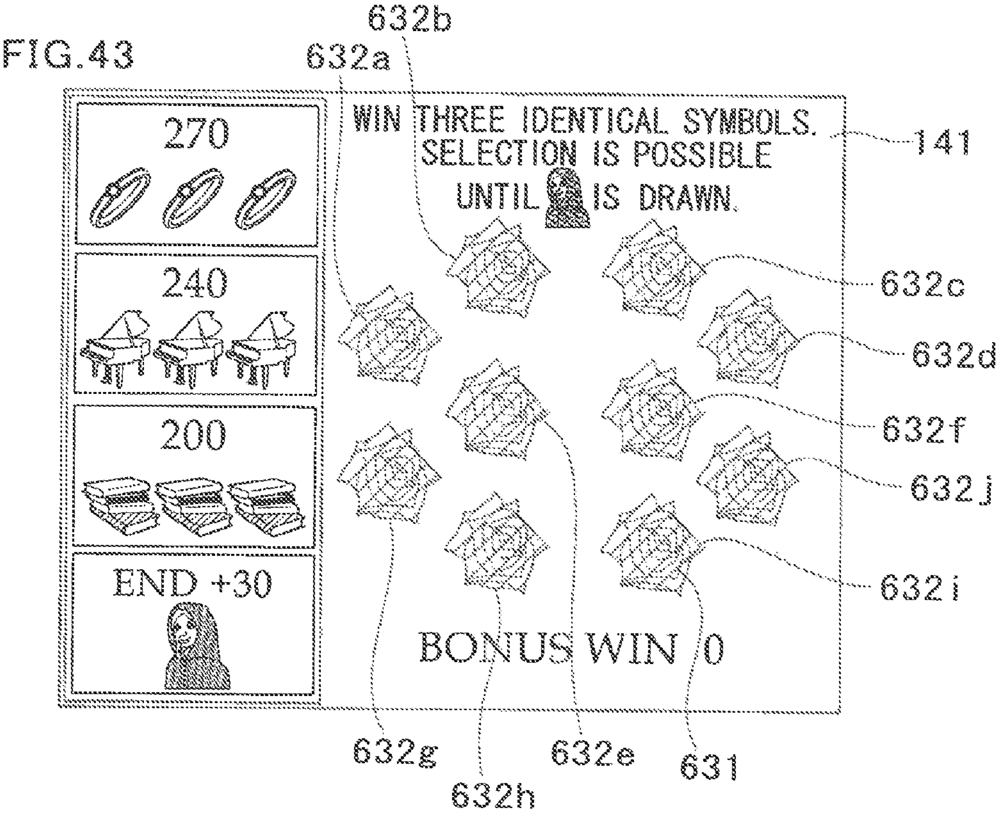
FIG. 43 shows an exemplary image of an item accumulation game displayed on the lower image display panel of the slot machine according to the second embodiment of the present invention.

When a touch symbol 630 corresponding to the item accumulation game is selected in the selection screen of the pick-up bonus game, there is displayed a selection screen with ten touch symbols serving as the selectable objects, as shown in FIG. 43. The selection screen with the touch symbols is such that 10 touch symbols 631 which are symbols of yellow roses are displayed in touch symbol areas 632 (632*a* to 632*j*) in the predetermined positions in the right side area of the lower image display panel 141. At this point, the player is not able to see which one of the item symbol and the witch symbol the touch symbol 631 is associated. Further, in the pick-up bonus game, displaying the touch symbols 631 instead of the touch symbols 630 notifies the player that the rules are different even if the game is similar and involves selection of any of selectable objects.

Figure 44:
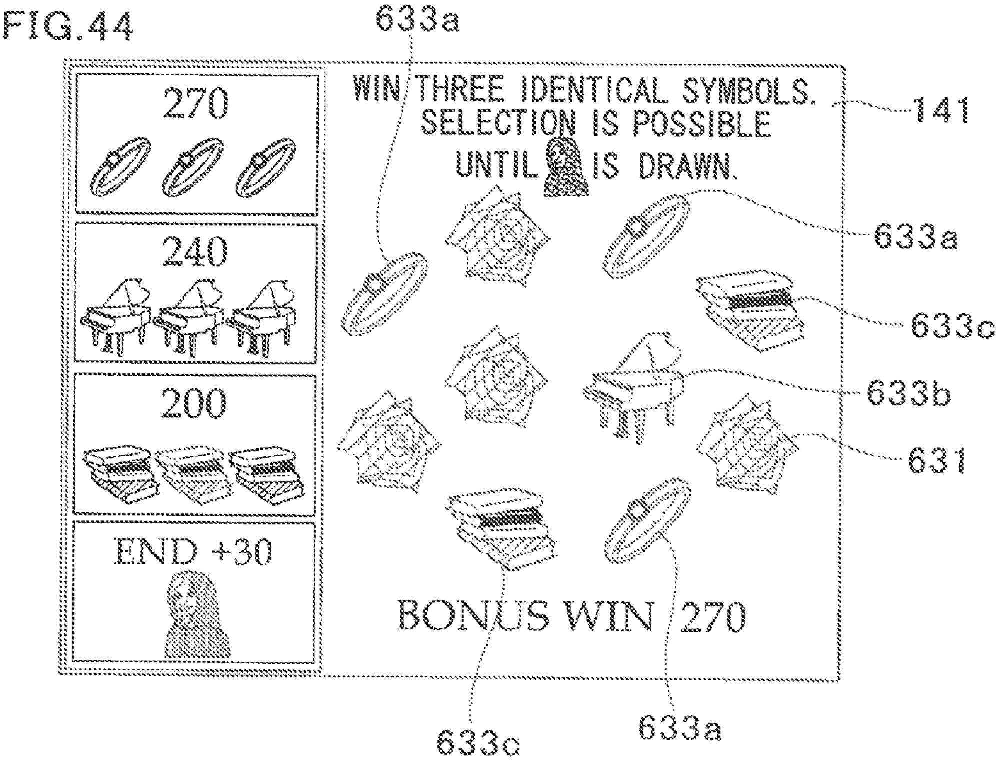
FIG. 44 shows another exemplary image of the item accumulation game displayed on the lower image display panel of the slot machine according to the second embodiment of the present invention.

When the selection screen with ten touch symbols is displayed, the player is able to select a touch symbol 631 by touching a portion of the touch panel 114 (touch symbol area 632) corresponding to the touch symbol 631. When any of the touch symbols 631 is selected, a symbol (an item symbol or a witch symbol) corresponding to the touch symbol 631 is displayed in the selected touch symbol Area 632, as shown in FIG. 44. In the example shown in FIG. 44, the Ring symbol 633*a* is selected and the number of Ring symbols 633*a* has reached three.

Figure 45:
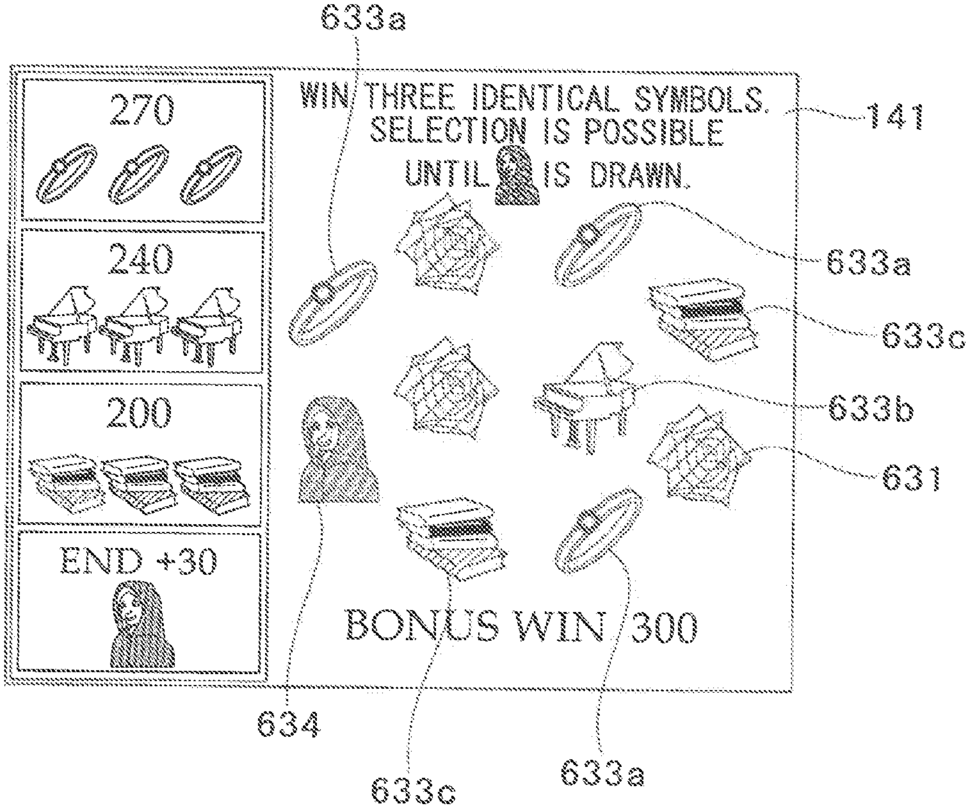
FIG. 45 shows yet another exemplary image of an item accumulation game displayed on the lower image display panel of the slot machine according to the second embodiment of the present invention.

Further, as shown in FIG. 45, when the witch symbol 634 is selected, the item accumulation game is terminated. The item accumulation game is also terminated, when all the symbols except the witch symbol 634 are selected.

<Item Accumulation Game Process>

Figure 46:
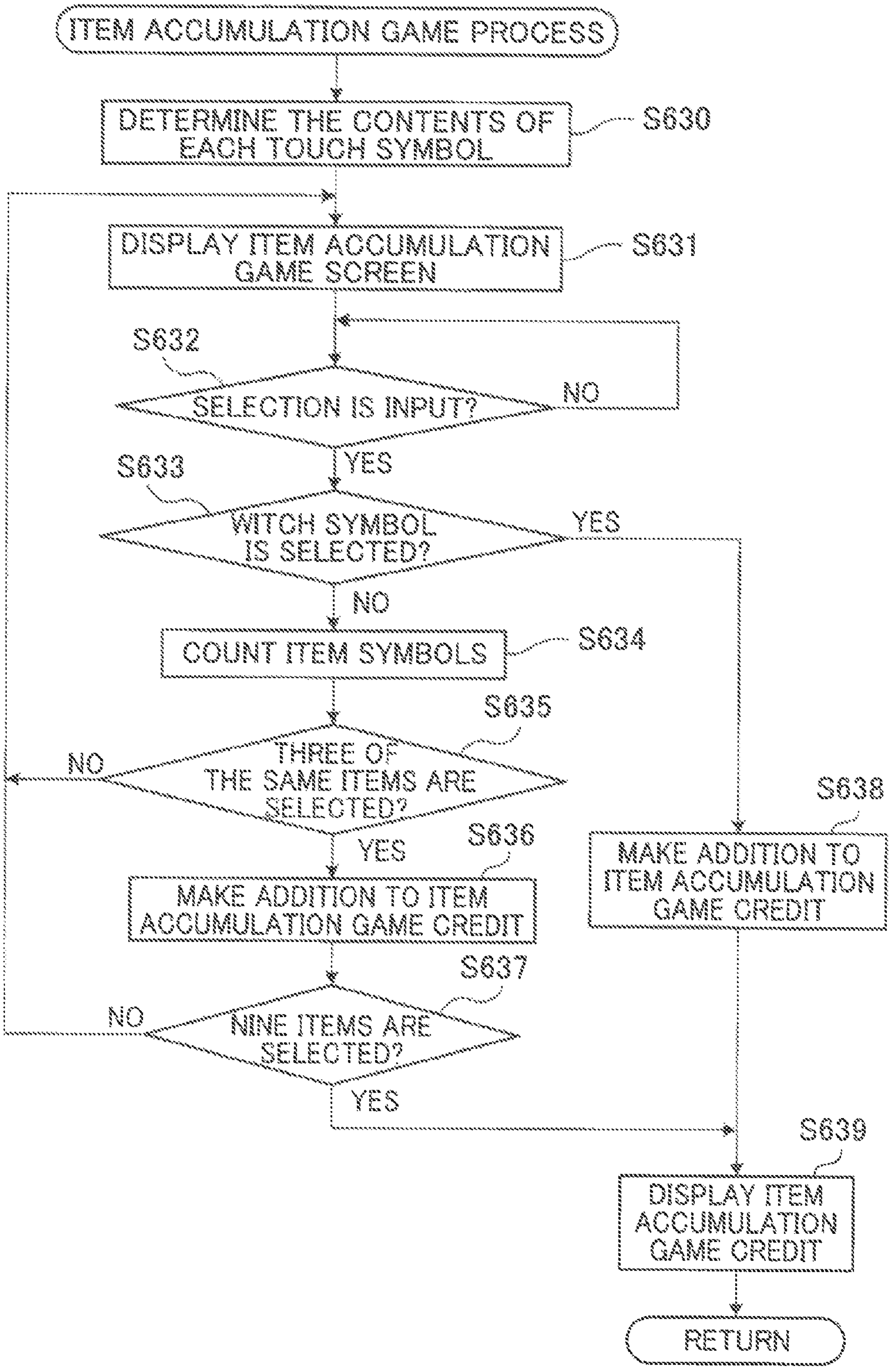
FIG. 46 shows a flowchart of the item accumulation game process in the slot machine according to the second embodiment of the present invention.

Next, the following describes the item accumulation game process. FIG. 46 shows a flowchart of the item accumulation game process executed in the pick-up bonus game process described with reference to FIG. 42.

First, the main CPU 71 determines the contents of the touch symbols 631 (S630). Specifically, random determination is performed as to which one of the item symbol 633 and the witch symbol 634 is to be associated, in relation to each of the touch symbols 631 in the touch symbol Areas 632. The determined contents are stored in the associated symbol table shown in FIG. 47.

Next, with reference to FIG. 47, the associated symbol table is described. The associated symbol table is stored in the RAM 73, and includes a symbol position column and an associated symbol column. In the symbol position column are stored positions (0 to 9) of the touch symbols 631 corresponding to the touch symbol Areas 632 (632*a* to 632*j*) respectively. In the associated symbol column are stored the results of step S630: i.e., the item symbol 633 or the witch symbol 634 associated with each position of the touch symbol 631. In the present embodiment, the ten touch symbols 631 include: three touch symbols 631 associated with the Ring symbol 633*a*; three touch symbols 631 associated with the Clavecin symbol 633*b*, three touch symbols 631 associated with the Book symbol 633*c*, and one touch symbol 631 associated with the witch symbol 634.

After step S630 determination the items in the associated symbol column of the associated symbol table, an item accumulation game screen as shown in FIG. 43 is displayed (S631).

Next, the main CPU 71 determines whether selection of any of the touch symbols 631 has been input through the selection screen (S632). specifically, there is determined whether any of the touch symbol Areas 632 on the touch panel 114 respectively corresponding to the touch symbols 631 is touched. When it is determined that the selection of a touch symbol 631 is not made (S632: NO), the main CPU 71 re-executes step S632.

On the other hand, when it is determined that the selection of a touch symbol 631 is made, the main CPU 71 determines whether the selected touch symbol 631 is the witch symbol 634 (S633). When it is determined that the touch symbol 631 is the witch symbol 634 (S633: YES), "30" credit is added to the item accumulation game credit stored in the RAM 73 (S638).

When it is determined in step S633 that the touch symbol 631 is not witch symbol 634 (S633: NO), the number of item symbols 633 is counted (S634). Specifically, there is determined which one of the Ring symbol 633*a*, the Clavecin symbol 633*b*, and the Book symbol 633*c*, the touch symbol 631 is associated with, and then the item count table shown in FIG. 48 is updated.

The following describes the item count table with reference to FIG. 48. The item count table is stored in the RAM 73, and includes an acquired symbol column and a count column. In the acquired symbol column are stored any one of the Ring symbol 633*a*, the Clavecin symbol 633*b*, and the Book symbol 633*c*. The values of the count column are initialized and is "0" at the start of the item accumulation game. When any item symbol 633 is selected, the value of the count column corresponding to the selected item symbol 633 in the acquired symbol column is incremented by one. This way, counting of the item symbols 633 is performed for each type of the item symbols 633.

After step S634 determining the value of the count column of the item count table, there is determined whether or not three of the same type of the item symbols 633 have been selected (S635). Specifically, the item count table is referenced to determine whether or not any value of the count column corresponding to the item symbol 633 in the acquired symbol column is "3". If there is no item symbol 633 having been counted three, the process returns to step S631.

On the other hand, when it is determined that three of any type of the item symbols 633 is selected (S635: YES), a credit is added to the item accumulation game credit stored in the RAM 73, according to that type of item symbol 633 having been counted three (S636). Specifically, when three of the Ring item symbol are selected, a payout of "270" credit is awarded. When three of the Ring item symbol are selected, a payout of "270" credit is awarded. When three of the Ring item symbol are selected, a payout of "270" credit is awarded. For the item symbol 633 whose count has been determined as to have reached three in step S636, the corresponding value of the count column in the item count table is updated to "4". This way, it is possible to determine whether the addition to the item accumulation game credit in relation to that item symbol 633 has been executed.

Next, there is determined whether all the nine item symbols 633, not including the witch symbol 634, are selected (S637). When it is determined that not all the nine item symbols 633 are selected (S637: NO), the process returns to step S631.

On the other hand, when it is determined that all the nine item symbols 633 are selected (S637: YES), or after step S638, a total credit won in the item accumulation game is displayed on the lower image display panel 141, by referring to the item accumulation game credit stored in the RAM 73 (S639). This routine is completed thereafter. Note that in step S639, the item accumulation game credit is added to the 29-choice TOTAL WIN stored in the RAM 73.

As is understood from the above, when a plurality of bonus symbols 250 stop-displayed form a predetermined combination in the base game, the player is able to select any of the plurality of bonus symbols 250 stop-displayed through the touch panel 114. Then, when a bonus symbol 250 that causes an occurrence of the pick-up bonus game is selected, the pick-up bonus game is started, and the player is able to select any of the plurality of touch symbols 630 serving as the selectable objects. When the selected touch symbol 630 is a symbol that causes an occurrence of the item accumulation game, the item accumulation game is started.

In the item accumulation game, the player is able to select any of the plurality of touch symbols 631 serving as the selectable objects. In the item accumulation game, the item symbol 633 is selected by selecting any of the plurality of touch symbols 631, and a payout is awarded when the count of the selected item symbol 633 reaches a predetermined value. This structure in which a payout is added every time the player selects the item symbol 633 causes the player to have a great expectation, and provides a gaming machine with a new type of entertainment characteristics.

<Bonus Game: Four-Choice Game>

Next, the following describes the four-choice game of the pick-up bonus game run in the present embodiment. The present embodiment, when a touch symbol 630 corresponding to termination of the pick-up bonus game is selected through the selection screen (see FIG. 41) of the pick-up bonus game, the four-choice game which enables the player to select any of four touch symbols serving as the selectable object is run only if no character is won in the pick-up bonus game. The four touch symbols are associated with awarding of a fixed payout, and winning of a character (entitlement to roulette game).

Figure 49:
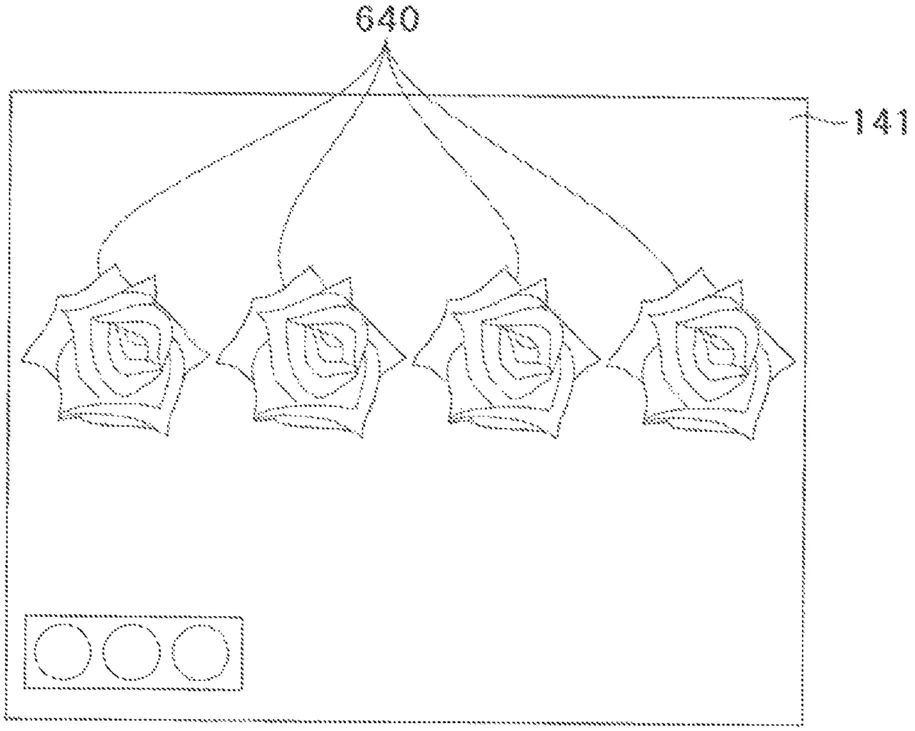
FIG. 49 shows an exemplary image of a pick-up bonus game displayed on the lower image display panel of the slot machine according to the second embodiment of the present invention.

When a touch symbol 630 corresponding to termination of the pick-up bonus game is selected in the selection screen of the pick-up bonus game, and when no character is won in the pick-up bonus game, there is displayed a selection screen with four touch symbols serving as the selectable objects, as shown in FIG. 49. The selection screen with the touch symbols is such that 4 touch symbols 640 which are symbols of red roses are displayed on the lower image display panel 141. At this point, the player is not able to see which one of: awarding of a fixed payout and winning of a character the touch symbol 640 is associated.

When the selection screen with four touch symbols is displayed, the player is able to select a touch symbol 640 by touching a portion of the touch panel 114 corresponding to the touch symbol 640. When any of the touch symbols 640 is selected, a symbol indicating awarding of the fixed payout or winning of a character is displayed in the area of that touch symbol 640 selected.

<Pick-Up Bonus Game Terminating Process>

Figure 50:
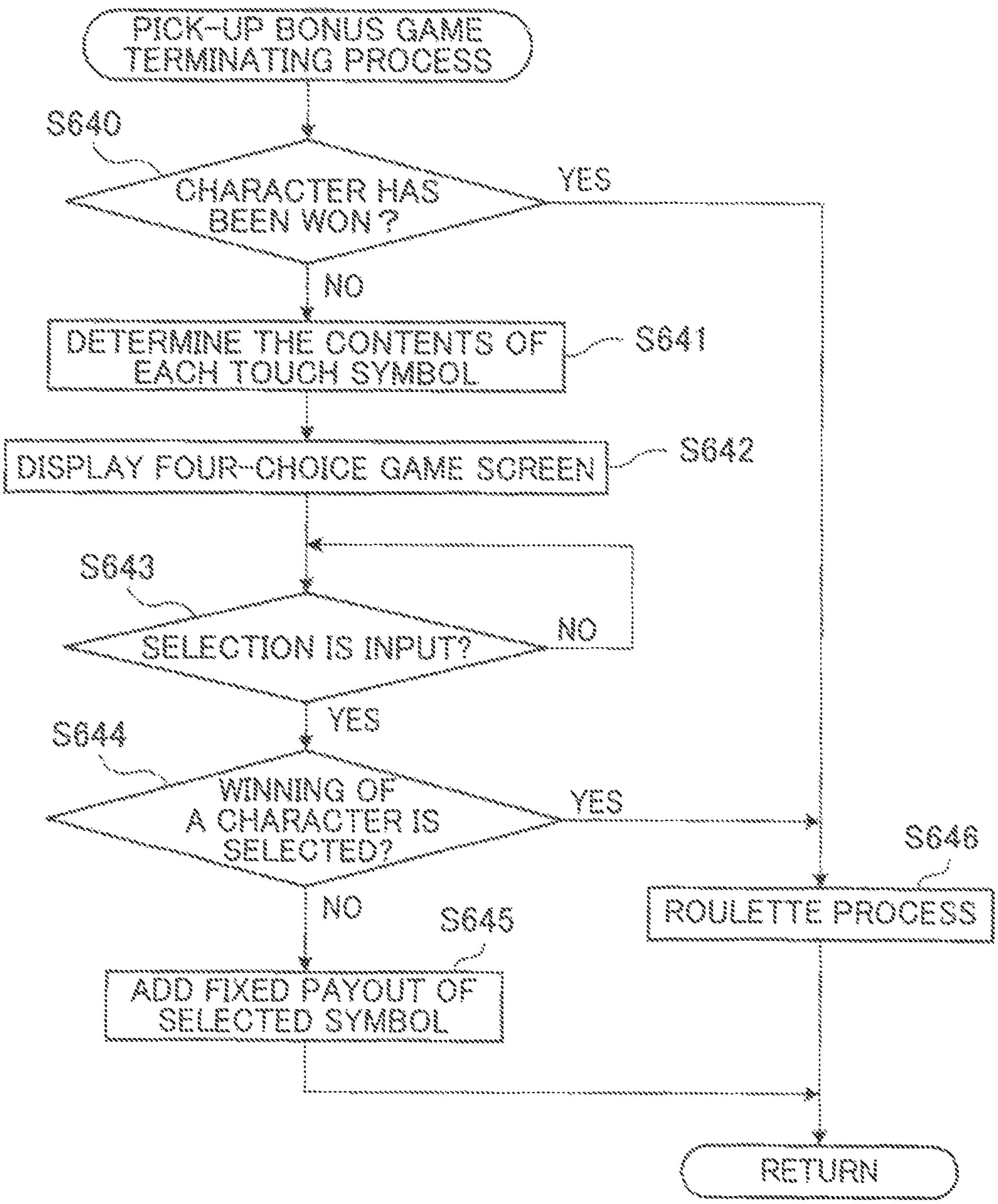
FIG. 50 shows a flowchart of pick-up bonus game terminating process in the slot machine according to the second embodiment of the present invention.

Next, the following describes, the pick-up bonus game terminating process which runs the four-choice game. FIG. 50 shows a flowchart of the pick-up bonus game terminating process executed in the pick-up bonus game process described with reference to FIG. 42.

First, the main CPU 71 determines whether a character has been acquired (S640). Specifically, the character flags stored in the RAM 73 indicating whether or not the associated character has been acquired is referenced to determine whether or not at least one of the flags indicates "Acquired". When it is determined that no character has acquired (S640: NO), the contents of the touch symbol 640 are determined (S641). specifically, there is performed a random determination process to associate three of four touch symbols 640 with three different credit payouts ("150", "90", or "60"), respectively, and to associate one of the four touch symbols 640 with winning of a character. As shown in FIG. 49, the lower image display panel 141 displays thereon a selection screen that prompts selection of any one of the four touch symbols 640 displayed (S642). The selection screen is displayed on the lower image display panel 141 in such a manner that the associated contents of the four touch symbols 640 are not visible.

Next, the main CPU 71 determines whether selection of any of the touch symbols 640 is input through the selection screen (S643). specific, there is determined whether any of the touch symbol Areas 632 of the touch panel 114 respectively corresponding to the touch symbols 640 is touched. When it is determined that the selection of a touch symbol 640 is not made (S643: NO), the main CPU 71 re-executes step S640.

On the other hand, when it is determined that the selection of a touch symbol 640 is made, the main CPU 71 determines whether or not the selected touch symbol 640 is associated with winning of a character (S644). When it is determined that the selected touch symbol 640 is not associated with winning of a character (S644: NO), a credit payout corresponding to the selected touch symbol 640 is added to the 29-choice TOTAL WIN stored in the RAM 73 (S645). This routine is completed thereafter.

When it is determined in step S640 that a character is acquired (S640: YES), or when it is determined in step S644 that the selected touch symbol 640 indicates winning of a character (S644: YES), the roulette process is executed (S646). In the roulette process, a roulette game is run which executes random determination of a credit amount a certain number of times corresponding to the number of characters acquired, and the total of credit amounts is added to the 29-choice TOTAL WIN. The roulette game is detailed in a third embodiment described hereinbelow. This routine is completed thereafter.

<Free Game>

Next, the following describes the free game which is run when the free game trigger is established. In the free game, symbol columns structured by free game symbols 650 are scroll-displayed on the video reels 150 and then stop-displayed to arrange the free game symbols 650.

The following describes with reference to FIG. 51 the symbol columns of the free game which are scroll-displayed on the video reels 150. FIG. 51 shows a free game symbol table. The free game symbol table indicates free game symbol columns scroll-displayed on the video reels 150. To each of the 22 free game symbols 650 constituting the symbol columns is given one of code numbers 0 to 21. As shown in FIG. 51, each symbol column is structured by a combination of the following symbols: "Beauty", "Rose (Red)", "Rose (Pink)", "Rose (White)", "Flower Bud (Red)", "Flower Bud (Pink)", "Flower Bud (White)", "FREE GAME", and "WILD" symbol. Note that the "WILD" free game symbol 650 is a symbol that can substitute for other symbols, as is the case with the base game symbol 600.

When the free game trigger is established and the free game is started, the symbol columns of the video reels 150 are modified to the symbol columns structured by the free game symbols 650 shown in FIG. 51, and are scroll-displayed and then stop-displayed. In the present embodiment, when the free game symbols 650 stop-displayed on the video reels 150 include a "WILD" free game symbol 650 (wild symbol 651), the display mode of that wild symbol 651 arranged is changed so that the wild symbol 651 becomes a fixed wild symbol 652 and is fix-displayed in the stop position.

Figure 52:
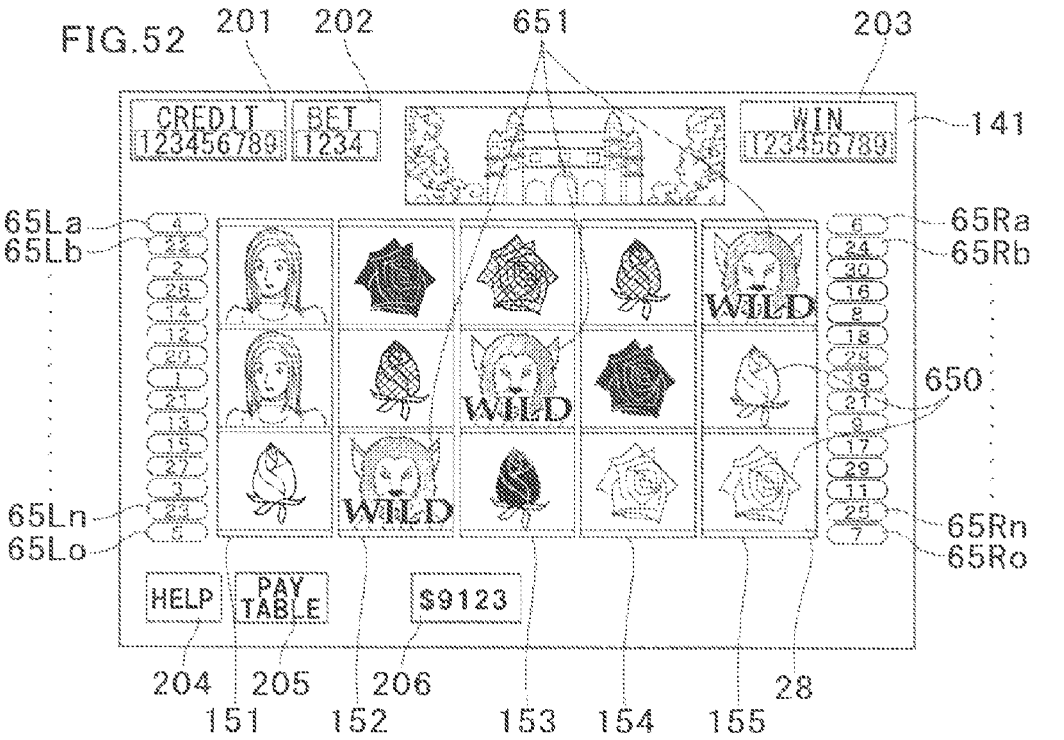
FIG. 52 shows an exemplary free game image displayed on the lower image display panel of a slot machine according to the second embodiment of the present invention.
Figure 53:
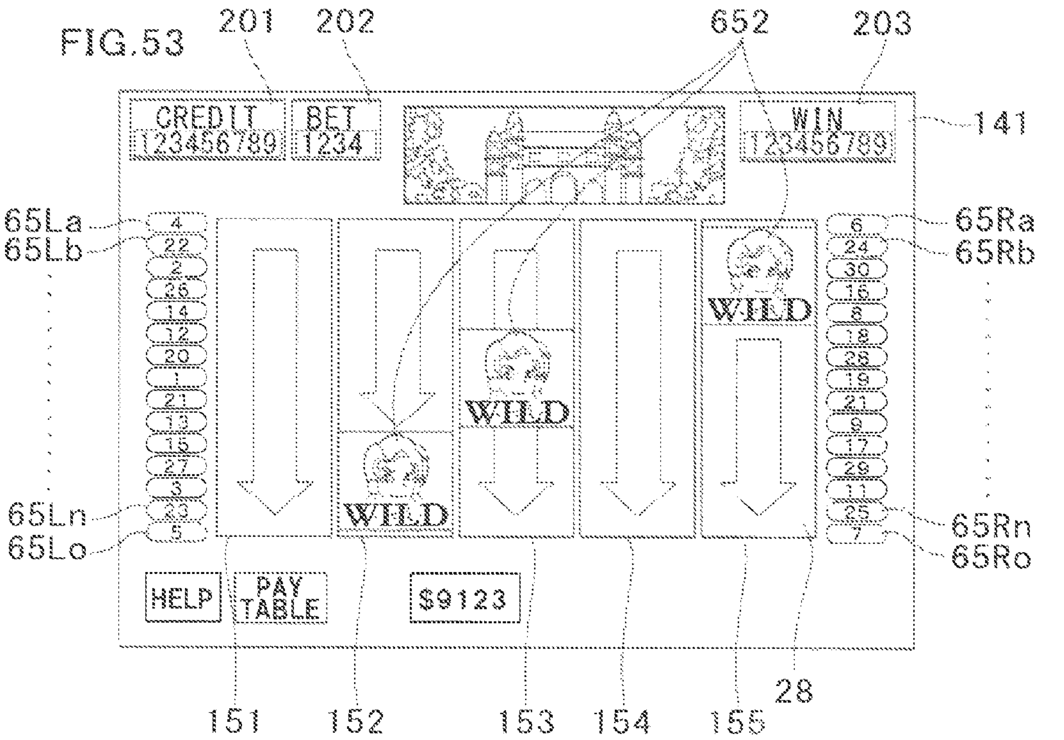
FIG. 53 shows another exemplary free game image displayed on the lower image display panel of a slot machine according to the second embodiment of the present invention.

FIG. 52 shows a situation where scroll-display of the free game is stopped. As shown in FIG. 52, wild symbols 651 are arranged in the display block 28 at the lower stage of the video reel 152, in the display block 28 at the middle stage of the video reel 153, and in the display block 28 at the upper stage of the video reel 155, respectively. The respective display modes of these wild symbols 651 are modified so that the wild symbols 651 becomes fixed wild symbols 652. These fixed wild symbols 652 are fixed while the symbol columns on the video reels 150 are scroll-displayed, as shown in FIG. 53. The fix-displayed fixed wild symbols 652 are effective during the free game. Every time a wild symbol 651 is arranged, a fixed wild symbol 652 is added and is fix-displayed in that position where the wild symbol 651 is arranged. The fix-displayed fixed wild symbol 652 is counted in when determining the winning combination at the time of stop-displaying the symbols.

<Free Game Process>

Figure 54:
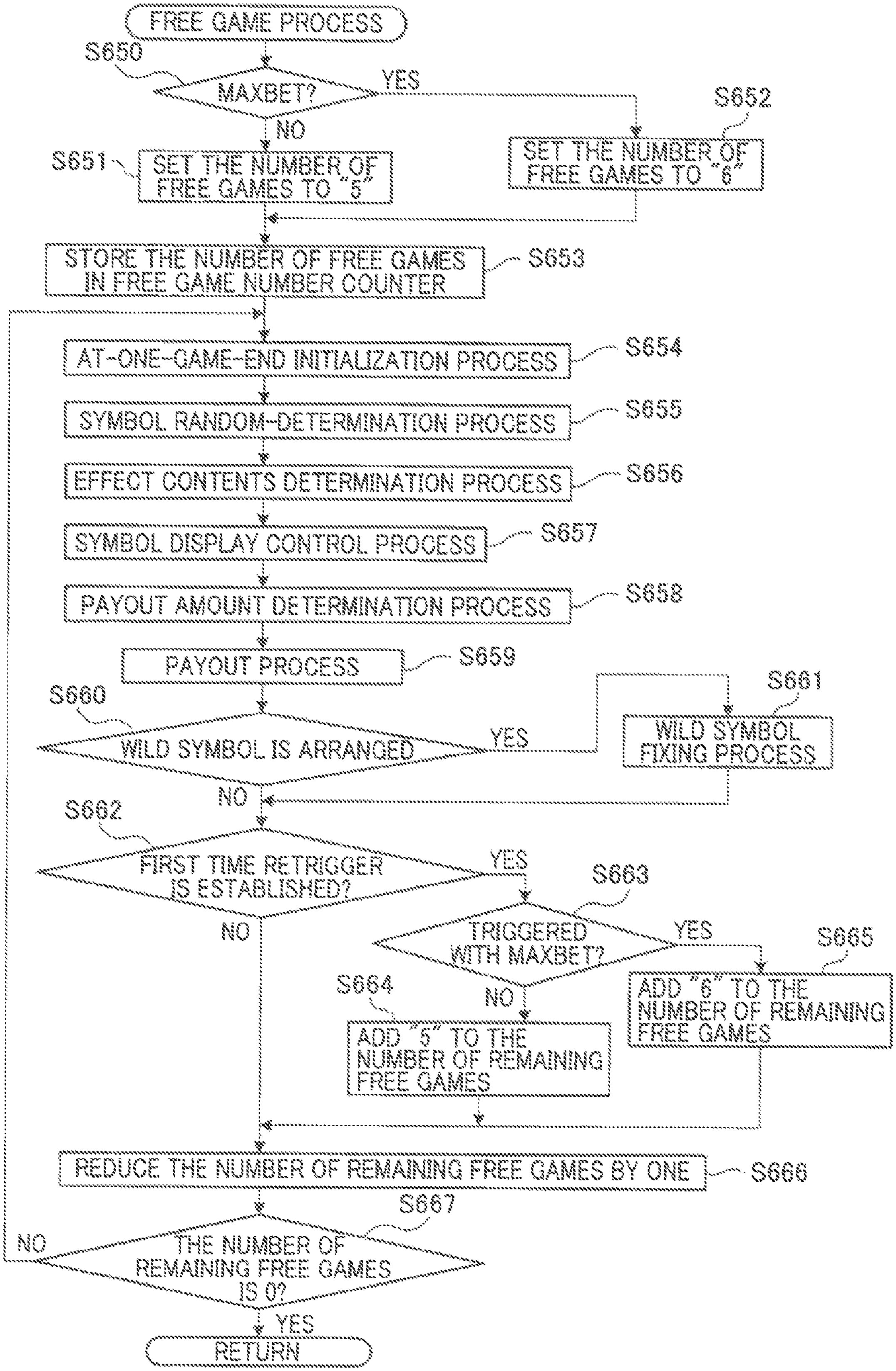
FIG. 54 shows a flowchart of the free game process in the slot machine according to the second embodiment of the present invention.

Next, with reference to FIG. 54, the free game process is described. FIG. 54 shows a flowchart of the free game process executed in the main control process of the first embodiment described with reference to FIG. 9.

First, there is determined whether a maximum bet has been entered in the base game in which the free game trigger is established (S650). When it is determined that the bet having been entered is not the maximum bet (S650: NO), the number of free games is set to five times (S651). On the other hand, when it is determined that the bet entered is the maximum bet (S650: YES), the number of free games is set to six times (S652). Note that the symbol columns structured by the free game symbols 650 shown in FIG. 51 may be made different between the above cases, for the purpose of equalizing the probabilities of payouts being awarded.

After step S651 or S652, the number of free games thus determined is stored in the free game number counter provided in the RAM 73 (S653). Step S654 and step S655 executed thereafter are the same as those described in the first embodiment, and no further explanation is provided for these steps.

Then, after step S655, the effect contents determination process is executed (S656). specifically, there is determined: an effect (see FIG. 53) provided when a wild symbol 651 is already arranged in the free game, by which effect scroll-displaying is performed while the fixed wild symbol 652 is fix-displayed in the stop position of the wild symbol 651; or an effect such that, when stop-displaying of a wild symbol 651 is determined in step S655, that wild symbol 651 is modified to a fixed wild symbol 652 in the stop position.

Next, according to the contents of effect determined in step S656, the symbol display control process is executed (S657). After that, a payout amount determination process is executed based on the fixed-wild management table and the symbols determined in step S655 (S658). The a payout process is executed to award the credit determined (S659).

Next, there is determined whether a wild symbol 651 is arranged (S660). When the wild symbol 651 is arranged, a wild symbol fixing process is executed (S661). Specifically, a process of updating the fixed-wild management table is executed.

The following describes the fixed-wild management table with reference to FIG. 55. The fixed-wild management table is stored in the RAM 73, and has a reel column, a position column, and a fixed wild column. In the reel column are stored items respectively indicating the video reels 151, 152, 153, 154, 155. In the position column are stored items respectively indicating the upper stage, the middle stage, and the lower stage of the associated video reel 150. In the fixed wild column are stored items each indicating whether or not a fixed wild symbol 652 is effective or ineffective in the associated display block 28 of the associated reel. When the free game trigger is established, the items in the fixed wild column are all initialized to indicate ineffective. In step S661, an item of the fixed wild column corresponding to the display block 28 in which a wild symbol 651 is arranged is updated to indicate "effective". Further, in step 656, the fixed-wild management table is referenced to determine the contents of effect.

After step S661 where the fixed-wild management table is updated, there is determined whether a first time retrigger is established (S662). The retrigger means that a winning combination involving the free game symbols 650 of "FREE-GAME" is formed. When the retrigger is established, if the fixed wild is effective for the display block 28 having the free game symbol 650 of "FREE GAME", it is possible to display the free game symbol 650 of "FREE GAME", and then display once again the fixed wild symbol 652.

When it is determined that the first time retrigger is established (S662), there is determined whether the free game trigger is established with the maximum bet (S663). When it is determined that the free game trigger is not established with the maximum bet (S663: NO), "5" is added to the number of remaining free games (S664). When it is determined that the free game trigger is established with the maximum bet (S663: YES), "6" is added to the number of remaining free games (S664).

when it is determined in step S662 that the first time retrigger is not established (S662: NO), or after step S664 or step S665, the number of remaining free games is reduced by one (S666). Then, there is determined whether the number of remaining games is "0" (S667). When it is determined that the number of the remaining games is not "0" (S667: NO), the process returns to step S654. On the other hand, when it is determined that the number of remaining games is "0" (S667: YES), this routine is completed.

As should be understood from the above, when a plurality of specific free game symbols 603 are stop-displayed in the base game, the player is able to start a free game which does not require betting of a game medium. Every time a wild symbol 651 substitutable for any other type of symbol is stop-displayed during the free game started, a fixed wild symbol 652 is fix-displayed in the stop position and is reflected in determining the payout based on the stopped symbols. As is understood from this, the free game is advantageous not only in that no betting is required, but also in that the player's expectation for the payout in the free game is enhanced every time the wild symbol 651 substitutable for another symbol is stopped, because that wild symbol 651 is fix-displayed as the fixed wild symbol 652 in the same position. Thus, there is provided a gaming machine with a new type of entertainment characteristics.

As described above, the gaming machine (slot machine 10, gaming system 300) of the second embodiment is structured to execute the following processes.

(g1) running a base game which variably displays the symbols on the symbol display device (lower image display panel 141) and stop-displays the symbols thereafter;

(g2) when a plurality of specific symbols (bonus symbol 250) are stop-displayed in the base game run in (g1) and forms a predetermined combination, enabling the input device (touch panel 114) to accept an input related to selection of any of the plurality of specific symbols stop-displayed;

(g3) determining wither a specific symbol selected in (g2) is a symbol that causes an occurrence of a credit determination game capable of awarding credit whose maximum digit number is prefixed;

(g4) when it is determined in (g3) that the symbol selected causes an occurrence of the credit determination game, scroll-displaying and then stop-displaying a plurality of symbol columns structured by symbols for credit determination game (credit determination game symbol 602) including symbols indicating a single digit number, in symbol display regions (video reels 623) corresponding to the digits of the credit respectively;

(g5) determining credit based on the value indicated by the symbols for the credit determination game, which are stop-displayed in the symbol display regions in (g4).

(g6) repeating (g4) to (g5) until a symbol that terminates the credit determination game (witch symbol 602*a*) is stop-displayed in the symbol display region in (g4).

In the above structure, when a plurality of specific symbols are stop-displayed and forms a predetermined combination in the base game, the player is able to select any of the plurality of specific symbols stop-displayed via the input device. Then, when a specific symbol that causes an occurrence of the credit determination game is selected, there is started the credit determination game which awards credit whose maximum digit number is prefixed. In the credit determination game, a plurality of symbol columns structured by symbols for the credit determination game including symbols indicating a single digit number are scroll-displayed and then stop-displayed in the symbol display regions corresponding to the digits of credits, respectively. Based on the value indicated by the symbols for the credit determination game thus stop-displayed, the credit is determined. As described, the number indicated by each of the symbols for the credit determination game which are stop-displayed and arranged as an effect indicates the number of the corresponding digit of the credit to be awarded. This realizes a gaming machine with a new type of entertainment characteristic such that the player expects he/she may be able to determine the credit.

As described above, the gaming machine (slot machine 10, gaming system 300) of the second embodiment is structured to execute the following processes.

(h1) running a base game which variably displays the symbols on the symbol display device (lower image display panel 141) and stop-displays the symbols thereafter;

(h2) when a plurality of specific symbols (bonus symbol 250) are stop-displayed in the base game run in (h1) and forms a predetermined combination, enabling the input device (touch panel 114) to accept an input related to selection of any of the plurality of specific symbols stop-displayed;

(h3) determining whether or not the specific symbol selected in (h2) is a symbol that causes occurrence of a pick-up bonus game;

when the symbol is determined as to be a symbol that causes occurrence of a pick-up bonus game in (h3), enabling the input device to accept an input of selection of any of a plurality of selectable objects (touch symbol 630) displayed on the symbol display device;

(h5) determining whether or not the object selected in (h4) is a symbol that causes occurrence of an item accumulation game;

(h6) when it is determined in (h5) that the object selected is a symbol that causes an occurrence of the item accumulation game, displaying a plurality of selectable objects (touch symbol 631) which are different from those of the pick-up bonus game, and storing a plurality of items in the memory (RAM 73) in association with the selectable objects;

(h7) after (h6), enabling the input device to accept an input related to selection of any of the plurality of selectable objects;

(h8) incrementing the count of items (item symbol 633) associated with the object selected in (h7);

(h9) when the count of any of the items reaches a predetermined count (three) in (h8), awarding a payout based on that item whose count has reached the predetermined count;

(h10) repeating (h7) to (h9) until an object (witch symbol 634 or the like) that terminates the item accumulation game is selected in (h7).

In the above structure, when a plurality of specific symbols are stop-displayed and forms a predetermined combination in the base game, the player is able to select any of the plurality of specific symbols stop-displayed via the input device. Then, when a specific symbol that causes occurrence of the pick-up bonus game is selected, the pick-up bonus game is started, and the player is able to select any of a plurality of selectable objects. When the object selected is an object that causes an occurrence of the item accumulation game, the item accumulation game is started, and selection of any one of the plurality of selectable objects is enabled. In the item accumulation game, the player is able to select items by selecting any of the plurality of selectable objects, and is awarded a payout when the count of any of the items selected reaches a predetermined count. This structure in which a payout is added according to the item every time the player makes his/her selection causes the player to have a great expectation, and provides a gaming machine with a new type of entertainment characteristics.

As described above, the gaming machine (slot machine 10, gaming system 300) of the second embodiment is structured to execute the following processes.

(i1) on condition that a game medium is bet, running a base game which scroll-displays and then stop-displays a plurality of symbol columns in the symbol column display areas (video reels 150);

(i2) when the plurality of specific symbols (free game symbols 603) are stop-displayed and form a predetermined combination in the base game run in (i1), starting a free game which runs without the need of betting a game medium and which scroll-displays and then stop-displays a plurality of symbol columns in the symbol column display areas;

(i3) when a wild symbol (wild symbol 651) that can be substituted for another symbol is stop-displayed in a symbol column display area during the free game started in (i2), fix-displaying the wild symbol in a stop position where the wild symbol (fixed wild symbol 652) is stop-displayed. (i4) determining a payout taking into account the wild symbol stop-displayed in the stop position in (i3).

In the structure, when a plurality of specific symbols are stop-displayed in the base game, the player is able to start a free game that requires no betting of game media. Every time a wild symbol substitutable for any other type of symbol is stop-displayed during the free game started, the wild symbol is fix-displayed in the stop position and is reflected in determining the payout based on the stopped symbols. As is understood from this, the free game is advantageous not only in that no betting is required, but also in that the player's expectation for the payout in the free game is enhanced every time the wild symbol substitutable for another symbol is stopped, because that wild symbol is fix-displayed in the same position. Thus, there is provided a gaming machine with a new type of entertainment characteristics.

[Third Embodiment]

A third embodiment deals with the structures of (13) to (18) described in Summary of the Invention hereinabove. Note that parts that are identical to those described in the first and second embodiments are given the same reference numerals, and explanations for those parts are omitted below.

[Outline of Third Embodiment]

Figure 56:
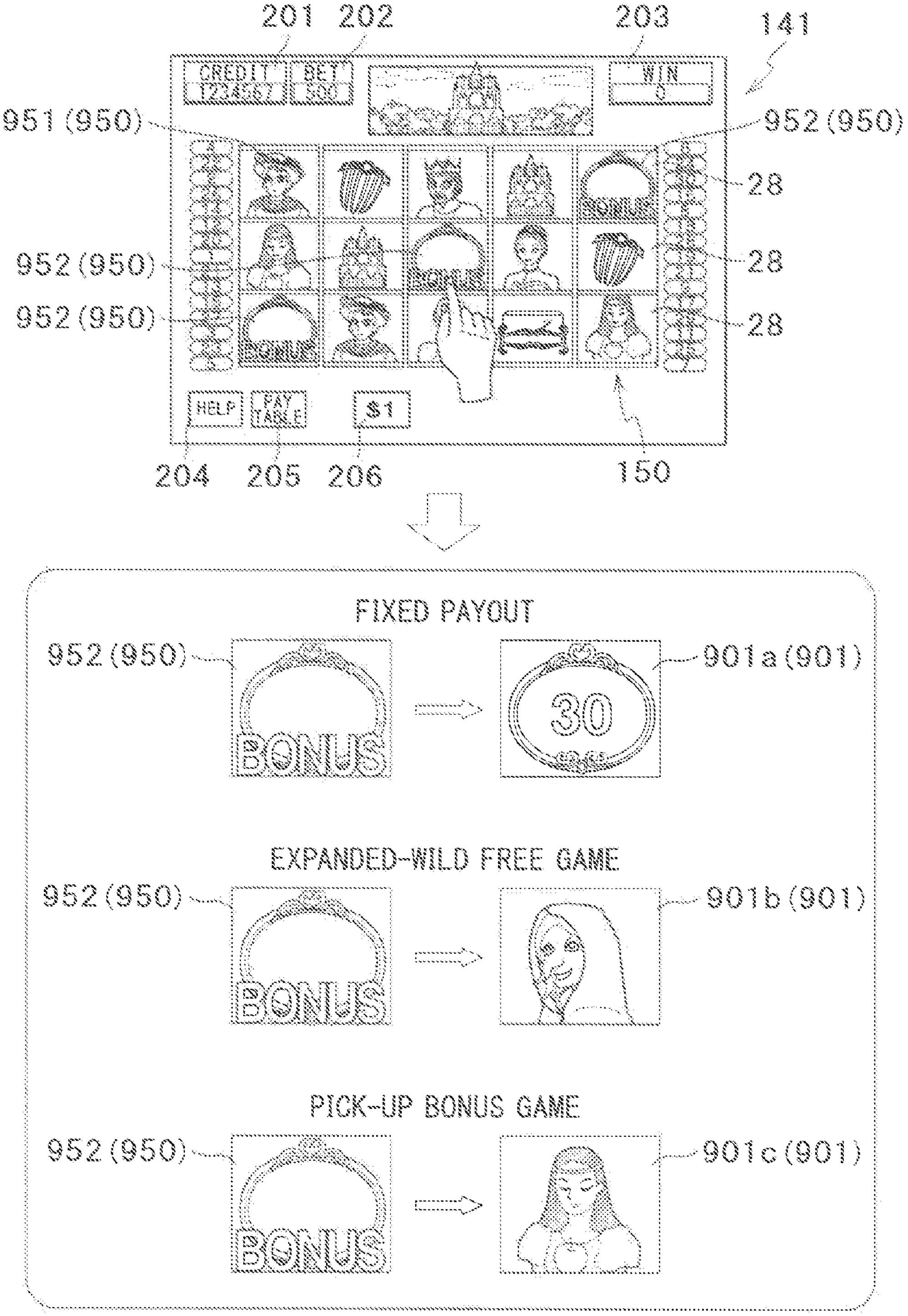
FIG. 56 is an explanatory diagram of a three-choice bonus game of a slot machine according to a third embodiment of the present invention.

The following outlines a third embodiment. As shown in FIG. 56, the screen displayed on the lower image display panel 141 of the slot machine 10 according to the third embodiment has a display window 150 at its center. The display window 150 includes 15 display blocks 28 which are arranged in five columns and four rows.

The slot machine 10 of the third embodiment runs a slot game. When three "BONUS" symbols 952 are stop-displayed in the display window 150 during the base game, the three-choice bonus game trigger is started and there is displayed a selection screen that receives an input of selection of any one of the three "BONUS" symbols 952 stop-displayed. The game started when three "BONUS" symbols 952 are stop-displayed is hereinafter referred to as three-choice bonus game.

The three "BONUS" symbols 952 are randomly associated with predetermined benefits (fixed payout, Expanded-Wild free game, or pick-up bonus game), respectively. The "BONUS" symbols 952 are displayed on the lower image display panel 141 in such a manner that the associated benefits are not visible. When any of the "BONUS" symbols 952 is selected by the player, the image 901 representing the associated benefit of the selected "BONUS" symbol 952 is displayed in place of the selected "BONUS" symbol 952.

as shown in FIG. 56, when the image 901*a* representing the fixed payout is displayed, a fixed payout is awarded to the player. Further, when an image 901*b* indicating running of the Expanded-Wild free game is displayed, the later-described Expanded-Wild free game is executed. Further, when the image 901*c* indicating running of the pick-up bonus game is displayed, the later-described pick-up bonus game is executed.

Unlike the foregoing first embodiment, the symbols 950 of the third embodiment are symbols related to a fairy tale "Snow White", as shown in FIG. 57. The symbols 950 include: ordinary symbols 951 which are "Princess A", "Princess B", "Queen", "King", "Comb", "Coffin", "Castle", "Prince"; "BONUS" symbol 952; "WILD" symbol 953; and "FREE GAME" symbol 954. Note that the "BONUS" symbol 952 corresponds to the "BONUS" symbol 250 of the first embodiment, the "WILD" symbol 953 correspond to the "WILD" symbol 180 of the first embodiment, and the "FREE GAME" symbol 954 corresponds to the "FREE GAME" symbol 230 of the first embodiment. Further, the effect provided in the third embodiment is related to the fairy tale "Snow White".

The "Expanded-Wild free game" is a game runnable with a bet of a less amount of game media than the base game. The "bet of a less amount of game media than the base game" encompasses a bet of "0" game media. Thus, the "Expanded-Wild free game" may be interpreted as a game runnable without a bet of game media. In other words, "Expanded-Wild free game" is a game which is started without the premise of consuming a game medium.

Figure 58:
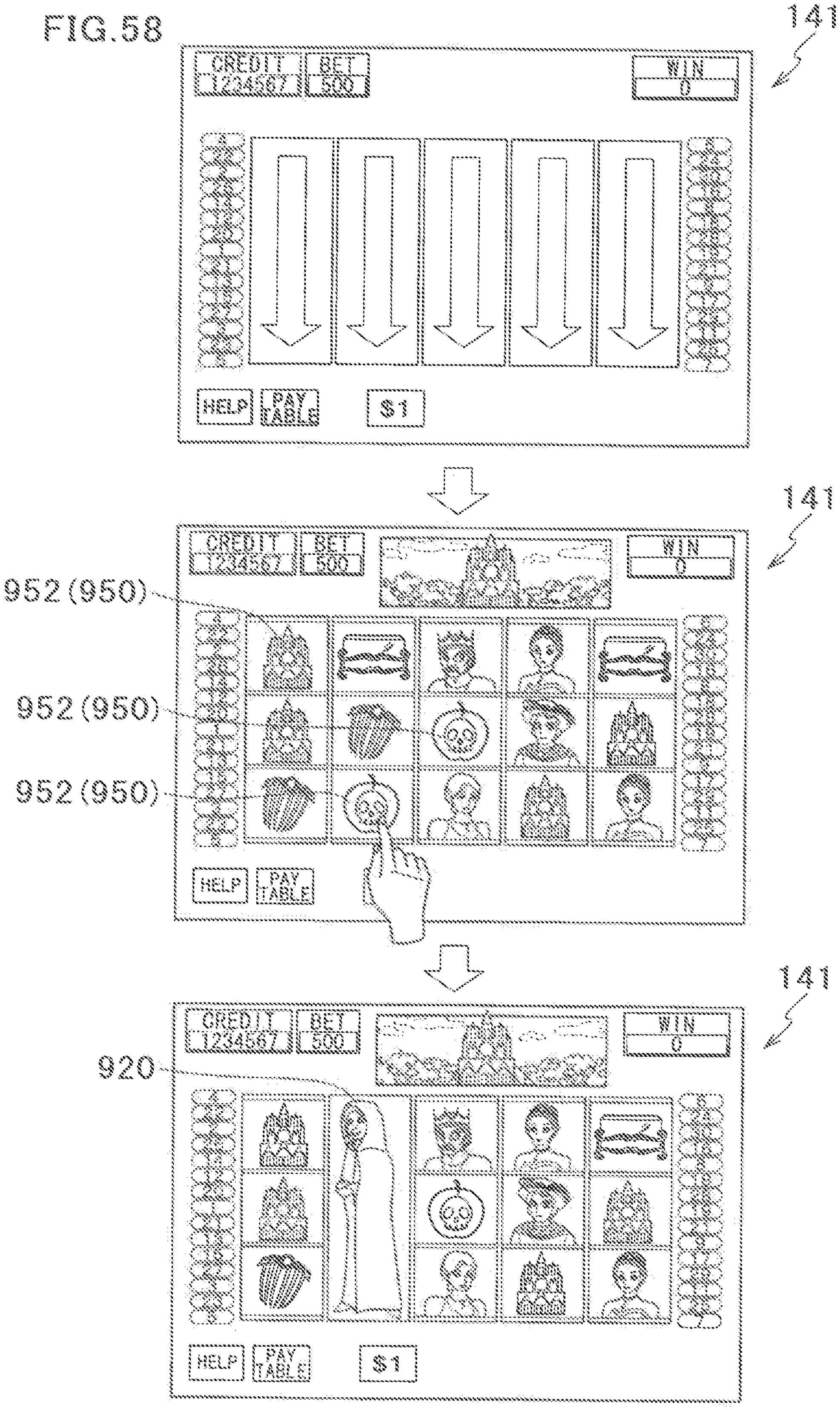
FIG. 58 is an explanatory diagram of the Expanded-Wild free game of the slot machine according to the third embodiment of the present invention.

In the Expanded-Wild free game of the third embodiment, when a "WILD" symbol 953 is stop-displayed in a display block 28, the touch panel 114 receives an input related to the "WILD" symbol 953 stop-displayed, as shown in FIG. 58. When an input related to the "WILD" symbol 953 is received, an expanded wild symbol 920 which is displayed throughout the display blocks 28 of one column replaces the display block 28 stop-displaying the "WILD" symbol 953 and all the symbols 950 stop-displayed in the display blocks 28 of the same column. Then, a payout is awarded according to a predetermined symbol combination formed by the expanded wild symbol 920 which is the replacement and the symbols 950 stop-displayed. Note that the “WILD” symbol 953 corresponds to the specific symbol of the structures (13) to (18) described in Summary of the Invention hereinabove. Further, the expanded wild symbol 920 is deemed as any other symbols, and corresponds to the wild symbol of the structures (13) to (18) described in Summary of the Invention hereinabove.

Figure 59:
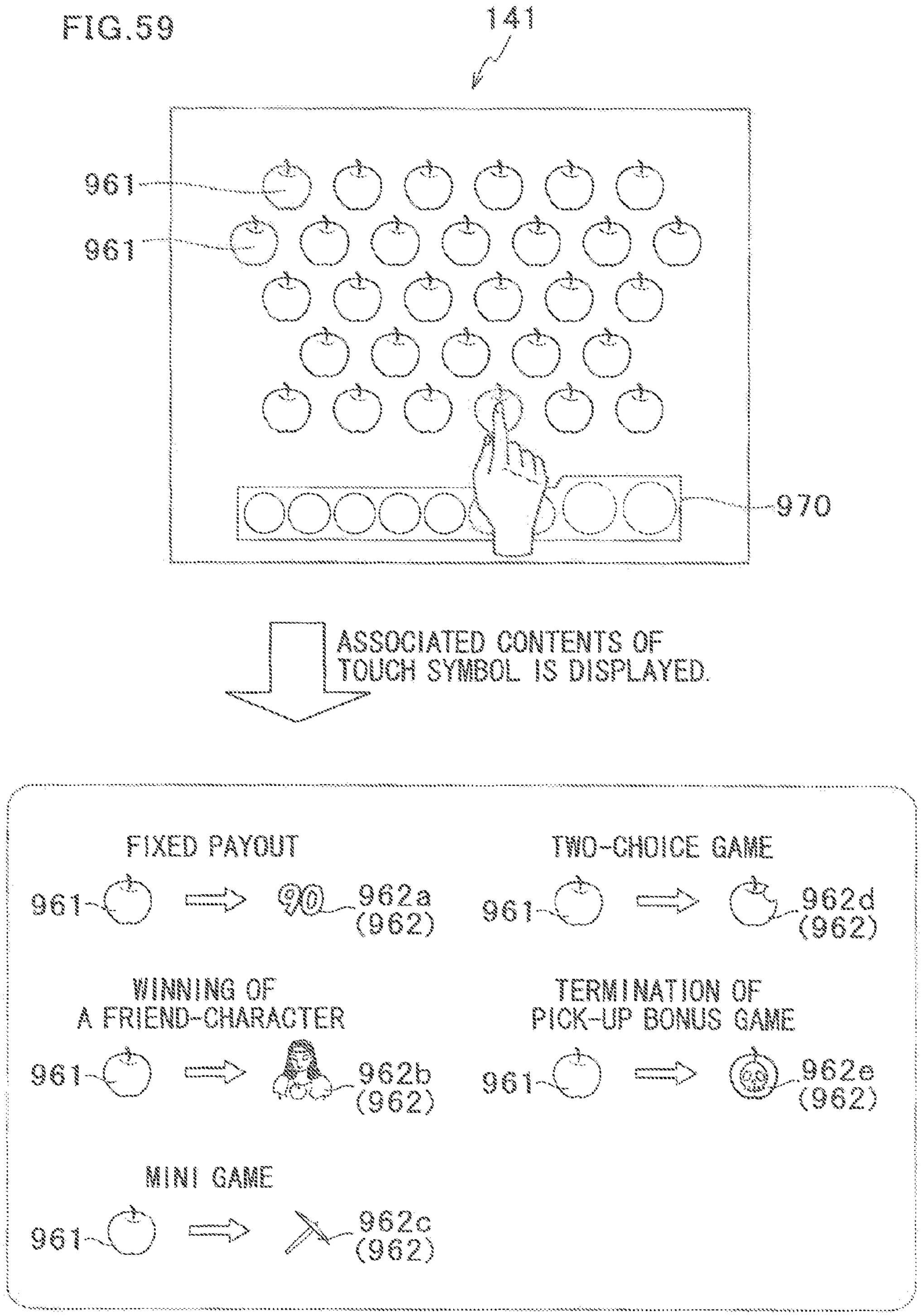
FIG. 59 is an explanatory diagram of the pick-up bonus game of the slot machine, according to the third embodiment of the present invention.

In the third embodiment, the “pick-up bonus game” is a game by which the player can win the right to proceed to the special game. Note that the roulette game corresponds to the special game of the structures (13) to (18) described in Summary of the Invention hereinabove.

in the third embodiment, when a “BONUS” symbol 952 corresponding to the pick-up bonus game is selected through the selection screen of the three-choice bonus game, the slot machine 10 starts the pick-up bonus game, and 29 touch symbols 961 in which an apple is drawn are displayed substantially at the center of the lower image display panel 141, as shown in FIG. 59. These 29 touch symbols 961 are randomly associated with winning of a friend-character, fixed payout, two-choice game, mini game, and pick-up bonus game, and are displayed on the lower image display panel 141 in such a manner that the associated contents of the touch symbols 961 are not visible. Note that the upper image display panel 131 corresponds to the special game display device of the structures (13) to (18) described in Summary of the Invention hereinabove. Further, the touch symbol 961 corresponds to the selectable object of the structures (13) to (18) described in Summary of the Invention hereinabove.

The player is able to make his/her own selection of the touch symbol 961 by touching any of the portions of the touch panel 114 respectively corresponding to the touch symbols 961.

When any of the touch symbols 961 is selected by the player, the image 962 indicating the associated contents of the selected touch symbol 961 is displayed in place of the selected touch symbol 961. As shown in FIG. 59, the image 962 can be an image 962*a* indicating the fixed payout, an image 962*b* indicating winning of a friend-character, an image 962*c* indicating running of the mini game, an image 963*d* indicating running of the two-choice game, and an image 962*e* indicating termination of the pick-up bonus game. The slot machine 10 after displaying the image 962 executes the contents associated with the image 962. Note that the image 962*a* shows an amount of payout to be awarded to the player. Further, the image 962*b* shows one friend-character.

Figure 60:
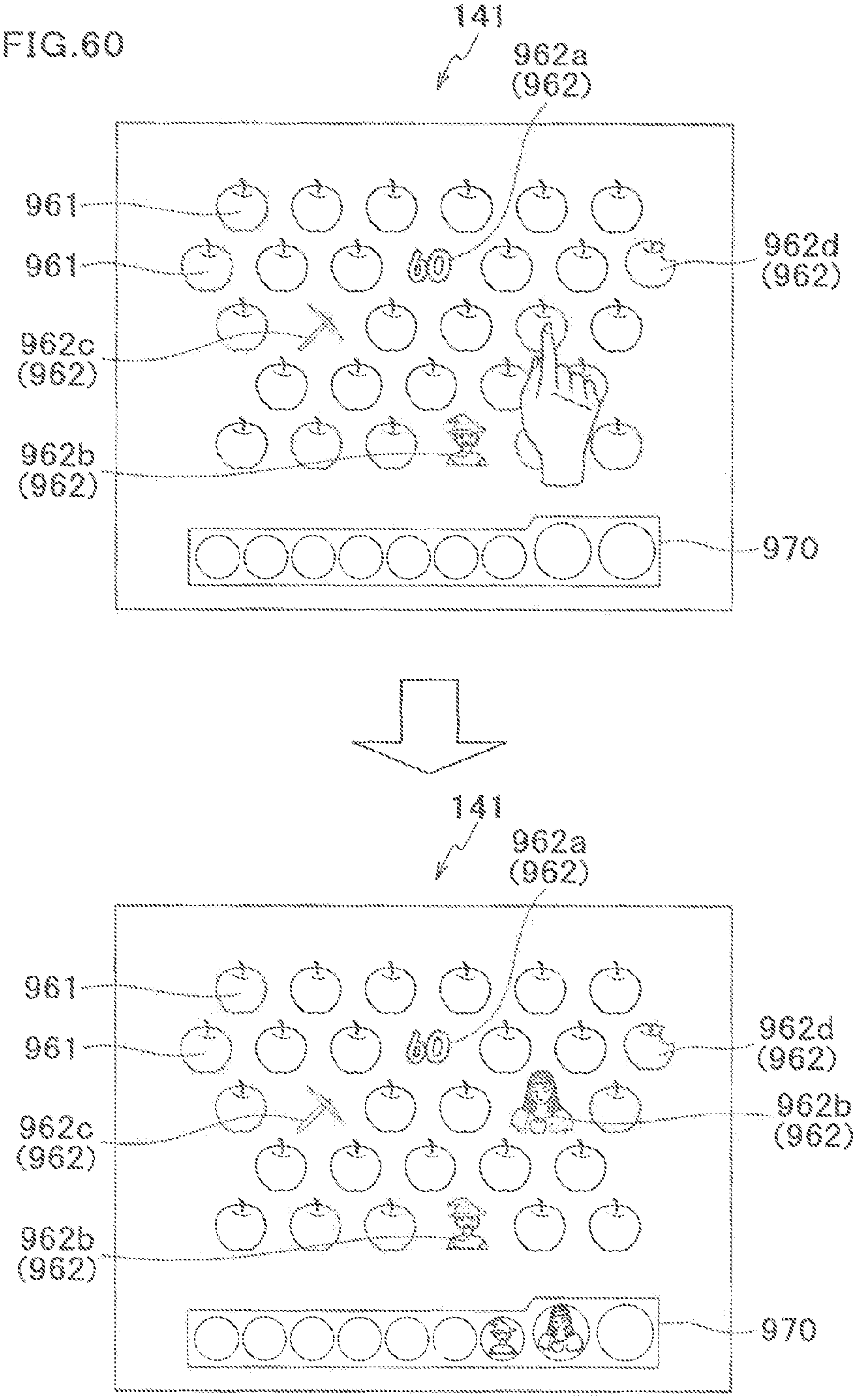
FIG. 60 is an explanatory diagram of the pick-up bonus game of the slot machine according to the third embodiment of the present invention.

Winning of a friend-character means an occurrence of the roulette game after the pick-up bonus game (i.e. winning of the right to proceed to the roulette game). The friend-character acquired during the pick-up bonus game is displayed as a friend-character in the friend-meter image 970 at the lower part of the lower image display panel 141, and is stored in an acquired character area of the RAM 73, as shown in FIG. 60. FIG. 60 shows an exemplary displaying when a Princess character is won as the friend-character. The RAM 73 corresponds to the selectable object storage device of the structures (13) to (18) described in Summary of the Invention hereinabove.

The “roulette game” is a game in which a plurality of small segments 981 showing amounts of payouts are provided to a roulette plate 980; a position of indication by an indicator 982*a* indicating only one small segment is sequentially moved and stopped after a predetermined period; and a payout marked in a small segment 981 indicated by the indicator 982*a* is awarded to the player. This roulette game is run after the pick-up bonus game based on the friend-characters won during the pick-up bonus game, and a specific combination of the friend-characters won. Note that the indicator 982*a* is realized in the form of lighting any of the plurality of indication-use light emitting portions 982.

There are nine types of the friend-characters: Princess character, Prince character, and seven types of Dwarf characters. The ROM 72 stores an associated character table in which each friend-character and the roulette game are associated with each other on one by one basis. The ROM 72 corresponds to the special game storage device of the structures (13) to (18) described in Summary of the Invention hereinabove. A combination of Princess character and Prince character is stored in the ROM 72 in association with a high payout roulette game configured to award a higher payout than the other roulette games. The combination of Princess character and Prince character corresponds to a specific combination of the selectable objects in the structures (13) to (18) described in Summary of the Invention hereinabove.

Further, in the third embodiment, a predetermined payout is awarded when all of the nine types of the friend-characters are acquired during the pick-up bonus game.

Figure 61:
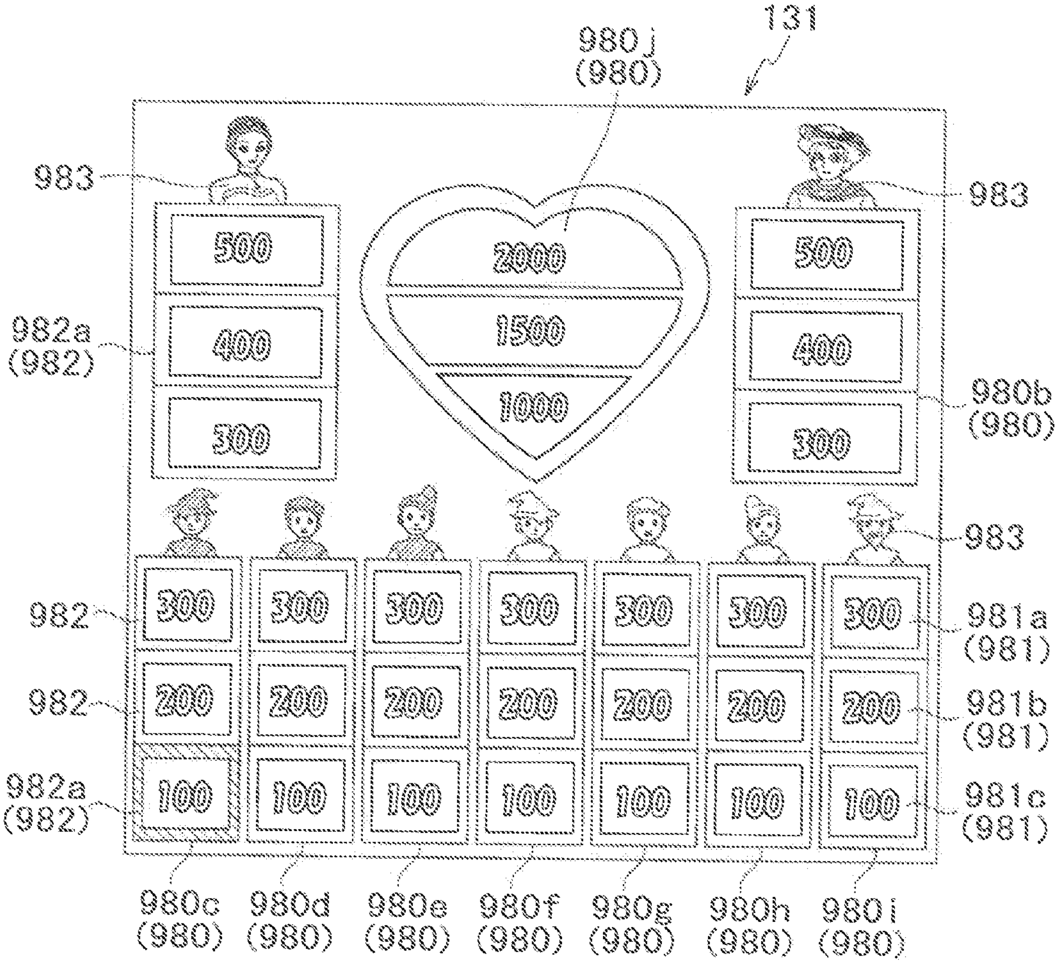
FIG. 61 is an explanatory diagram of the roulette game of the slot machine according to the third embodiment of the present invention.

As shown in FIG. 61, the roulette plate 980 can be a roulette plate 980*a* which runs a roulette game associated with Princess character, a roulette plate 980*b* which runs a roulette game associated with Prince character, roulette plates 980*c* to 980*i* each of which runs a roulette game associated with a Dwarf character, and a heart-shaped roulette plate 980*j* which runs a roulette game associated with the combination (specific combination) of Princess character and Prince character. In the third embodiment, there are three types of small segments 981 on the roulette plate 980 used in each roulette game: a high payout segment 981*a*, a medium payout segment 981*b*, and a small payout segment 981*c*. Further, the roulette game run by using the heart-shaped roulette plate 980*j* corresponds to the high payout roulette game in the structures (13) to (18) described in Summary of the Invention hereinabove.

The ROM 72 stores a roulette payout table shown in FIG. 62 which includes payout amounts of the small segments 981 of the roulette plate 980 in the roulette game, for each of the friend-characters, and a combination of Princess character and Prince character. As shown in FIG. 62, the amount of payout of the small segment is increased from is increased in the order of Dwarf character, Princess character or Prince character, and the combination of the Princess character and the Prince character.

For example, while the amount of payout on the high payout segment is 2000 in the roulette game associated with the combination of Princess character and Prince character, the amount of payout on the high payout segment is 500 in the roulette game associated with Princess character or Prince character, and is 300 in the roulette game associated with a Dwarf character.

[Contents of Program]

Thus, third embodiment of the present invention is described above. Next, the following describes programs to be executed in the slot machine 10 of the third embodiment.

<Main Control Process>

The main control process in the third embodiment is substantially the same as the main control process (see FIG. 9) of the first embodiment, and therefore the following description deals only step S21 and step S22 which are different processes.

In the third embodiment, the main CPU 71 determines in step S21 whether the three-choice bonus game trigger established. The bonus game trigger of the third embodiment is established when three "BONUS" symbols 952 are stopped in the display window 150.

When the main CPU 71 determines that the bonus game trigger has been established (step S21: YES), the main CPU executes a three-choice bonus game process which is described later with reference to FIG. 63 (step S22). When the main CPU 71 determines that the bonus game trigger has not been established (S21: NO), the process shifts to step S23.

(Three-Choice Bonus Game Process)

Figure 63:
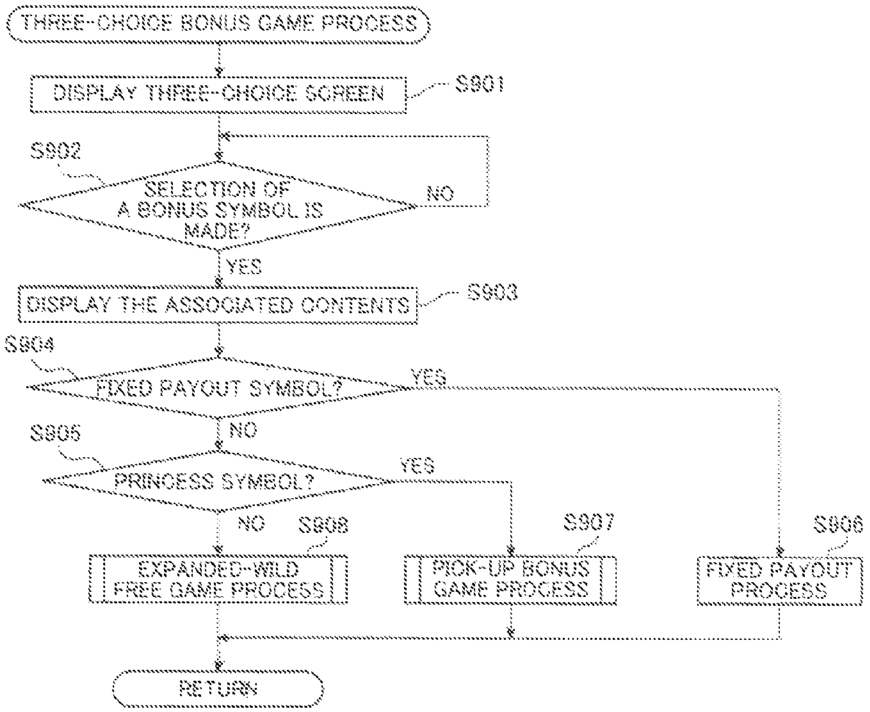
FIG. 63 shows a flowchart of the three-choice bonus game process in the slot machine according to the third embodiment of the present invention.

Thus, the main control process in the slot machine 10 of the third embodiment is described. Next, with reference to FIG. 63, the three-choice bonus game process is described. FIG. 63 shows a flowchart of the three-choice bonus game process in the slot machine 10 according to the third embodiment of the present invention.

First, the main CPU 71 displays a selection screen that prompts selection of one of the three "BONUS" symbols 952 stop-displayed on the lower image display panel 141 (S901).

Next, the main CPU 71 determines whether the selection of any of the "BONUS" symbols 952 is made through the selection screen (S902). Specifically, the main CPU 71 determines whether any of the portions of the touch panel 114 respectively corresponding to the "BONUS" symbol 952 is touched. When it is determined that the selection of a "BONUS" symbol 952 is not made (S902: NO), the main CPU 71 shifts the process back to S902.

On the other hand, when it is determined that the selection of a "BONUS" symbol 952 is made (S902: YES), the image 901 corresponding to the associated contents of the selected "BONUS" symbol 952 is displayed (S903). Next, the main CPU 71 determines whether the image 901 is the image 901*a* indicating the fixed payout (S904). That is, the main CPU 71 determines whether the selected "BONUS" symbol 952 corresponds to the fixed payout. When the image 901 is determined as to be the image 901*a* indicating the fixed payout (S904: YES), the main CPU 71 executes the fixed payout process (S906). The amount of fixed payout is added to the value of payout amount stored in the RAM 73, and the three-choice bonus game process is completed.

Figure 66:
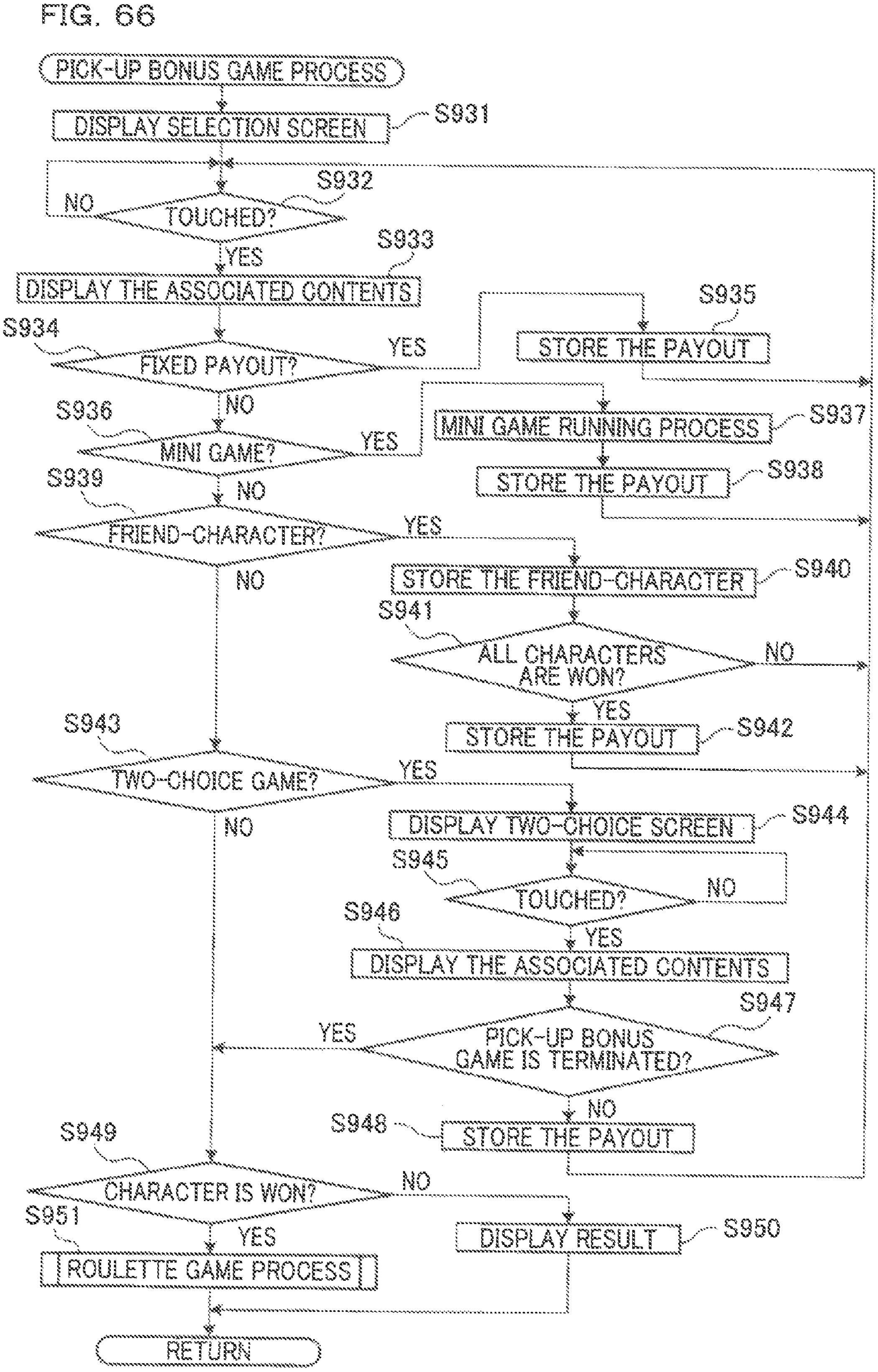
FIG. 66 shows a flowchart of the pick-up bonus game process in the slot machine according to the third embodiment of the present invention.

On the other hand, when it is determined that the image 901 is not the image 901*a* indicating the fixed payout (S904: NO), the main CPU 71 determines whether the image 901 is the image 901*c* indicating running of the pick-up bonus game (S905). That is, the main CPU 71 determines whether the selected "BONUS" symbol 952 corresponds to the pick-up bonus game. When the image 901 is determined as to be the image 901*c* indicating running of the pick-up bonus game (S905: YES), the pick-up bonus game process described later with reference to FIG. 66 is executed (S907), and the three-choice bonus game process is completed.

Figure 64:
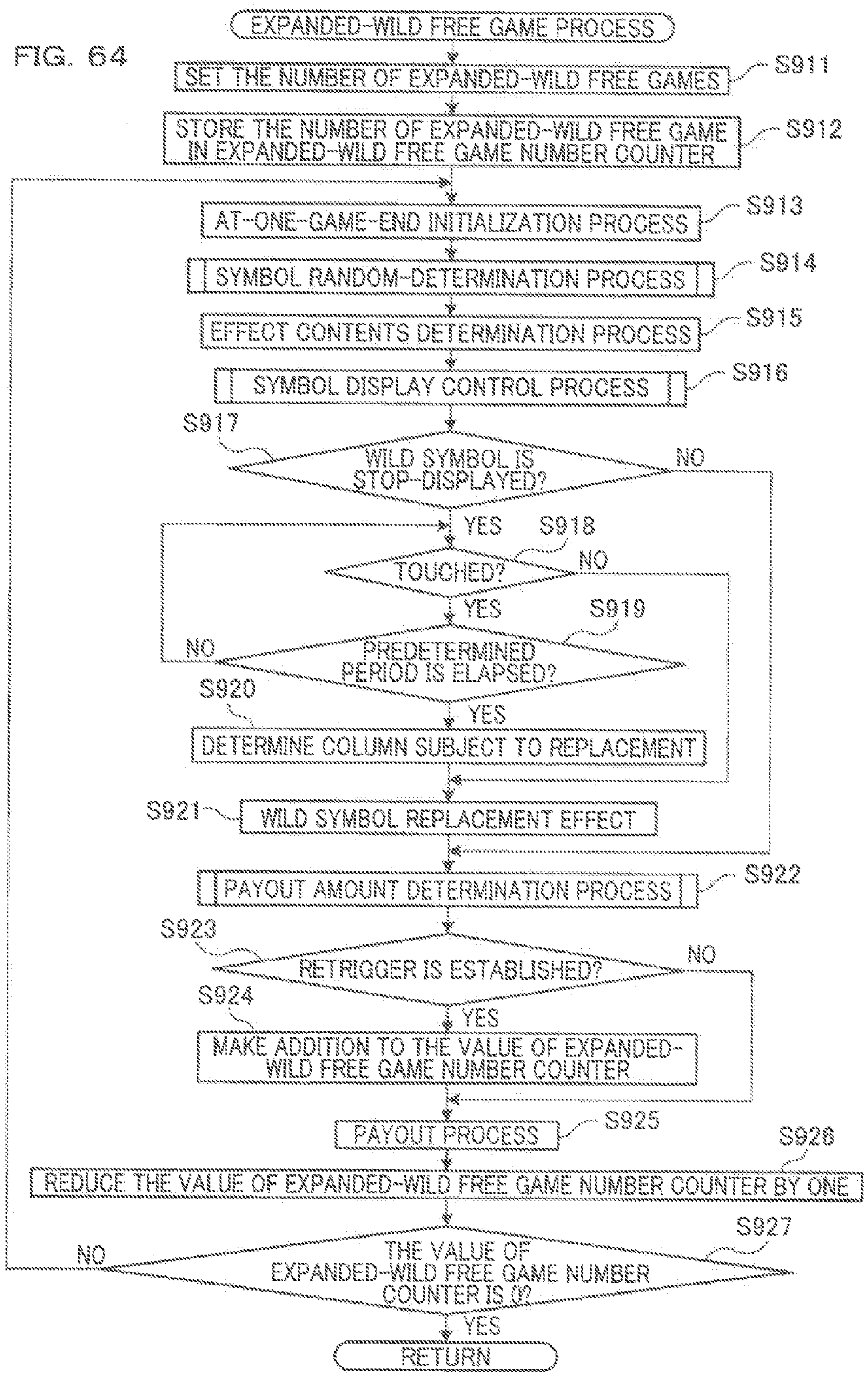
FIG. 64 is a view illustrating a flowchart of the Expanded-Wild free game process in the slot machine according to the third embodiment of the present invention.

On the other hand, when it is determined that the image 901 is the image 901*c* indicating running of the pick-up bonus game (S905: NO), the image 901 is determined as to be the image 901*b* indicating running of the Expanded-Wild free game (i.e., the selected "BONUS" symbol 952 is determined as to be the Expanded-Wild free game). Then, the expanded-wild free game process described later with reference to FIG. 64 is executed (S908), and the three-choice bonus game process is completed.

(Expanded-Wild Free Game Process)

Thus, the three-choice bonus game process in the slot machine 10 according to the third embodiment is described hereinabove. Next, the following describes with reference to FIG. 64 the Expanded-Wild free game process. FIG. 64 is a flowchart of the Expanded-Wild free game process of the slot machine 10 according to the third embodiment.

First, the main CPU 71 sets the number of Expanded-Wild free games to "8 times" (S911). Next, the main CPU 71 stores the set number of the Expanded-Wild free games in the Expanded-Wild free game number counter provided in the RAM 73 (S912).

The main CPU 71 then executes the at-one-game-end initialization process in the same way as S12 described with reference to FIG. 9 (step S913). The main CPU 71 then executes the symbol random-determination process described with reference to FIG. 14 (step S914). Then, the main CPU 71 executes the effect contents determination process in the same way as S16 described with reference to FIG. 9 (step S915). Next, the main CPU 71 executes the symbol display control process described with reference to FIG. 15 (step S916).

Next, the main CPU 71 determines whether a "WILD" symbol 953 is stop-displayed in the display window 150 (S917). When it is determined that a "WILD" symbol 953 is not stop-displayed (S917: NO), the process shifts to step S922.

On the other hand, when it is determined that a "WILD" symbol 953 is stop-displayed (S917: YES), the main CPU 71 determines whether the any one of the "WILD" symbols 953 stop-displayed is selected (S918). Specifically, the main CPU 71 determines whether any portions of the touch panel 114 respectively corresponding to the stop-displayed "WILD" symbols 953 is touched.

When it is determined that the selection of a "WILD" symbol 953 is made (S918: YES), the process shifts to step S921. On the other hand, when it is determined that the selection of a "WILD" symbol 953 is not made (S918: NO), the main CPU 71 determines whether a predetermined period has elapsed sing the symbol display control process of S916 (S919). When it is determined that a predetermined period has not yet elapsed (S919: NO), the process shifts back to S918.

On the other hand, when it is determined that the predetermined period has elapsed (S919: YES), one "WILD" symbol 953 out of all the stop-displayed "WILD" symbols 953 is determined (S920), and the process shifts to step S921.

In step S921, the main CPU 71 causes the expanded wild symbol 920 to replace the "WILD" symbol 953 selected in step S918 or the "WILD" symbol 953 determined in step S920, and all the symbols 950 stop-displayed in the display blocks 28 of the same column (see FIG. 58). After step S921, the process shifts to step S922.

In step S922, the main CPU 71 executes the payout amount determination process described with reference to FIG. 16. In the process, the amount of payouts is determined based on the combination of symbols 950 and the expanded wild symbol 920 displayed along the pay line, and is stored into a payout amount storage area provided in the RAM 73.

Next, the main CPU 71 determines whether a retrigger is established (S923). specifically, the main CPU 71 determines whether three "FREE GAME" symbols 954 are stop-displayed in the display window 150. When it is determined that a retrigger is established (S923), a value "8" is added to the value of the Expanded-Wild free game number counter (S924), and the process shifts to step S925.

The main CPU 71 performs a payout process (step S925). In this payout process, the main CPU 71 adds, to the Expanded-Wild free game payout amount counter, the value of the payout amount counter stored in the payout amount determination process in step S922. The Expanded-Wild free game payout amount counter is for managing the total of the payout amounts determined during the Expanded-Wild free game. The main CPU 71 adds the value stored in the Expanded-Wild free game payout amount counter to the credit amount counter provided in the RAM 73. That is, the total amounts of payout determined during the Expanded-Wild free game is collectively paid out. Note that it is possible to deliver coins from the coin tray 18.

Next, the main CPU 71 reduces the value of the Expanded-Wild free game number counter by one (S926). Next, the main CPU 71 determines whether the Expanded-Wild free game number counter is zero (S927). When it is determined that the Expanded-Wild free game number counter is not zero (S927: NO), the main CPU 71 shifts the process to step S913. On the other hand, when it is determined that the Expanded-Wild free game number counter is zero (S927: YES), the Expanded-Wild free game process is completed.

Figure 65:
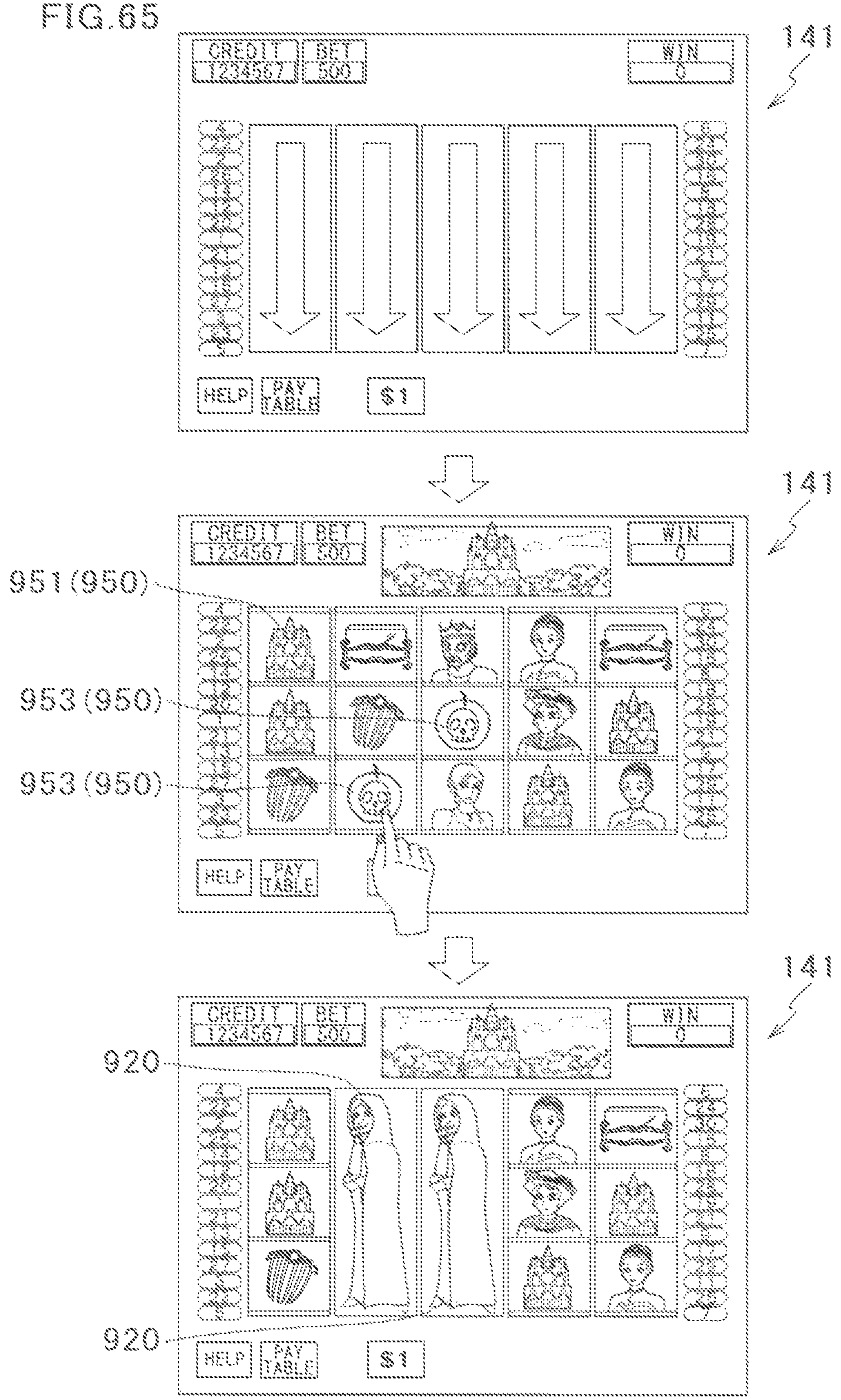
FIG. 65 is an explanatory diagram of the Expanded-Wild free game of the slot machine according to the third embodiment of the present invention.

Thus, the Expanded-Wild free game control process of the slot machine 10 according to the third embodiment is described hereinabove. Note that the third embodiment deals with a case where the expanded wild symbol 920 replaces the "WILD" symbol 953 selected by the player and the symbols 950 stop-displayed in the display blocks 28 of the same column; however, the present invention is not limited to this. For example, as shown in FIG. 65, when the player selects one of the "WILD" symbols 953 stop-display, the expanded wild symbol 920 may replace the all the "WILD" symbols 953 and the symbols 950 stop-displayed in the display blocks 28 of the same columns or the rows.

(Pick-Up Bonus Game Process)

Next, with reference to FIG. 66, the pick-up bonus game process is described. FIG. 66 shows a flowchart of the pick-up bonus game process in the slot machine 10 according to the third embodiment of the present invention.

First, the main CPU 71 displays a selection screen that prompts selection of one of 29 touch symbols 961 displayed on the lower image display panel 141, as shown in FIG. 59 (S931). Note that in S931, the main CPU 71 causes the upper image display panel 131 to display the roulette plate 980 and displays, in the grayed out state, the associated friend-character image 983 of the roulette plate 980.

Next, the main CPU 71 determines whether the selection of any of the touch symbols 961 is made through the selection screen of the touch symbols 961 (S932). Specifically, the main CPU 71 determines whether any of the portions of the touch panel 114 respectively corresponding to the touch symbols 961 is touched. When it is determined that the selection of a touch symbol 961 is not made (S932: NO), the main CPU 71 shifts the process back to S932.

On the other hand, when it is determined that the selection of a touch symbol 961 is made (S932: YES), the main CPU 71 causes displaying, in place of the selected touch symbol 961, the image 962 indicating the associated contents of the selected touch symbol 961 (S933). Next, the main CPU 71 determines whether the image 962 is the image 962*a* indicating the fixed payout (S934). That is, the main CPU 71 determines whether the selected touch symbol 961 corresponds to the fixed payout. When the image 962 is determined as to be the image 962*a* indicating the fixed payout (S934: YES), the main CPU 71 adds an amount of the payout displayed on the image 962*a* to the value of payout amount stored in the RAM 73 (S935) and then shifts the process back to S932.

On the other hand, when the image 962 is not determined as to be the image 962*a* indicating the fixed payout (S934: NO), the main CPU 71 determines whether the image 962 is the image 962*c* indicating running of the mini game (S936). That is, the main CPU 71 determines whether the selected touch symbol 961 corresponds to the mini game. When the image 962 is determined as to be the image 962*c* indicating running of the mini game (S936: YES), the mini game is run (S937), and the payout awarded according to the result of the mini game is added to the value of payout amount stored in the RAM 73 (S938). The process then shifts to step S932.

On the other hand, when the image 962 is not determined as to be the image 962*c* indicating running of the mini game (S936: NO), the main CPU 71 determines whether the image 962 is the image 962*b* indicating winning of a friend-character (S939). That is, the main CPU 71 determines whether the selected touch symbol 961 corresponds to winning of the friend-character. When the image 962 is determined as to be the image 962*b* indicating winning of a friend-character (S939: YES), the main CPU 71 causes the lower image display panel 141 to display the friend-character shown on the image 962*b*, in its friend-meter image 970 at the lower part, and stores the friend-character in the acquired character area of the RAM 73 (S940). Note that, in step S940, the main CPU 71 turns off the grayed out state of the friend-character image 983 corresponding to the friend-character shown on the image 962*b* and lights and displays the same on the upper image display panel 131.

Next, the main CPU 71 determines whether all types of friend-characters are stored in the acquired character area of the RAM 73 (S941). When it is determined that not all types of friend-characters are store (S941: NO), the process shifts to step S932.

On the other hand, when it is determined that all the types of friend-characters are stored (S941: YES), a predetermined payout according to the game media placed as a bet in the base game is added to the value of payout amount stored in the RAM 73 (S942), and the shift the process back to S932.

In step S939, when the image 962 is not determined as to be the image 962*b* indicating winning of a friend-character (S939: NO), the main CPU 71 determines whether the image 962 is the image 963*d* indicating running of the two-choice game (S943). That is, the main CPU 71 determines whether the selected touch symbol 961 corresponds to the two-choice game. When the image 962 is not determined as to be the image 963*d* indicating running of the two-choice game (S943: NO), the image 962 is determined as to be the image 963*e* indicating termination of the pick-up bonus game (selected touch symbol 961 is determined as to correspond to the termination of the pick-up bonus game), and the process shifts to step S949.

Figure 67:
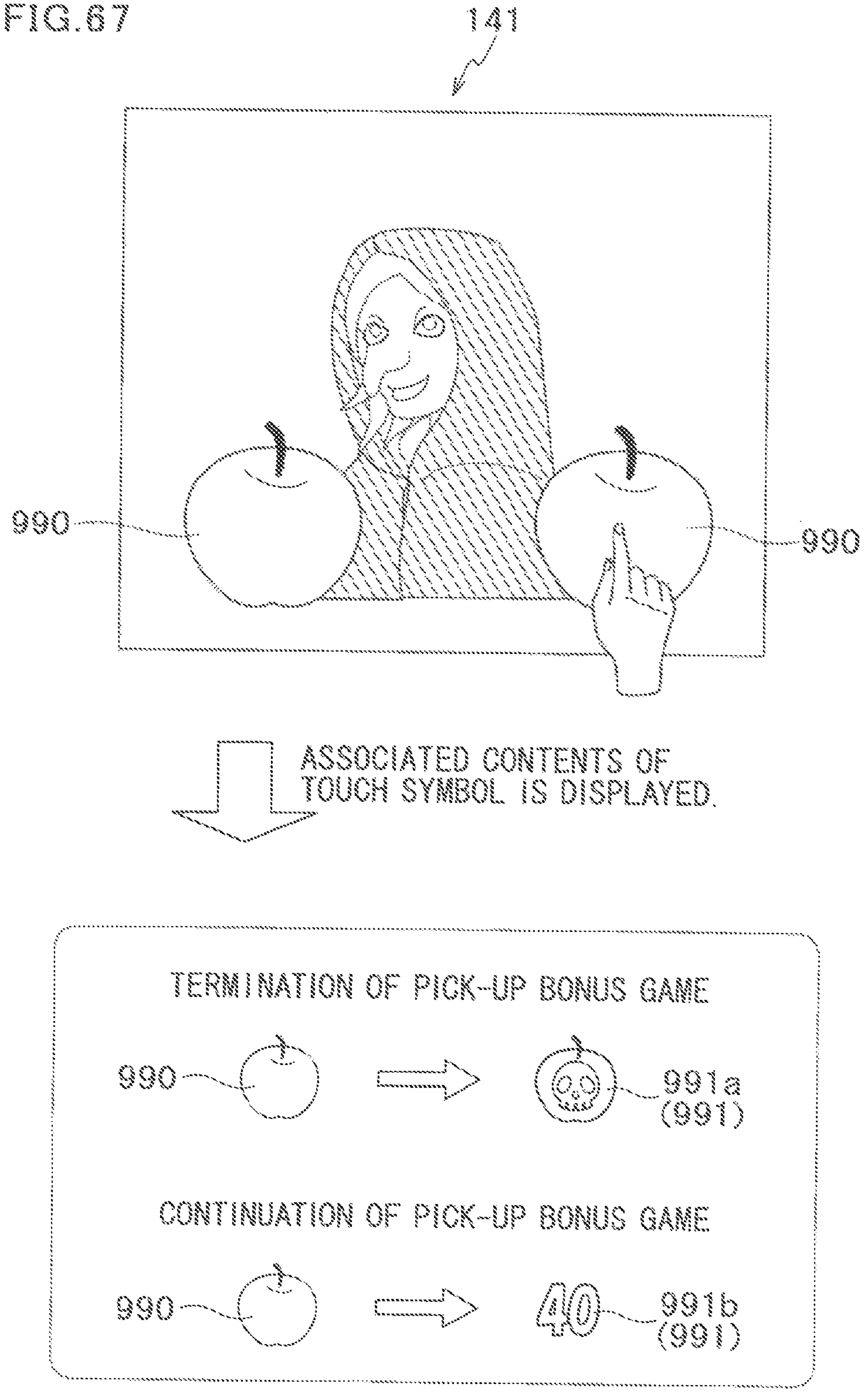
FIG. 67 is a diagram explaining a two-choice game of the slot machine according to the third embodiment of the present invention.

On the other hand, when the image 962 is determined as to be the image 963*d* indicating running of the two-choice game (S943: YES), the main CPU 71 displays a selection screen that prompts selection of one of two touch symbols 990 displayed on the lower image display panel 141, as shown in FIG. 67 (S944). The two touch symbols 990 are randomly associated with termination of the pick-up bonus game or continuation of the pick-up bonus game, and are displayed on the lower image display panel 141 in such a manner that the associated contents of the two touch symbols 990 are not visible.

Next, the main CPU 71 determines whether the selection of any of the touch symbols 961 is made through the selection screen of the touch symbols 990 (S945). Specifically, the main CPU 71 determines whether any of the portions on the touch panel 114 respectively corresponding to the touch symbols 961 is touched. When it is determined that the selection of a touch symbol 961 is not made (S945: NO), the main CPU 71 shifts the process back to S945.

On the other hand, when it is determined that the selection of a touch symbol 990 is made (S945: YES), the image 991 indicating the associated contents of the selected touch symbol 990 is displayed (S946). Note that the image 991 can be an image 991*a* indicating termination of the pick-up bonus game or an image 991*b* indicating continuation of the pick-up bonus game as shown in FIG. 67. On the image 991*b* is shown a payout to be awarded to the player.

Next, the main CPU 71 determines whether the image 991 is the image 991*a* indicating termination of the pick-up bonus game (S947). That is, the main CPU 71 determines whether the selected touch symbol 990 corresponds to termination of the pick-up bonus game. When the image 991 is not determined as to be the image 991*a* indicating termination of the pick-up bonus game (S947: NO), the main CPU 71 determines that the image 991 is the image 991*b* indicating continuation of the pick-up bonus game (i.e., the selected touch symbol 990 is determined as to correspond to continuation of the pick-up bonus game), and an amount of payout displayed on the image 991*b* is added to the value of the payout amount stored in the RAM 73 (S948). The process then shifts back to S932.

On the other hand, when the image 991 is determined as to be the image 991*a* indicating termination of the pick-up bonus game (S947: YES), the process shifts to step S949.

In step S949, the main CPU 71 determines whether the friend-character is stored in the acquired character area of the RAM 73. When the main CPU 71 determines that no friend-character is stored (S949: NO), the value of payout amount stored in the RAM 73 is displayed on the lower image display panel 141 (S950), and the pick-up bonus game process is completed.

Figure 68:
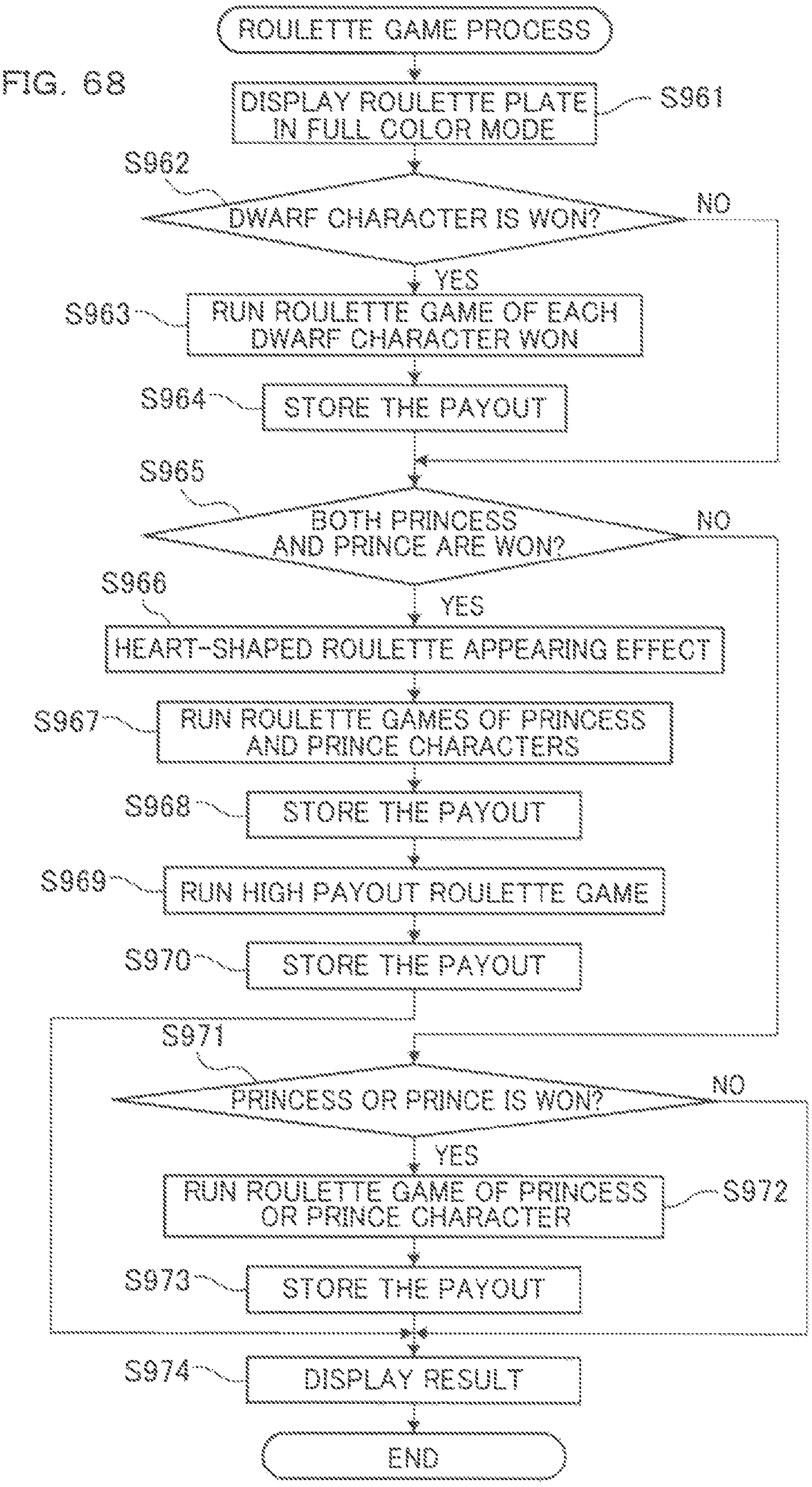
FIG. 68 is an explanatory diagram of the roulette game process in the slot machine according to the third embodiment of the present invention.

On the other hand, when it is determined that a friend-character is stored, the main CPU 71 executes the roulette game process described with reference to FIG. 68 (S951), and the pick-up bonus game process is completed.

(Roulette Game Process)

Next, with reference to FIG. 68, a roulette game process is described below. FIG. 68 shows a flowchart of the roulette game process according to the third embodiment.

First, the main CPU 71 causes the upper image display panel 131 to dismiss the grayed out state of the roulette plate 980 associated with the friend-character stored in the acquired character area of the RAM 73, and light and display the same (S961). Further, in step S961, the main CPU 71 causes the lower image display panel 141 to display an image to attract the attention of the player to the upper image display panel 131.

Next, the main CPU 71 determines whether a Dwarf character is stored in the acquired character area of the RAM 73 (S962). When the main CPU 71 determines that a Dwarf character is not store (S962: NO), the process shifts to step S965.

On the other hand, when it is determined that a Dwarf character is stored in the acquired character area of the RAM 73 (S962: YES), the main CPU 71 runs a roulette game associated with the Dwarf character stored (S963). The roulette game is run by using the roulette plate 980 associated with the Dwarf character stored in the acquired character area of the RAM 73. Note that, when a plurality of Dwarf characters are stored in the acquired character area of the RAM 73, the roulette games respectively associated with the Dwarf characters are sequentially run, instead of running them simultaneously. Next, the main CPU 71 adds a payout based on the result of the roulette game to the value of payout amount stored in the RAM 73 (S964), and shifts the process to step S971.

Figure 69:
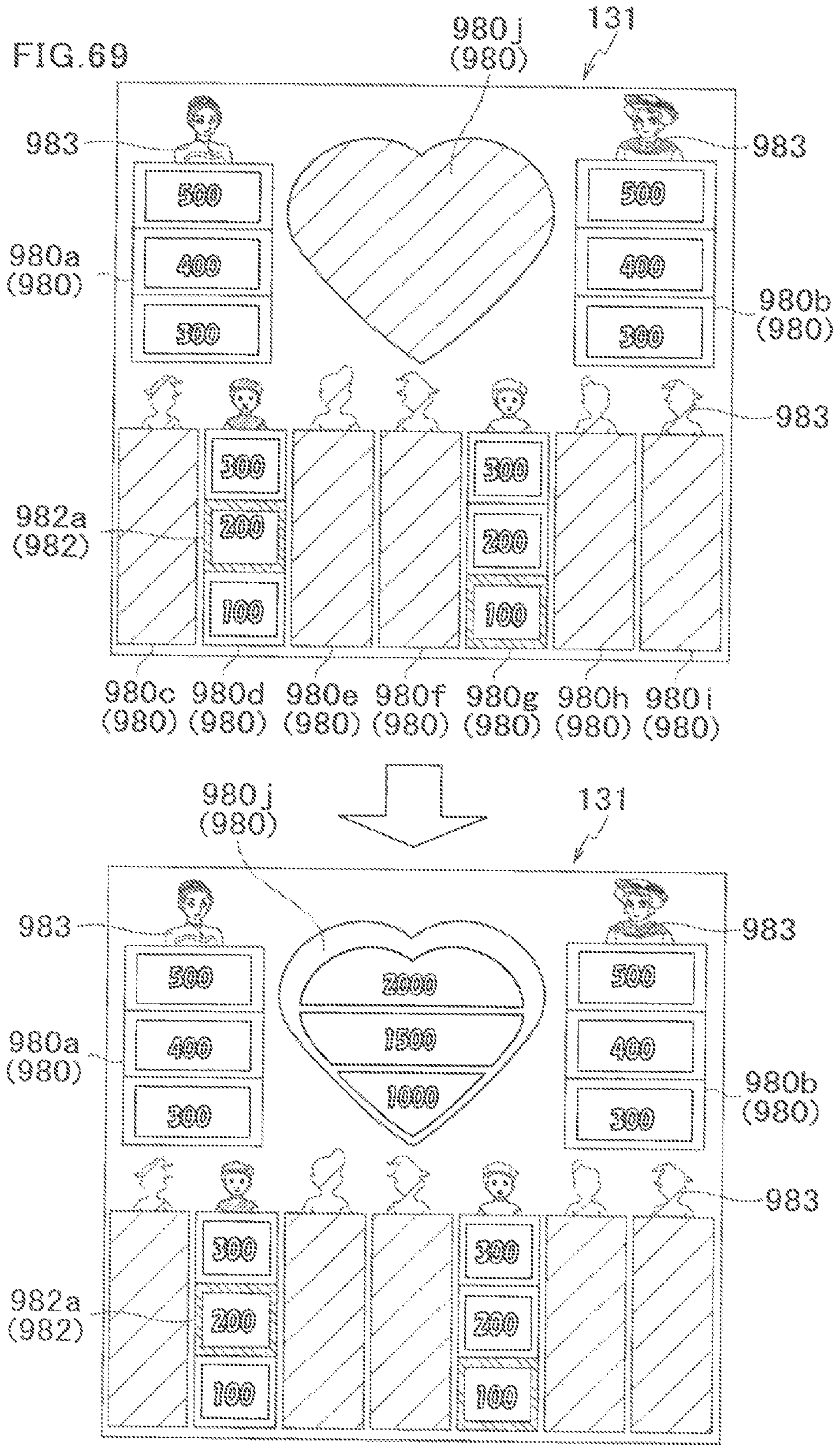
FIG. 69 is an explanatory diagram of a roulette game of the slot machine according to the third embodiment of the present invention.
Figure 70:
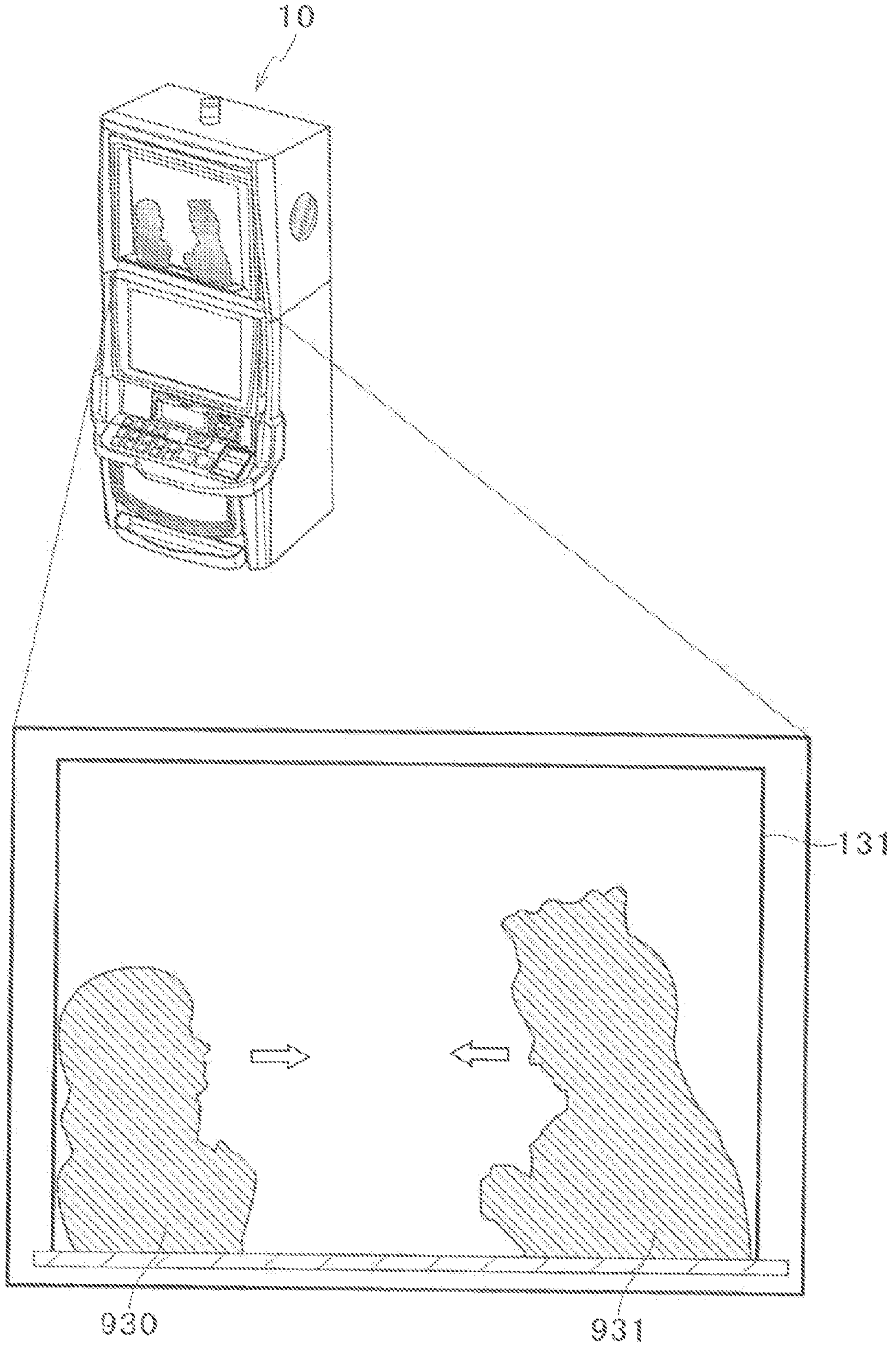
FIG. 70 is an explanatory diagram of a roulette game of the slot machine according to the third embodiment of the present invention.

In step S965, there is determined whether the acquired character area of the RAM 73 stores both Princess character and Prince character. When it is determined that the both Princess character and Prince character are stored (S965: YES), the grayed out mode of the heart-shaped roulette plate 980*j* is turned off and the roulette plate 980*j* is displayed in the full color mode substantially at the center of the upper image display panel 131, as shown in FIG. 69 (S966). Note that, in step S966, the grayed out mode of the heart-shaped roulette plate 980*j* may be turned off and the roulette plate 980*j* may be displayed in the full color mode, after moving a Princess character doll 930 and a Prince character doll 931 provided at the front of the upper image display panel 131 to have these dolls kiss each other, as shown in FIG. 70. This way, it is possible to notify the player and people around the slot machine 10 that a high payout roulette game will start.

Next, the main CPU 71 runs the roulette game using the roulette plate 980*a* associated with the Princess character, and the roulette game using the roulette plate 980*b* associated with the Prince character (S967). The payouts based on the results of the roulette games are added to the value of payout amount stored in the RAM 73 (S968).

Next, the main CPU 71 runs the high payout roulette game using the heart-shaped roulette plate 980*j* (S969). Next, the main CPU 71 adds the payout based on the result of the high payout roulette game to the value of payout amount stored in the RAM 73 (S970), and then shifts the process to step S974.

In step S965, when it is determined that not both of Princess character and Prince character are stored (S965: NO), there is determined if the acquired character area of the RAM 73 stores one of Princess character and Prince character (S971). When it is determined that neither Princess character nor Prince character is stored (S971: NO), the main CPU 71 shifts the process to step S974.

On the other hand, when it is determined that one of the Princess character or the Prince character is stored (S971: YES), a roulette game is run using the roulette plate 980*a* associated with the Princess character, or the roulette plate 980*b* associated with the Prince character (S972). Then a payout based on the result of the roulette game is added to the value of payout amount stored in the RAM 73 (S973). The process then shifts to step S974.

In step S974, the main CPU 71 causes the lower image display panel 141 to display the value of payout amount stored in the RAM 73. After step S974, the roulette game process is completed.

As described above, the slot machine 10 of the third embodiment executes the following processes.

(j7) running a base game which variably displays and then stop-displays the symbols 950 and awards a payout according to a predetermined symbol combination formed by the symbols 950 stop-displayed;

(j2) when the symbols stop-displayed in the base game run in (j1) includes a plurality of specific symbols ("BONUS" symbols 952), enabling the input device (touch panel 114) to accept an input related to selection of any of the specific symbols stop-displayed;

(j3) determining whether or not a specific symbol selected in (j2) is a symbol that causes an occurrence of an Expanded-Wild free game;

(j4) when it is determined in (j3) that the symbol 950 is a symbol 950 that causes an occurrence of the Expanded-Wild free game, running the Expanded-Wild free game a predetermined number of times, each of which game variably displays and stop-displays symbols and awards a payout based on a predetermined symbol combination formed by the stop-displayed symbols;

(j5) when a specific symbol ("WILD" symbol 953) is stop-displayed in the Expanded-Wild free game run in (j4), enabling the input device to accept an input related to the specific symbol stop-displayed;

(j6) when an input related to the specific symbol is received in (j5), having a wild symbol (expanded wild symbol 920) deemed as any of the other symbols replace the specific symbol and at least one of the symbols 950 stop-displayed in display blocks 28 of the same row or the same column;

(j7) awarding a payout according to a predetermined symbol combination based on one or more wild symbols resulting from the replacement of (j6) and the other symbols 950 stop-displayed.

In the above structure, a plurality of specific symbols ("BONUS" symbol 952) are stop-displayed in the base game, and in response to this, the player is able to select one of the plurality of specific symbols stop-displayed via the input device (touch panel 114). When a specific symbol that causes an occurrence of the Expanded-Wild free game is selected, the Expanded-Wild free game is run a predetermined number of times. When a specific symbol ("WILD" symbol 953) is stop-displayed in this Expanded-Wild free game, the player is able to enter an input related to the stop-displayed specific symbol via the input device. When the player enters an input related to the stop-displayed specific symbol, a wild symbol (expanded wild symbol 920) which is deemed as any of the other symbols replaces the specific symbol and at least one of the symbols stop-displayed in display blocks 28 of the same row or the same column. Then, a payout is awarded according to a predetermined symbol combination, based on one or more wild symbols resulting from the replacement and the other symbols 950 stop-displayed. As is understood from the above, it is the player's operation in response to which the wild symbol replaces the specific symbol and at least one of the symbols stop-displayed in a plurality of display blocks of the same row or the same column. This makes the game more attractive to the player.

As described above, the slot machine 10 of the third embodiment executes the following processes. in (j6), when an input related to the specific symbol ("WILD" symbol 953) is received in (j5), having a wild symbol (expanded wild symbol 920) deemed as any of the other symbols replace the specific symbol and all of the symbols 950 stop-displayed in display blocks 28 of the same row or the same column.

In the above structure, the wild symbol (expanded wild symbol 920) replaces the specific symbol ("WILD" symbol 953) and all of the symbols 950 stop-displayed in display blocks 28 of the same row or the same column. Thus, there will be a large number of the wild symbols after the replacement, and the player will have greater expectation for the payout based on the wild symbols.

As described above, the slot machine 10 of the third embodiment executes the following processes.

(k1) running a base game which variably displays and then stop-displays the symbols 950 and awards a payout according to a predetermined symbol combination formed by the symbols 950 stop-displayed;

(k2) when the symbols stop-displayed in the base game run in (k1) includes a plurality of specific symbols ("BONUS" symbols 952), enabling the input device (touch panel 114) to accept an input related to selection of any of the specific symbols stop-displayed;

(k3) determining whether or not a specific symbol selected in (k2) is a symbol that causes an occurrence of an Expanded-Wild free game;

(K4) when it is determined in (k3) that the symbol 950 is a symbol 950 that causes an occurrence of the Expanded-Wild free game, running the Expanded-Wild free game a predetermined number of times, each of which game variably displays and stop-displays symbols and awards a payout based on a predetermined symbol combination formed by the stop-displayed symbols;

(k5) when a plurality of specific symbols ("WILD" symbols 953) are stop-displayed in the Expanded-Wild free game run in (k4), enabling the input device to accept an input related to selection of any of the plurality of specific symbols stop-displayed;

(k6) having a wild symbol (expanded wild symbol 920) deemed as any of the other symbols replace the specific symbol selected in (k5) and at least one of the symbols 950 stop-displayed in display blocks 28 of the same row or the same column; and (k7) awarding a payout according to a predetermined symbol combination formed by the wild symbols resulting from the replacement of (k6) and the other symbols stop-displayed.

In the above structure, a plurality of specific symbols ("BONUS" symbols 952) are stop-displayed in the base game, and in response to this, the player is able to select one of the plurality of specific symbols stop-displayed via the input device (touch panel 114). When a specific symbol that causes an occurrence of the Expanded-Wild free game is selected, the Expanded-Wild free game is run a predetermined number of times. In response to stop-displaying of specific symbols ("WILD" symbols 953) in the Expanded-Wild free game, the player is able to select one of the plurality of specific symbols stop-displayed via the input device. When the player selects any one of the plurality of specific symbols stop-displayed, a wild symbol (expanded wild symbol 920) deemed as any of the other symbols replaces the selected specific symbol and at least one of the symbols 950 stop-displayed in display blocks 28 of the same row or the same column. Then, a payout is awarded according to a predetermined symbol combination, based on the wild symbols resulting from the replacement and the other symbols stop-displayed. As is understood from the above, a wild symbol deemed as any of the other symbols replaces the specific symbol selected by the player and at least one of the symbols in display blocks 28 of the same row or the same column. This makes the game more attractive to the player.

As described above, the slot machine 10 of the third embodiment executes the following processes.

(l1) running a base game which variably displays and then stop-displays the symbols 950 and awards a payout according to a predetermined symbol combination formed by the symbols 950 stop-displayed;

(l2) when the symbols stop-displayed in the base game run in (l1) includes a plurality of specific symbols ("BONUS" symbol 952), enabling the input device (touch panel) to accept an input related to selection of any of the specific symbols stop-displayed;

(l3) determining whether a specific symbol selected in (l2) is a symbol that causes an occurrence of the pick-up bonus game;

(l4) when it is determined in (l3) that the symbol selected is a symbol that causes an occurrence of the pick-up bonus game, displaying on the pick-up bonus game display device (lower image display panel 141) a plurality of selectable objects (touch symbols 961);

(l5) enabling the input device to accept an input of selection of any of a plurality of selectable objects displayed in (l4) on the pick-up bonus game display device;

(l6) when the object selected in (l5) is an object that causes an occurrence of the special game (roulette game), storing the selectable object in the selectable object storage device (RAM 73);

(17) repeating (15) to (16) until the object selected in (15) is an object that terminates the pick-up bonus game;

(18) when the object selected in (15) is an object that terminates the pick-up bonus game, referring to the special game storage device (ROM 72) to run a special game corresponding to the selectable object stored in the selectable object storage device, and awarding a payout.

In the above structure, a plurality of specific symbols ("BONUS" symbol 952) are stop-displayed in the base game, and in response to this, the player is able to select one of the plurality of specific symbols stop-displayed via the input device (touch panel 114). Then, when a specific symbol that causes occurrence of the pick-up bonus game is selected, the pick-up bonus game is started, and the player is able to select any of a plurality of selectable objects (touch symbols 961). When the object selected is an object that triggers a special game (roulette game), that object selected is stored in the selectable object storage device (RAM 73). When the pick-up bonus game is terminated, the special game corresponding to the object selected and stored in the selectable object storage device is run, and a payout is awarded. As is understood from this, the special game to be run after the pick-up bonus game varies depending on the object selected by the player in the pick-up bonus game. This way it is possible to attract player's attention to selection of the selectable object in the pick-up bonus game. As a result, the player is more interested in the game the player is playing.

Further, the slot machine 10 of the third embodiment executes the following processes. (19) when the specific combination (combination of Princess character and Prince character) is stored in the selectable object storage device (RAM 73), running a high payout special game (high payout roulette game) and awarding a payout.

In the above structure, when the objects selected (touch symbols 961) by the player in the pick-up bonus game form a specific combination, the high payout special game (high payout roulette game) configured to award more payout than the other special games (roulette games) is run. This makes the game even more attractive to players.

Further, the slot machine 10 of the third embodiment executes the following processes. (111) awarding a payout when the selectable object storage device (RAM 73) stores all the selectable objects (friend-characters) respectively associated with the special games (roulette game) stored in the special game storage device (ROM 72).

In the above structure, a payout is awarded when the player selects all the selectable objects respectively associated with the special games (roulette games) stored in the special game storage device (ROM 72). This makes selecting of the selectable object in the pick-up bonus game more interesting for the player, thus making the game more attractive to the player.

The above embodiment thus described solely serves as a specific example of the present invention, and the present invention is not limited to such an example. Specific structures and various means may be suitably designed or modified. Further, the effects of the present invention described in the above embodiment are not more than examples of most preferable effects achievable by the present invention. The effects of the present invention are not limited to those described in the embodiments described above.

Further, the detailed description above is mainly focused on characteristics of the present invention to fore the sake of easier understanding. The present invention is not limited to the above embodiments, and is applicable to diversity of other embodiments. Further, the terms and phraseology used in the present specification are adopted solely to provide specific illustration of the present invention, and in no case should the scope of the present invention be limited by such terms and phraseology. Further, it will be obvious for those skilled in the art that the other structures, systems, methods or the like are possible, within the spirit of the invention described in the present specification. The description of claims therefore shall encompass structures equivalent to the present invention, unless otherwise such structures are regarded as to depart from the spirit and scope of the present invention. Further, the abstract is provided to allow, through a simple investigation, quick analysis of the technical features and essences of the present invention by an intellectual property office, a general public institution, or one skilled in the art who is not fully familiarized with patent and legal or professional terminology. It is therefore not an intention of the abstract to limit the scope of the present invention which shall be construed on the basis of the description of the claims. To fully understand the object and effects of the present invention, it is strongly encouraged to sufficiently refer to disclosures of documents already made available.

The detailed description of the present invention provided hereinabove includes a process executed on a computer. The above descriptions and expressions are provided to allow the one skilled in the art to most efficiently understand the present invention. A process performed in or by respective steps yielding one result or blocks with a predetermined processing function described in the present specification shall be understood as a process with no self-contradiction. Further, the electrical or magnetic signal is transmitted/received and written in the respective steps or blocks. It should be noted that such a signal is expressed in the form of bit, value, symbol, text, terms, number, or the like solely for the sake of convenience. Although the present specification occasionally personifies the processes carried out in the steps or blocks, these processes are essentially executed by various devices. Further, the other structures necessary for the steps or blocks are obvious from the above descriptions.

The detailed description hereinabove separately describes the first to third embodiments. The respective structures of these embodiments however may be combined as needed. A combination of the structures of these embodiments realizes a gaming machine and a control method therefor, which provides further improved entertainment characteristics.

What is claimed is:

1. A wagering machine comprising:

a symbol display device configured to variably display a plurality of symbols;

an input device for receiving an input of an instruction related to a game;

a value-addition mechanism for receiving game media;

an award payout mechanism by which currency or other game media is paid out to the player or credited to an available-betting-amount account of the player; and a controller programmed to execute the following steps as a result of the player having made a bet of the game media:

(a1) running a base game which variably displays the symbols on the symbol display device and stop-displays the symbols thereafter;

(a2) when the symbols stop-displayed in the base game run in (a1) includes a plurality of specific symbols, enabling the input device to accept an input related to selection of any of the specific symbols stop-displayed;

(a3) determining whether or not the specific symbol selected in (a2) is a symbol that causes occurrence of a pick-up bonus game;

(a4) when the symbol is determined as to be a symbol that causes occurrence of a pick-up bonus game in (a3), enabling the input device to accept an input of selection of any of a plurality of selectable objects displayed on the symbol display device;

(a5) awarding a payout according to an object selected out of the selectable objects in (a4);

(a6) when the object selected in (a4) is an object that increases an expectation value for a payout awarded in the pick-up bonus game, raising the expectation value for the payout; and (a7) repeating (a4) to (a6), until an object that terminates the pick-up bonus game is selected in (a4), wherein, all of the gains associated with the other selectable objects are awarded, when the object selected in (a4) is a winner-takes-all object, wherein in (a4), when the symbol is determined as to be a symbol that causes occurrence of a pick-up bonus game, (1) displaying, as the plurality of selectable objects, an array of identical selectable symbols each corresponding to a respective hidden object; and (2) enabling the input device to accept an input for selection of any of the identical selectable symbols so as to reveal a corresponding hidden object on the symbol display device;

wherein in (a6), when the hidden object revealed in (a4) is an object that increases an expectation for a payout in the pick-up bonus game, displaying a new array of identical selectable symbols each corresponding to a respective hidden object in which the identical selectable symbols of the new array have an increased expectation for the payout; and wherein the increased expectation for the payout is based on (1) an increase in the amount of the payout awarded upon selection of a hidden object corresponding to an award payout; (2) an increase in the probability of selecting a hidden object corresponding to an award payout; and (3) selection of a hidden object that further increases the expectation for the payout.

2. The wagering machine according to claim 1, wherein the controller is programmed to execute the following steps of:

(b1) receiving the bet input of the game media via the input device;

(b2) accumulatively storing at least a part of the game media having been placed as the bet in (b1); and (b3) when the object selected in (a4) is an object that relates to awarding of a progressive payout, awarding at least a part of the game media stored in (b2) as a progressive payout.

3. The wagering machine according to claim 1, wherein the controller is programmed to execute the following step of: (c1) when the object selected in (a4) is a winner-takes-all object, awarding the all the gains associated with the other selectable objects.

* * * * *